United States Patent [19]

Oi et al.

[11] Patent Number: 5,142,675
[45] Date of Patent: Aug. 25, 1992

[54] MONITOR CHANNEL SYSTEM IN USE WITH A RECORDING APPARATUS

[75] Inventors: Koichi Oi; Takashi Hoshi, both of Kanagawa, Japan

[73] Assignee: Fuji Xerox., Ltd., Tokyo, Japan

[21] Appl. No.: 486,819

[22] Filed: Mar. 1, 1990

[30] Foreign Application Priority Data

Mar. 8, 1989 [JP] Japan ................... 1-57280

[51] Int. Cl.⁵ .................... G06F 3/04; G06F 9/06; G06F 3/00; G03G 15/00
[52] U.S. Cl. ..................: .................. 395/650; 364/264; 364/934.1
[58] Field of Search .............. 364/200, 900; 395/650

[56] References Cited

U.S. PATENT DOCUMENTS

| | | | |
|---|---|---|---|
| 4,196,476 | 4/1980 | Steiner | 364/900 |
| 4,198,680 | 4/1980 | Gaxx, Jr. | 364/518 |
| 4,283,773 | 8/1981 | Daughton et al. | 364/900 |
| 4,325,119 | 4/1982 | Grandmaison et al. | 364/200 |
| 4,638,452 | 1/1987 | Schultz et al. | 364/900 |

Primary Examiner—Michael R. Fleming
Assistant Examiner—Robert S. Hauser
Attorney, Agent, or Firm—Finnegan, Henderson, Farabow, Garrett and Dunner

[57] ABSTRACT

A monitor control system comprises an interrupt processor for executing regular monitor processing by a periodic interrupt occurring at a predetermined time interval, and a background processor for executing background processing, wherein when interruption occurs, execution of the background processing by the background processor is interrupted while regular monitor processing is executed during a period in which background processing is interrupted. The time-consuming background processing is treated as a low-level processing task, and the regular monitor processing, as a high-level processing task. The low-level processing task is executed as a background processing during CPU idle time. Interruption of the background processing occurs ever 10-msec, during which the high-level processing task is executed. Accordingly, background processing and regular monitor processing are smoothly executed, and the CPU is thereby efficiently used.

17 Claims, 38 Drawing Sheets

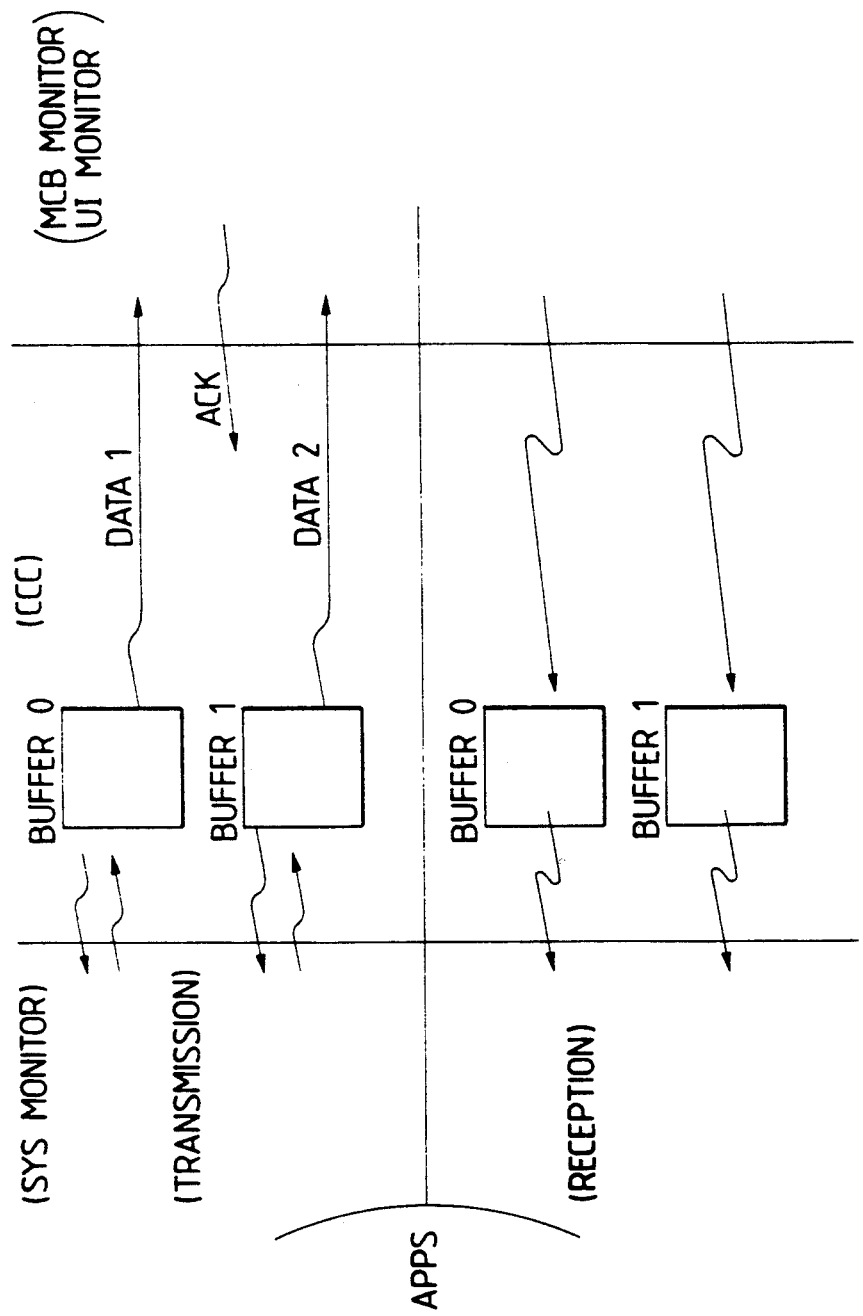

FIG. 17(b)

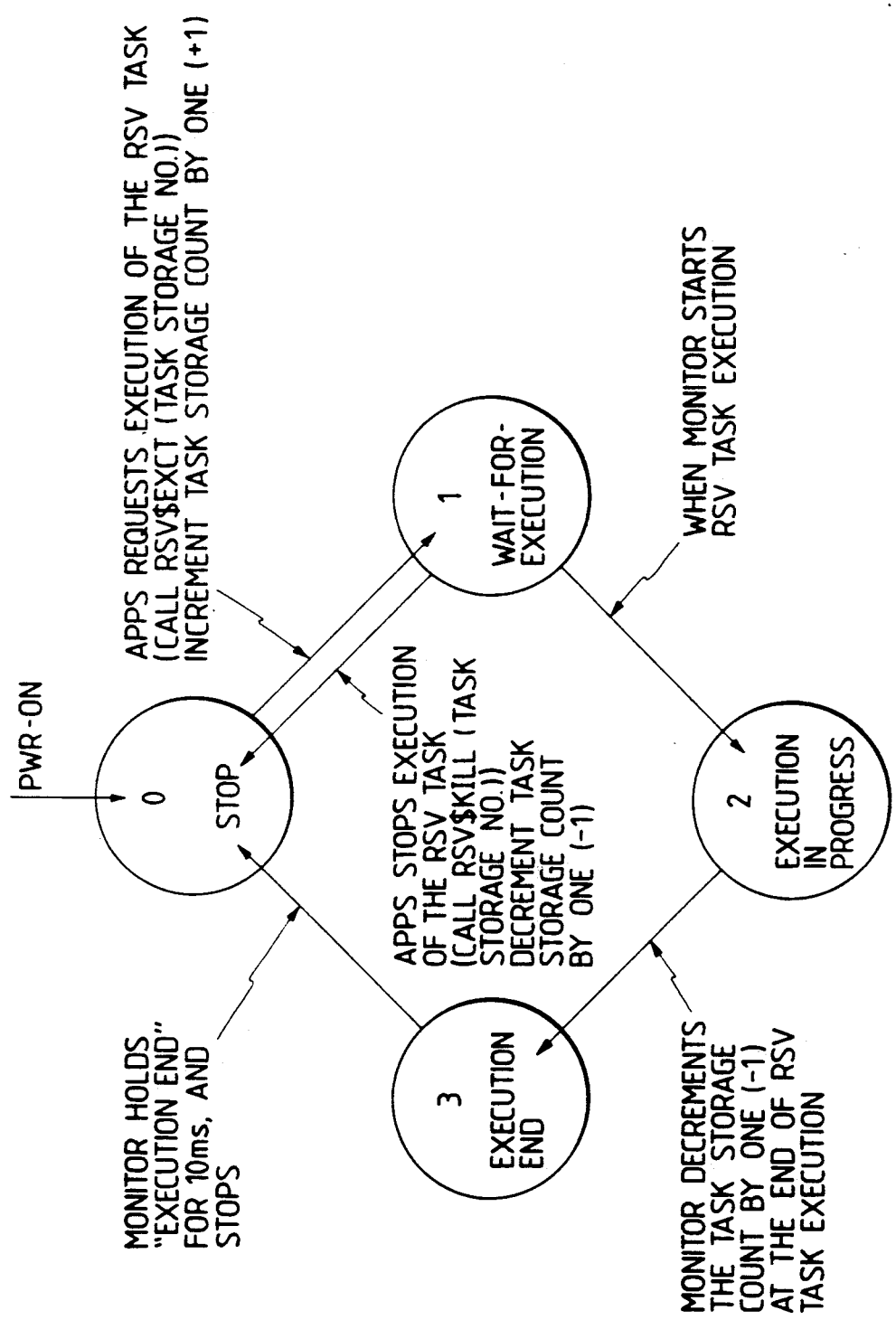

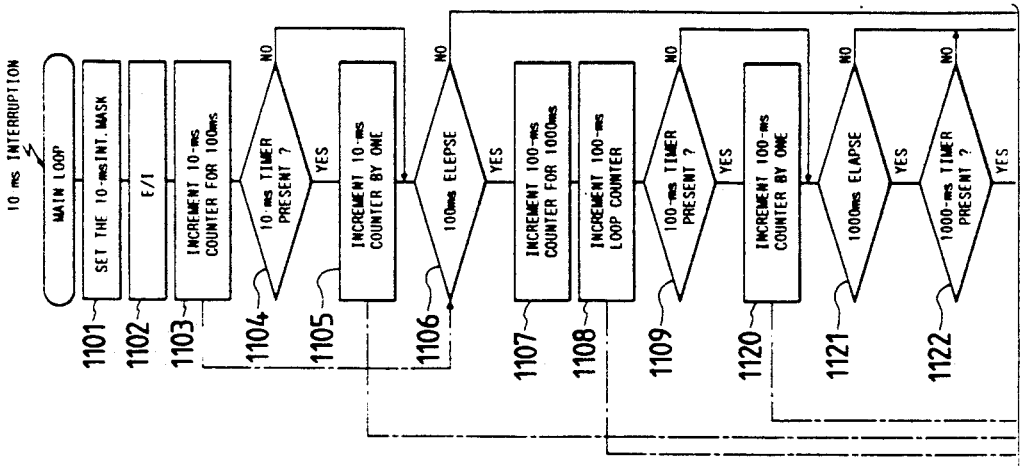
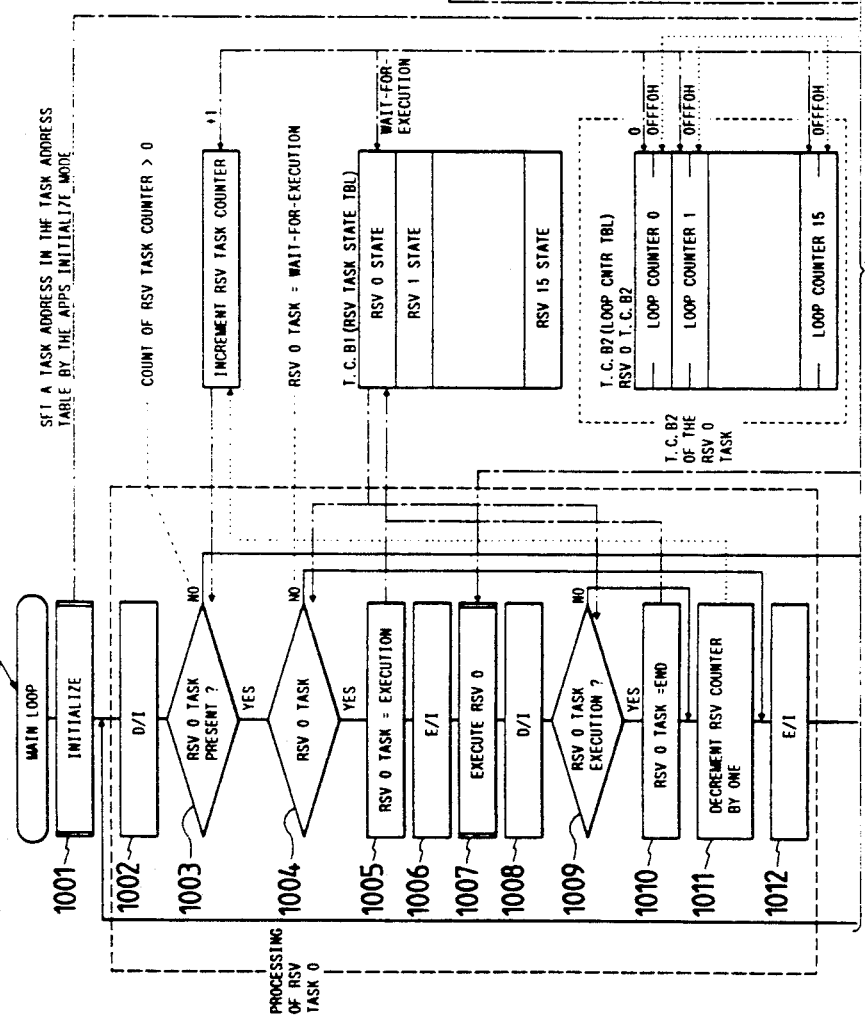
FIG. 24
| FIG. 24A |
| FIG. 24B |

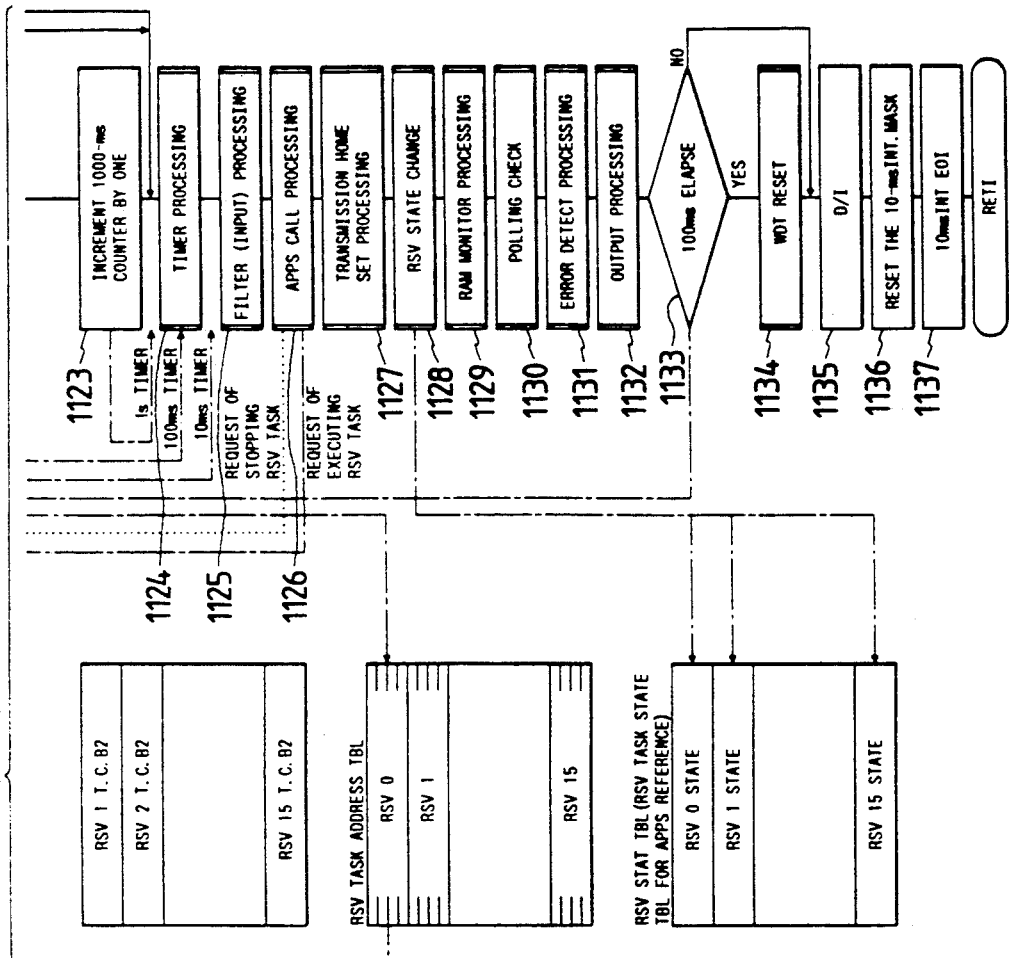
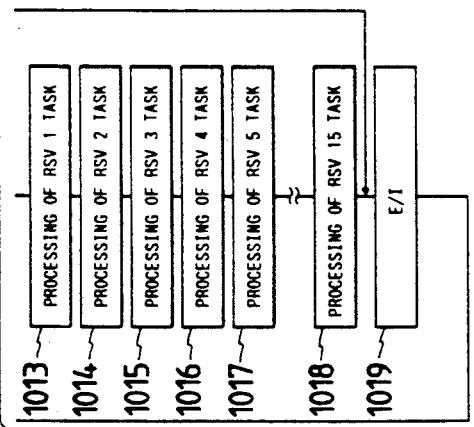
FIG. 24B

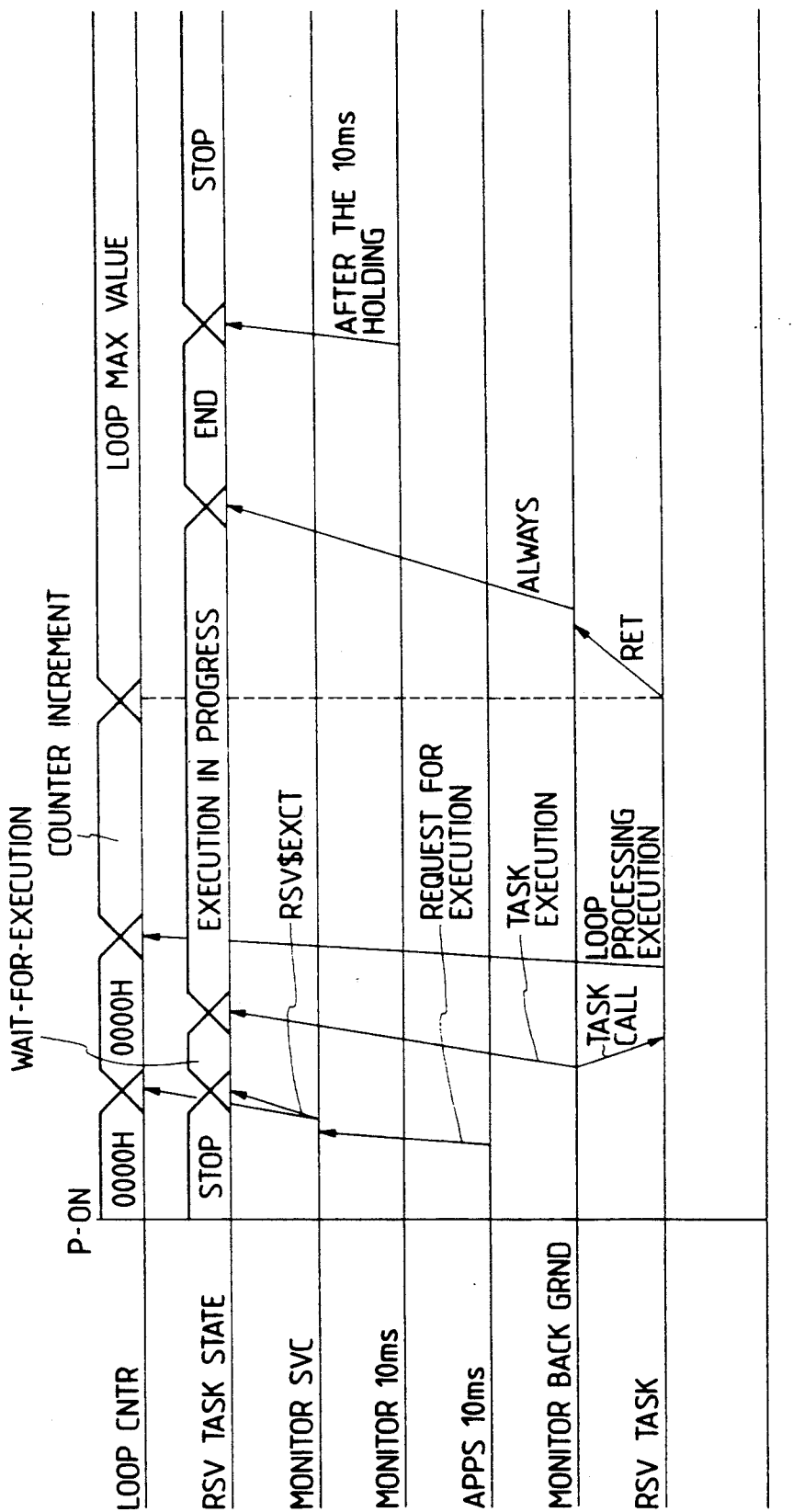

(INTERRUPTION IN "WAIT FOR EXECUTION")

(INTERRUPTION IN "EXECUTION IN PROGRESS")

MONITOR CHANNEL SYSTEM IN USE WITH A RECORDING APPARATUS

BACKGROUND OF THE INVENTION

The present invention relates to a control system for use with a recording apparatus, and more specifically to a monitor control system for use with a recording apparatus in which regular processing by a monitor will be executed a high priority interrupt during the processing of a task requiring a long processing time.

In recent years, electronic recording apparatus, such as copying machines and facsimiles, have remarkably improved in picture quality and reliability, and are operable with multi-functions. These apparatuses have found use in a variety of fields. Accordingly, the demands placed upon the apparatuses by users are increasing. For example, cost reduction, power saving and high speed operation are desired, in addition to high picture quality, multi-function, and high reliability. To satisfy such desires, in a copying machine, for example, a control system for the copying machine is divided into a plurality of sub-systems. Each sub-system executes necessary processings. A main system synthetically controls these sub-systems, thereby realizing effective processings of the overall control system of the copying machine.

In the sub-systems or the main system for synthetically controlling the overall system, the monitor consecutively executes a regular processing function including timer processing, input/output processing, transmission/reception processing, call processing of application software (referred to as APPS), and the like. The regular monitor processing function (referred frequently to as a regular monitor processing) is executed every 10 msec, thereby providing to secure a smooth control of the overall system.

A new user interface based on a CRT display, rather than a conventional console panel, has been developed and put into practice. In this user interface, various modes of edit and operation are interactively selected and set by manually touching related buttons displayed on the CRT display. When jamming occurs in the copying machine, the location of the jamming is indicated by successively lighting related lamps. Accordingly, the display must be frequently changed or switched, and processings for the display changes are required. A long time, for example, 100 to 200 msec, is required to process these display changes.

In the case of a color copying machine, there inevitably exist time consuming data processings tasks (referred frequently to as time-consuming processings), for example, tone reproduction control (TRC). TRC processing corrects the standard curve for each color by setting density, contrast, color balance, and the like. An extrodinarily long time, e.g., approximately 1000 msec, is required for TRC processing.

When such a time consuming task takes place, the CPU is occupied solely by the task, and cannot execute the regular monitor processing required to process display changes. This will be described in detail with reference to FIG. 26.

FIG. 26 is a timing chart which explains how trouble occurs in regular monitor processing when the CPU is already occupied by a time-consuming task.

As shown in FIG. 26(a), the monitor executes every 10 msec the regular processing including timer processing, input/output processing, transmission/reception processing, APPS call, and the like.

Let us consider a case that at time $t_1$, a timer is set to 30 msec, as shown in FIG. 26(b). In this case, the timer counts down the set value of 30 msec at 10-msec intervals, in the timer processing by the monitor. Specifically, 30 msec of the set value is counted down to 20 msec at time $T_2$, 10 msec at time $T_3$, and 0 at time $T_4$. Following the count-down operation, the processing associated therewith is executed, and terminates within 10 msec. As thus far presented, this case suffers from no particular trouble.

Consider, however, another case as shown in FIG. 26(c). At time $T_1$, in response to an interruption, the monitor transfers control of the CPU to a time consuming APPS immediately after the monitor completes the timer processing. The APPS then occupies the CPU for a period from $T_1$ to $T_5$. However, at time $t_1$ immediately after the monitor terminates the timer processing, the timer was set to 30 msec. Timer processing consists of several segments, such as setting timer value, a counting down from the set value to zero and executing related processing upon reaching zero. Each of these segments may be appropriately per formal by calling the timer processing stored in memory.

As shown in FIG. 26(D), when the APPS occupies the CPU for a long time, the timer proeecessing may be interrupted before counting down and remain at the set value until the APPS processing terminates. At time $T_5$ when the APPS processing terminates, the timer starts counting down with a value counted down to 20 msec. At time $T_6$, the count is 10 msec, and at time $T_7$, counting down reaches zero and the segment terminates. Thus, the timer counting down segment has taken 60 msec from the setting of the timer, rather than the prescribed 30 msec.

As described above, once the monitor transfers control of the CPU to the APPS, the APPS will continue using the CPU until APPS processing is no longer required, regardless of the length of time required for APPS processings. Thus, during exclusive uses of the CPU by the APPS, the monitor cannot perform regular processing.

The time of 10 msec must be exact, and hence in the control system, the generation of 10 msec is treated as top priority.

For other timers whose set value is very long, such as an auto-clear timer or an auto-power-off timer, an exact timer processing can be executed in the following manner. A factor of the 10-msec intervals is stored. A timing process then counts down by 10-msec intervals, generating an interrupt for each interval. The number of interrupts is compared with the stored factor value, and a difference between them is calculated. When the difference is 0 or — (minus), the control system decides that the timing process count-down has terminated, and immediately executes a corresponding time-out processing.

Similar to the situation where an executed time consuming APPS prevents the execution of timer processing by the monitor is the case of a timer having a timer value set just before the APPS ends, viz., a short set time, where the factor of the 10-msec interval that is added to the long processing time of the APPS is instead subtracted from it. As a result, the count-down immediately terminates, resulting in an inexact timer processing.

SUMMARY OF THE INVENTION

With the view of overcoming the drawbacks of the prior art, the present invention has an object to provide a monitor control system for use in a recording apparatus which can reliably execute regular monitor processings during the execution of a time-consuming task requiring 10 msec or more.

Another object of the present invention is to provide a monitor control system for use in a recording apparatus which can execute the time-consuming task without interfering with regular monitor processings.

Yet another object of the present invention is to provide a monitor control system for use in a recording apparatus which can effectively use a CPU contained in the monitor control system.

A further object of the present invention is to provide a monitor control system for use in a recording apparatus which provides communication processing in a decentralized CPU system.

According to the present invention, there is provided a monitor control system for use in a recording apparatus, as shown in FIG. 1, comprising an interrupt processor 1 for executing regular monitor processing as an interrupt recurring at a predetermined time interval; and a background processor 2 constantly executing background processing, wherein when an interrupt occurs, the execution of the background processing by the background processor is interrupted, while the regular monitor processing is executed during the period in which the background processing execution is interrupted. The monitor control system further comprises a communication processor 3 which includes a high speed communication processor configured with a contention bus system and a low speed communication processor configured with a polling system.

In the present invention thus arranged, time-consuming tasks, such as calculating task IPS, preparation of a TRC conversion table, CRT display change, are treated as low priority level processings (referred frequently to as low-level processings), i.e., background processings. The regular processings that must be regularly executed, such as timer processing, input/output processing, and transmission/reception processing, are treated as high priority level processings (referred frequently to as high-level processings). The background processing as the low-level processing is interrupted by an interrupt that is generated every 10 msec. This interrupt will be frequently referred to as a 10-msec interruption. After the high-level processing ends, the background processing is executed again. Thus, an idle time on which the regular processing is not executed by the monitor is used for the background processing. For this reason, even if a time-consuming task is being executed, the regular monitor processing may be reliably performed. Further, the time-consuming task may be smoothly executed, because the idle time is used for executing it.

The high-speed communication processor with a contention bus system and the low-speed communication processor with a polling system are selectively used in the following manner. The polling communication system is used for communication between the monitor, the image input terminal (IIT) and the image processing system (IPS), which may be time consuming processes. The contention bus communication system is used for the communication between the machine control board (MCB) and the user interface (UI), which must be processed for a short time. Accordingly, effective communication processing may be attained by making full use of the advantageous features of the decentralized CPU system.

Other objects and features of the present invention will be apparent when carefully reading the following description in connection with the accompanying drawings, in which:

BRIEF DESCRIPTION OF THE DRAWINGS

FIGS. 16, 17(a) and 17(b) are explanatory diagrams for explaining an LNET communication;

FIG. 22 is an explanatory diagram showing a state transition;

FIGS. 24(a) and 24(b) are a flowchart showing a main loop processing and a 10-msec interruption loop processing;

FIGS. 25(a) through 25(c) are timing charts showing two states of an RSV task processing, an interruption in the "wait-for-execution" in the regular monitor processing and an interruption in the "execution in progress"

DETAILED DESCRIPTION OF THE PREFERRED EMBODIMENT

The following description is an elaboration of a copying machine incorporating the present invention.

The description in this specification is divided into the following sections and subsections.

Contents (I) INTRODUCTION
(I-1) System Configuration
(I-2) Electrical Control System
 (A) Hardware/software Architecture
 (B) State Division
(II) SYSTEM DETAILS
(II-1) General
(II-2) System Modules
(II-3) Data Transfer
(III) MONITOR CONTROL SYSTEM
(III-1) Modules of System Monitor
 (A) Task Control Module
 (B) 9600 BPS Communication Module
 (C) LNET Communication Module
(III-2) Task Control Status Transition
(III-3) Task Table
(III-4) TRC Setting and Computing Processing Flow
(III-5) RSV Task State Transition
(III-6) Interrupt and Background Processings
(III-7) Background Loop and Interrupt Loop Processing Flow
(III-8) Timing Chart

(I) INTRODUCTION

(I-1) System Configuration

Figure 1:
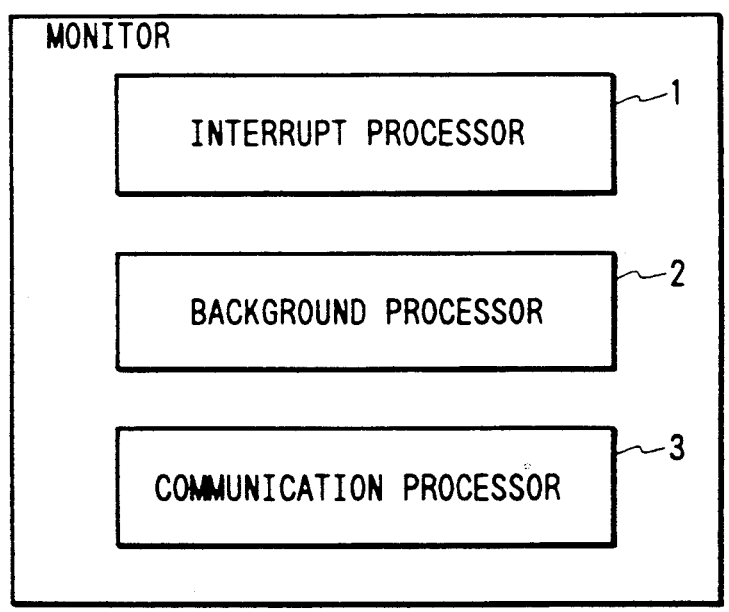
FIG. 1 is a block diagram showing a configuration of an example of a gray balance control system employed in an image forming apparatus according to the present invention.
Figure 2:
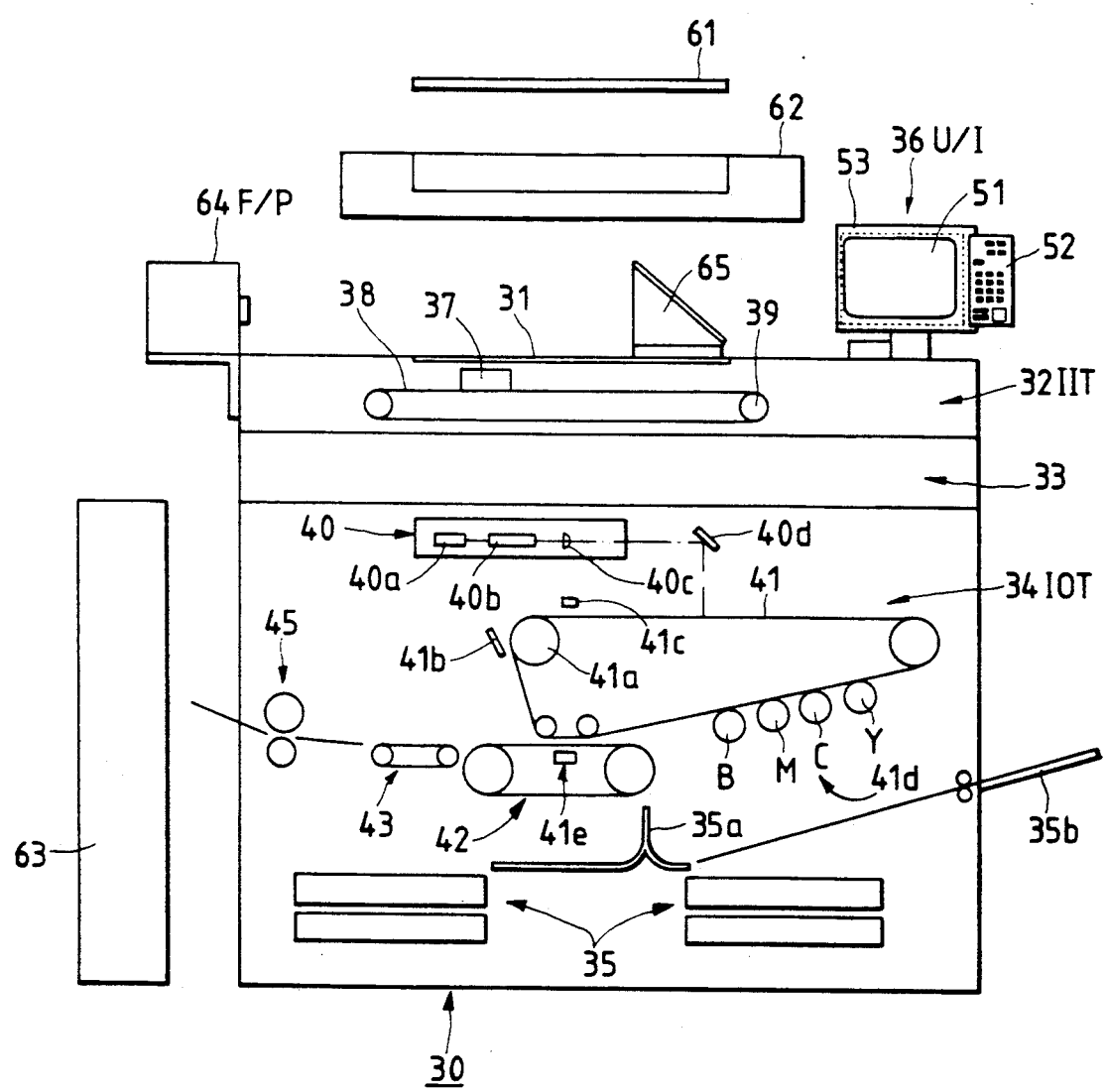
FIG. 2 is a logitudinal sectional view showing an overall structure of a color copying machine incorporating the present invention.

FIG. 2 shows a configuration of an overall system of a color copying machine incorporating the present invention. In the color copying machine, a base machine 30 is made up of a platen glass 31, image input terminal (IIT) 32, electric control housing 33, image output terminal (IOT) 34, tray 35, and user interface (U/I) 36. The base machine 30 optionally includes an edit pad 61, automatic document feeder (ADF) 62, sorter 63, and film projector (F/P) 64.

An electrical hardware is required for controlling the IIT, IOT, U/I, etc. The electrical hardware is divided into a plurality of circuit sections with different signal/data processing functions, such as IIT, IPS for processing the output image signals of the IIT, U/I, and F/P. These circuit sections are assembled into circuit boards, respectively. Together with an SYS board for controlling the above circuit boards, and an MCB (machine control board) for controlling the IOT, ADF, sorter, etc., these circuit boards are housed in the electrical control housing 33.

The IIT 32 is made up of an imaging unit 37, and the combination of a wire 38 and a drive pulley 39, which is for driving the imaging unit 37. The imaging unit 37 reads a color image on an original in terms of image signals of the primary colors, blue (B), green (G) and red (R), by using a CCD sensor and color filters, and converts them into digital image signals, and sends the separated color image signals to an image processing system (IPS). In the IPS, the B, G and R signals from the IIT 32 are converted into toner primary colors yellow (Y), cyan (C), magenta (M), and black (K). The Y, C, M and K signals are subjected to various processings for improving the reproducibility of color, gradation, definition, and the like. Further, the gradation toner signal of each process color is converted into an on/off or two-level toner signal, and the two-level signals are transferred to the IOT 34.

In the IOT 34 containing a scanner 40 and a photosensitive belt 41, a laser output unit 40a converts the image signals from the IPS into light signals. The light signals travel through an optical path including a polygon mirror 40b, F/θ lens 40c and reflecting mirror 40d, and reaches the photosensitive belt 41, and forms a latent image corresponding to the original image on the surface of the belt. The photosensitive belt 41 is driven by a drive pulley 41a. A cleaner 41b, charger 41c, developing units 41d for the primary colors Y, M, C and K, and a transfer unit 41e are disposed around the belt 41. A tow roll loop 42 is disposed close to the transfer unit 41e, as shown. The tow roll loop 42 picks up a sheet of paper as is transported along a paper transfer path 35a from a tray 35, and in cooperation with the transfer unit transfers color toners on the paper. In the case of the full color copy of the 4 pass color type, the tow roll loop is turned four times, and the color toners are transferred on the paper in the order of Y, M, C and K. The paper bearing the transferred color toner image is transported through a vacuum transfer belt 43 to a fixing or fusing unit 45, and then is ejected outside the base machine. If necessary, a single sheet inserter (SSI) 35b may feed a sheet of paper to the paper transfer path 35a.

The U/I 36 is used by a user when he selects a desired function and sets up the conditions to exercise the function. The U/I 36 is provided with a color display 51, and a hard control panel 52 located by the display. In combination with an infrared-ray touch board 53, it enables the user to directly designate necessary functions by soft buttons on the display screen.

The option units available for the base machine follows. The first optional unit is an edit pad 61 as a coordinates input device, which is placed on the platen glass 31. The edit pad enables a user to variously edit images with the aid of a pen or by a memory card. Further, the ADF 62 and the sorter 63 may optionally be used.

A mirror unit (M/U) 65 may further be installed. In this instance, it is placed on the platen glass 31. In association with this, the F/P 64 is installed. A color image of a color film, for example, that is projected by the F/P 64, is read by the imaging unit 37 of the IIT 32. With the combination of the M/U 65 and F/P 64, the images of a color film can be copied directly from the color film. The object to be imaged may contain negative and positive films, and slides. Additionally, an auto focusing device and a correction-filter auto exchanging device are installed to the copying machine under discussion.

(I-2) Electrical Control System

This section will handle hardware architecture, software architecture and state division in an electrical control system of the color copying machine under discussion.

(A) Hardware Architecture and Software Architecture

A color CRT as an U/I, though used as the U/I in the instant color copying machine, needs a larger amount of the data for color display than a monochromatic CRT.

Attempt to build a more friendly UI by creating layout of a display screen and display change also results in an increased amount of necessary data.

Use of a CPU with a large memory requires a large board. The large board creates additional problems. It is difficult to house it in the base machine. The large board makes it difficult to alter the design of the copying machine. Further, the large board increases the cost to manufacture.

To cope with the increase of data amount, in the instant copying machine, the data processing function by the CPU is decentralised, with the remotes of the circuit functions, such as the CRT control, that may be made common with other apparatuses or devices.

Figure 3:
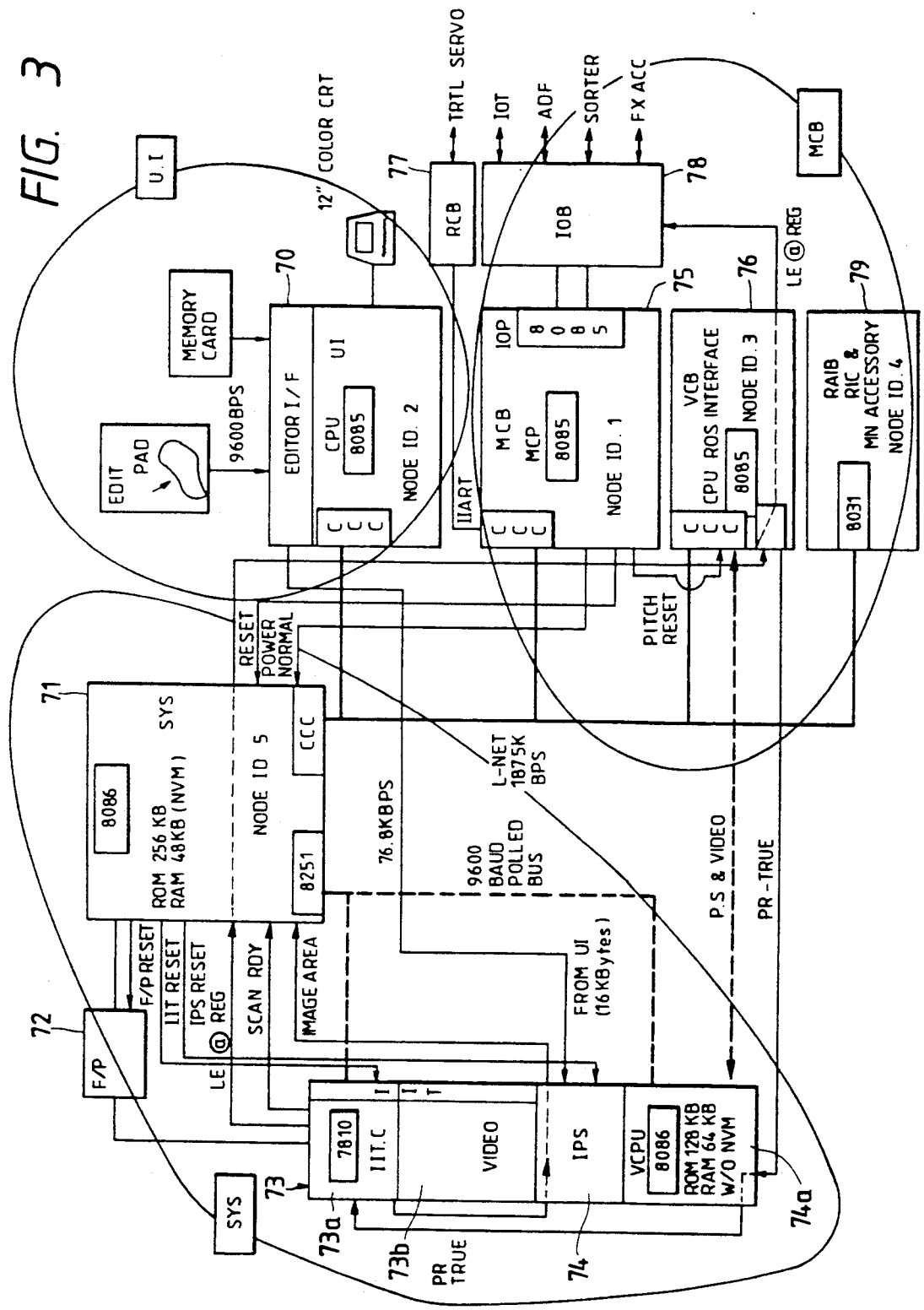
FIG. 3 is an explanatory diagram showing a hardware architecture.

A hardware of the electrical system, as shown in FIG. 3, is composed of a UI system, SYS system and MCB system. The UI system contains a UI remote 70. In the SYS system, an F/P remote 72 for controlling the F/P, IIT remote 73 for reading an image of an original, and an IPS remote 74 for executing various image processings are contained and independently execute their own data processings. The IIT remote 73 includes an IIT controller 73a for controlling the imaging unit, and a VIDEO circuit 73b for digitizing the read image signals and sending the digitized image signals to the IPS remote 73b. It, together with the IPS remote 74, is controlled by a VCCPU 74a. An SYS (system) remote 71 is provided as a control unit to control the remotes as mentioned and to be given later.

The SYS remote 71 requires a memory of a large memory capacity, because a program to control the display changes in the UI, and others must be stored. A 8086 16-bit microprocessor is used for the SYS remote 71. If required, a 68000 microprocessor may be used.

The MCB system is composed of a VCB (video control board) remote 76, RCB remote 77, IOB remote 78, and an MCB (master control board) remote 75. The VCB remote 76, serving as a raster output scan (ROS) interface, receives from the IPS remote 74 a video signal to form a latent image on the photosensitive drum by a laser beam, and sends the video signal to the IOT. The RCB remote 77 is for the servo system of the transfer unit (turtle). The IOB remote 78 serves as an I/O port for the IOT, ADF, sorter, and accessory. The MCB remote 75 synthetically controls the decentralised accessory remote 79.

Each remote in the drawing of FIG. 3 is constructed with a single board. In the figure, a bold continuous line indicates a high speed communication network LNET of 187.5 kps; a bold broken line, a master/slave type serial communication network of 9600 bps; and thin continuous lines, hot lines as transmission lines for control signals. A line 76.8 kbps indicates a dedicated line for transmitting graphic data depicted on the edit pad, copy mode data entered from the memory card, and graphic data in the edit area from the UI remote 70 to the IPS remote 74. CCC (communication control chip) indicates an IC for supporting a protocol of the high speed communication line LNET.

As described above, the hardware architecture is composed of the UI system, SYS system, and MCB system. The processings shared by those systems will be described with reference to a software architecture of FIG. 4. Arrowheads indicate the directions of data transmission performed through the high speed communication network LNET of 187.5 kbps and the master/slave type serial communication network of 9600 bps, and the directions of control signals flowing through the hot lines.

The UI remote 70 is made up of an LLUI (low-level UI) module 80 and a module (not shown) for processing the data of the edit pad and the memory card. The LLUI module 80, that is similar to a called CRT controller, is a software module for displaying an image on a color CRT screen. The displaying of images on the display screen is controlled by an SYSUI module 81 and an MCBUI module 86. This fact clearly indicates that the UI remote may be made common with another apparatus or device. The reason for this is that how to lay out the display screen and how to change the display depend on the type of the apparatus, but the CRT controller is used in combination with the CRT.

The SYS remote 71 is made up of three modules, SYSUI module 81, SYSTEM module 82, and SYS.-DIAG module 83.

The SYSUI module 81 is a software module for controlling the display change. The SYSEM module 82 contains a software for the F/F (feature/function) for recognizing which coordinate is selected on the software panel and what display presents the software panel containing the selected coordinates, viz., what job is selected, a software for finally checking the job as to whether or not contradiction exists in the copy exercising conditions, and a software for controlling the transfer of various types of data, such as F/F select, job recovery, and machine state, to and from other modules.

The SYS.DIAG module 83 operates in a customer simulation mode in which the copying operation is performed in a diagnostic state for self-test purposes. In the customer simulation mode, the color copying machine under discussion operates as it operates in a normal copying operation mode. Accordingly, the DIAG module 83 is substantially the same as the SYS.DIAG module 82. However, it is used in a special state, or the diagnostic state. For this reason, the DIAG module is depicted separately from the SYSTEM module 82, but they partially overlap.

An IIT module 84 for controlling a stepping motor used in the imaging unit is stored in the IIT remote 73. An IPS module 85 for executing various processings is stored in the IPS remote 74. These modules are controlled by the SYSTEM module 82.

The MCB remote 75 stores software modules, such as an MCBUI module 86 as a software for controlling the display change when the color copying machine or color copier is placed in a fault state such as the diagnostic, auditron and jamming, an IOT module 90 for executing the processings necessary for the copying operation, such as photosensitive belt control, developing unit control, and fuser control, ADF module 91 for controlling the ADF, and SORTER module 92, and a copier executive module 87 for managing the software modules, dia. executive module 88 for executing a variety of diagnosises, and an auditron module 89 for processing charge calculation by accessing an electronic counter with a password.

The RCB remote 77 stores a turtle servo module 93 controlling the operation of the turtle. The module 93 is under control of the IOT module 90, in order to control the transfer process of the Zerography cycle. In figure, the copier executive module 87 and the dia. executive module 88 are depicted partially overlapping with each other for the same reason as that why the SYSTEM module 82 and the SYS.DIAG module 83 overlap.

Figure 5A:
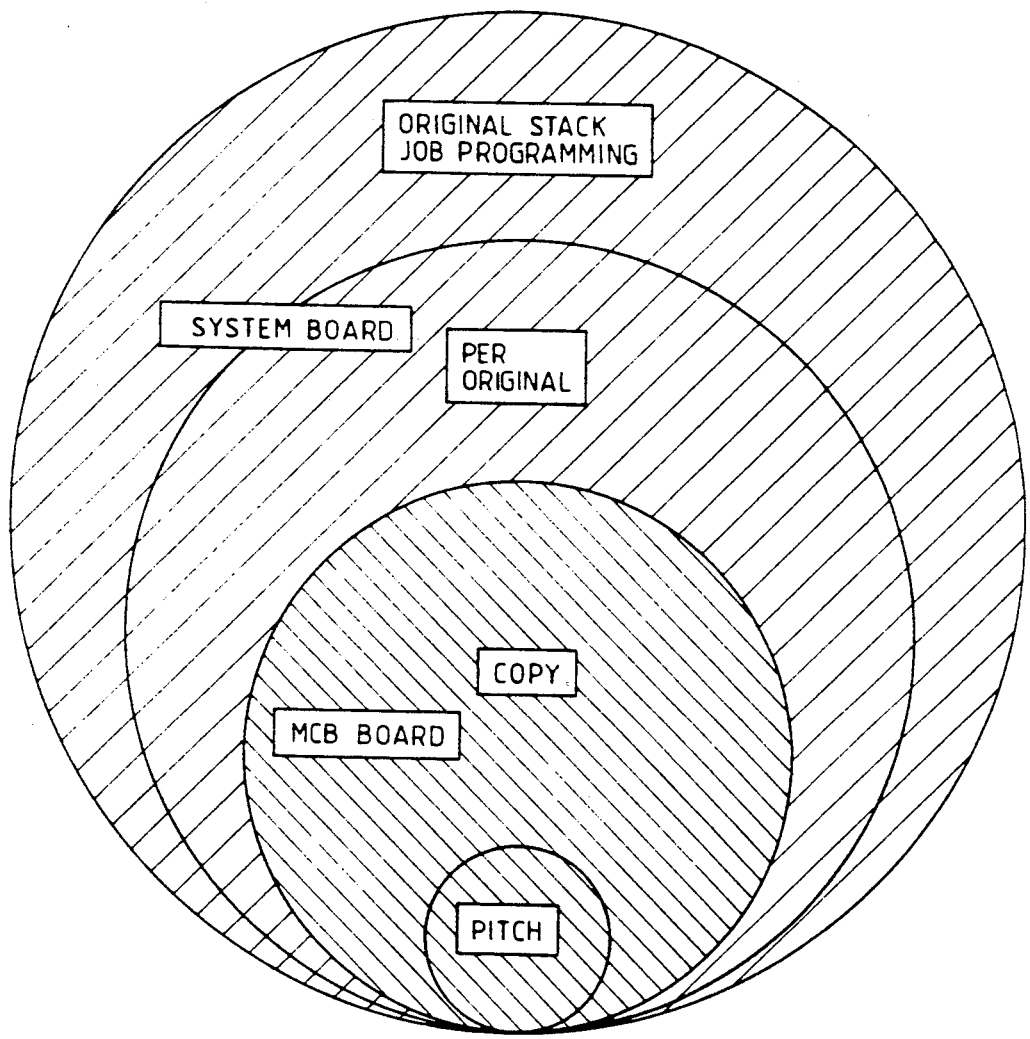
FIGS. 5(a) through 5(e) are explanatory diagrams showing copy layers.

The shared processings will be described while tracing a sequence flow of a copying operation. The copying operation, except for the difference of colors, consists of repetitive similar operations, and hence it may be divided into some layers, as shown in FIG. 5(a).

An operation unit, called pitch, is repeated to make a sheet of color copy. The operation for making a mono color copy may consist of processings describing how to operate the developing unit, transfer unit, and the like, and how to detect jamming. The repititive applications of a sequence of the pitch processings to three colors Y, M and C makes a three-pass color copy. When it is applied to four colors Y, M, C and K, a four-pass color copy is made. This sequence of copying operations forms a copy layer. In the copy layer, the toners of three colors are transferred to the paper, the transferred color toner image is fused, and the copy paper or the paper bearing the fused color image is delivered outside the base machine. The processings up to this point are under control of the copier executive module 87.

The IIT module 84 and the IPS module 85 in the SYS system are also used in the stage of the pitch processings. To this end, the IOT module 90 communicates with the IIT module 84 by using two types of signals, a PR-TRUE signal and a LE@REG signal. More specifically, a PR (pitch reset) signal providing a reference timing for the control of the IOT is recursively generated by the MCB every time the photosensitive belt rotates by $\frac{1}{2}$ or $\frac{1}{3}$ turns. To attain an effective use of the photosensitive belt and increase a copy speed, the motion pitch of the belt is divided in accordance with the size of paper. For example, for paper of A3, it is driven at the rate of 2 pitches, and for paper of A4, it is driven at the rate of 3 pitches. The period of the PR signal generated every pitch is long, 3 sec. for the 2-pitch rate, and is short, 2 sec. for the 3-pitch rate.

The PR signal generated by the MCB is distributed to the necessary portions within the IOT, such as a VB remote handling mainly the VIDEO signal, by way of the hot lines.

The VCB, containing a gate circuitry, selects only the pitch signal allowing the imaging within the IOT, viz., allowing the photosensitive belt to be exposed to an image light, and sends it to the IPS remote. This signal is a PR-TRUE signal. The data to generate the PR-TRUE signal on the basis of the PR signal that is received through the hot line from the MCB, is transferred from the MCB through the LNET.

During the period on which the image carinot be projected on the photosensitive belt, an idle pitch of 1 pitch is used for the photosensitive belt. No PR-TRUE signal is outputted for such an idle pitch. As such a pitch requiring generation of no PR-TRUE signal, one may enumerate a period from an instant that the transfer unit delivers the transferred copy paper out of the machine till the next paper reaches the transfer unit. In the case of a long paper of A3 size, for example, if it is delivered out of the transfer unit immediately after the toner image transfer onto the paper is completed, the leading end of the paper hits the entrance of the fuser. At this time, the paper is shocked and with the shock, the transferred toner image is possibly damaged. To avoid this problem, following completion of the transfer of the image on the large paper, the paper is rotated by one turn at a constant speed while being held by a grip bar to be given later, and then is transferred to the next stage. It is for this reason that the skip of 1 pitch is required for the photosensitive belt motion.

No PR-TRUE signal is generated also during a period from the copy start by a start key till a cycle-up sequence is completed, because during this period, the reading of an original image is not yet carried out and hence the photosensitive belt cannot be exposed to an image light.

The PR-TRUE signal outputted from the VCB remote is received by the IPS remote, and is also applied to the IIT remote. In the IIT remote, it is used as a trigger signal for scan start of the IIT.

The pitch processings in the IIT remote and the IPS remote may be synchronized with the operation of the IOT. At this time, a video signal to modulate a laser beam that is used for forming a latent image on the photosensitive drum is transferred between the IPS remote 74 and the VCB remote 76. The video signal received by the VCB remote 76, which is a parallel signal, is converted into a serial signal. Then, the serial signal is directly applied, as a VIDEO modulation signal, to the laser output section 40a through the ROS interface.

The above sequence of pitch operations is repeated four times, to form a 4-pass color copy, and one cycle of copying operations is completed.

The signal transmissions and the timings of them in a copying process between the outputting of image signals as read by the IIT to the IOT and the image transfer on a sheet of paper at the transfer point will be described with reference to FIGS. 5(b) through 5(e).

Figure 5B:
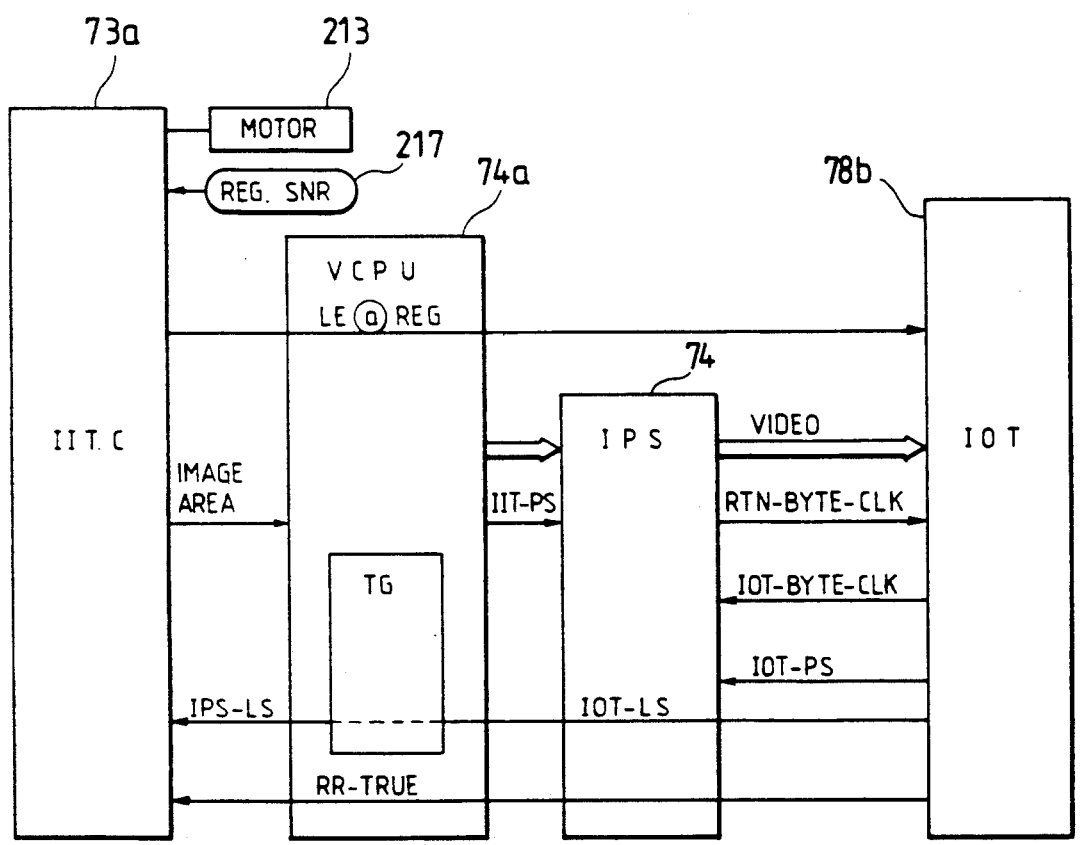
Figure 5C:
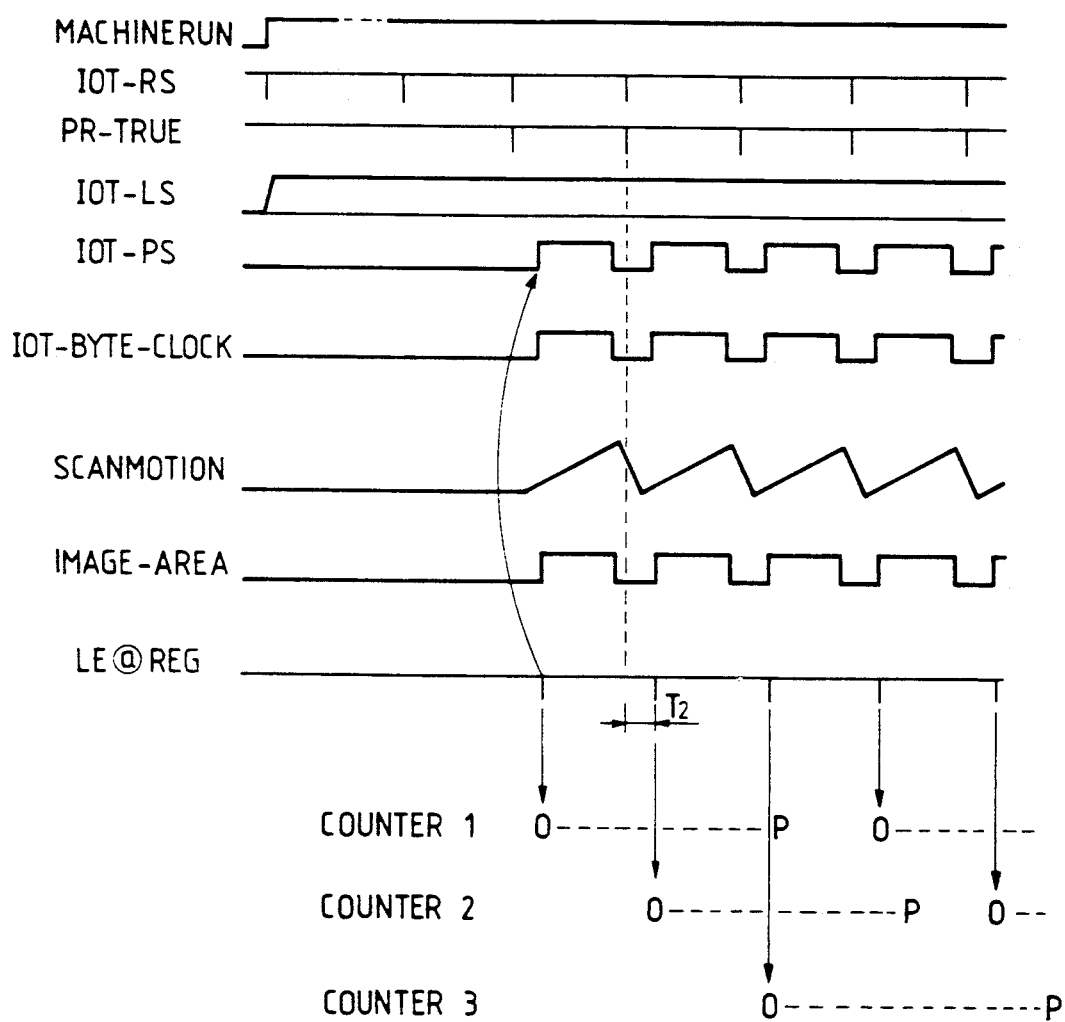
Figure 5D:
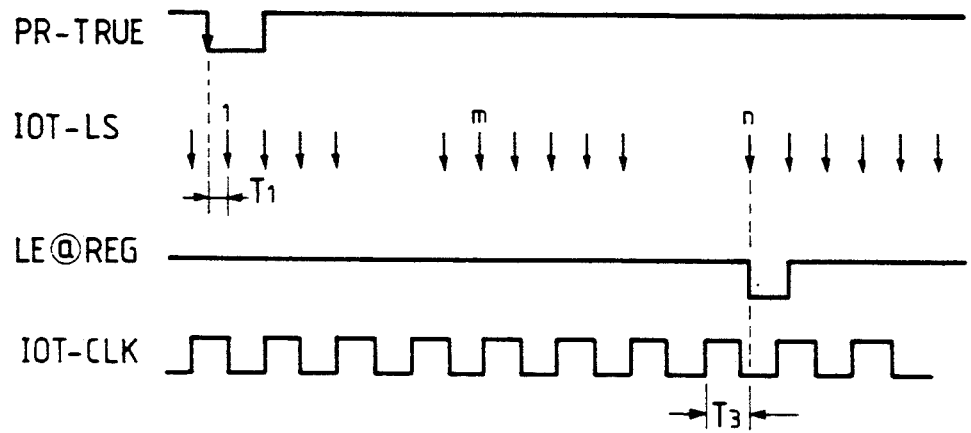

When receiving a command of a start job from the SYS remote 71, the operation of the IOT 78b enters a cycle-up sequence, such as drive of a main motor and power-on of a high voltage power supply, as shown in FIGS. 5(b) and 5(c). The IOT 78b produces a PR (pitch reset) signal, in order to form a latent image of a length corresponding to a paper length on the photosensitive belt. For example, a 3-pitch PR signal is generated for the A4 size, and a 2-pitch PR signal, for the A3 size. Upon completion of the cycle-up sequence in the IOT 78b, a PR-TRUE signal is applied to the IIT controller 73a in synchronism with the PR signal, in connection with only the pitch requiring the imaging.

From the IOT 78b, an IOT-LS (line sink) signal as outputted every one-line turn of the ROS (raster output scan) is sent to a timing generator (TG) in the VCPU74a. An IPS-LS whose phase is apparently advanced by a delay corresponding to a total of pipe lines of the IPS with respect to the IOT-LS signal, is transferred to the IIT controller 73a.

When receiving the PR-TRUE signal, the IIT controller 73a enables a counter, and causes it to count the IOT-LS signal. When a count by the counter reaches a predetermined value, a stepping motor 213 for driving the imaging unit 37 is started up, and the imaging unit starts to scan an original. The counter further continues its counting, and after T2 sec., an LE@REG signal is outputted at the start position of reading the original, and is sent to the IOT 78b.

In respect to the read start position, a position of a reginsor 217 (near the reg. position, more exactly located at a position separated by about 10 mm from the reg. position toward the scan side) is detected, and a true reg. position is calculated using the detected position of the reginsor 217. At the same time, a normal stop position (home position) can also be calculated. The reg. positions of the copying machines differ from one another due to a mechanical dispersion. To cope with this, the corrected values are stored in an NVM (nonvolatile memory). When the true reg. position and the home position are calculated, the stored values are used for their correction, thereby to obtain a correct original read start position. The corrected value may be altered by electrically re-programming it in factories or by servicemen. The reason why the position of the reginsor 217 is separated by about 10 mm from the true reg. position toward the scan side is that for easing the adjustment and simplifying a software, a minus value can be always used for the correction.

The IIT controller 73a outputs an IMAGE-AREA signal in synchronism with the signal LE@REG. A length of the IMAGE-AREA signal is equal to the scan length that is defined by a start command that is transferred from the SYSTEM module 82 to the IIT module 84. More specifically, when a document size is detected for the copying operation, the scan length is equal to the document length. When a magnification is designated for the copying operation, the scan length is determined by a divisor of a copy paper length and a magnification (100% is set at 1). The IMAGE-AREA signal is applied to the VCPU 74a. The VCPU 74a outputs it as an IIT-PS (page sink) for transmission to the IPS 74. The IIT-PS signal indicates time to execute an image processing.

When the LE@REG signal is outputted, data of one line of the line sensor is read in synchronism with the IOT-LS signal. The data as read is transferred to the VIDEO circuit (FIG. 3) where it is subjected to various correction processings and the A/D conversion. The output data signal of the VIDEO circuit is then transferred to the IPS 74. In the IPS 74, the video data of one line is transferred to the IOT 78b in synchronism with the IOT-LS signal. At this time, a signal RTN-BYTE-CLK as an inverted signal of IOT-BYTE-CLK, together with the data, is returned to the IOT, and the data and clock are also delayed, thereby to secure a reliable synchronism.

When the signal LE@REG is inputted to the IOT78b, the video data is transferred to the ROS in synchronism with the IOT-LS signal, so that a latent image is formed on the photosensitive belt. When receiving the signal LE@REG, the IOT 78b starts to count by the signal IOT-CLK with reference to the timing of the signal LE@REG. The servo motor of the transfer unit is controlled so that the leading end of paper is positioned at the transfer point defined by a predetermined count. As seen from FIG. 5(d), the PR-TRUE signal generated by the rotation of the photosensitive belt is not synchronized with the IOT-LS signal outputted by the rotation of the ROS, inherently. Therefore, when the signal PR-TRUE is received, the count starts at the next IOT-LS, the imaging unit 37 is driven at a count "m", and the signal LE@REG is outputted at a count "n", the signal LE@REG is delayed by time T1 behind the signal PR-REG. A maximum of this delay is a period for one line sync. In the case of the full color copy of the 4-pass color type, the delay is accumulated and the accumulation results in a color displacement.

Figure 5E:
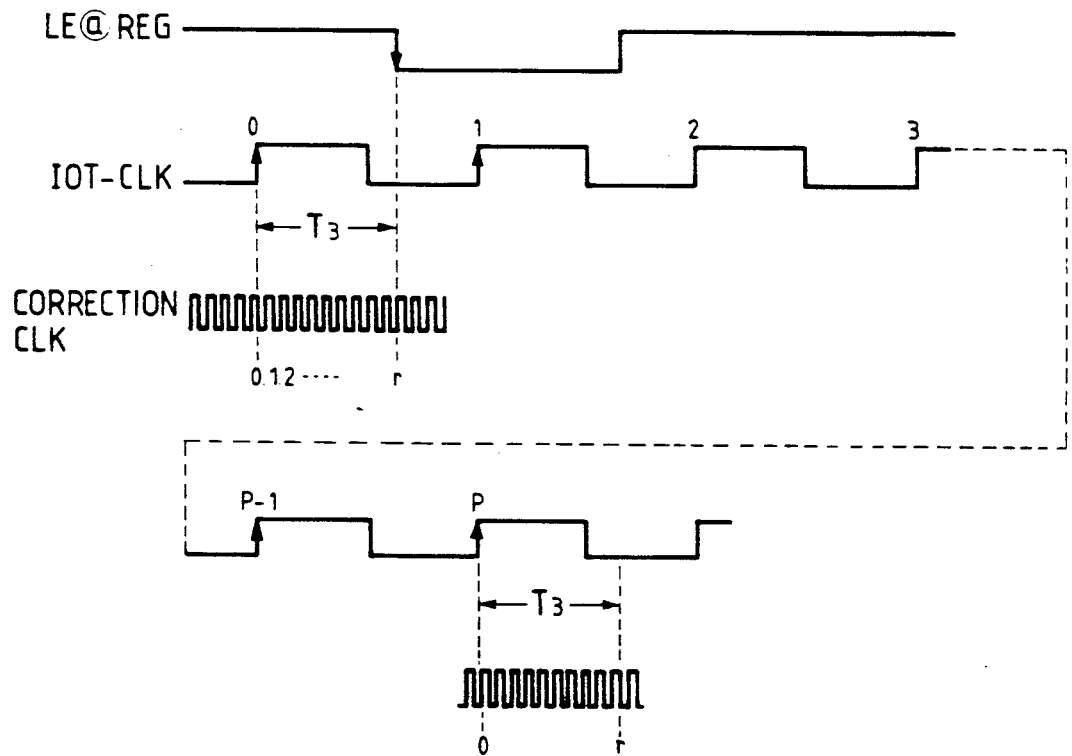

As a measure taken for the above problem, as shown in FIG. 5(c), when the first signal LE@REG reaches, the counter 1 starts to count, and when the second and third signals LE@REG reach, the counters 2 and 3 start to count. When those counters count "p" up to the transfer point, the counters are cleared. For the fourth count and the subsequent ones, these counters start to count in a similarly way. As shown in FIG. 5(e), when the signal LE@REG reaches, time T3 lasting from the pulse of the IOT-CLK immediately before the signal LE@REG is counted in accordance with a correction clock. A latent image formed on the photosensitive drum approaches to the transfer point and a count by the counter based on the signal IOT-CLK reaches the count "p". At the instant that the count "p" is reached, the counting based on the correction clock starts. The sum of it and a count "r" corresponding to the time T3 indicates a correct transfer point. This is introduced into the control of the counter that is exclusively used for controlling a transfer point (timing) of the transfer unit. In this way, the servo motor of the transfer unit is controlled so that the leading end of the paper is exactly synchronized with the signal LE@REG.

Following the processings described above that are categorized into the copy layer, another processing is executed. The processing is for setting the number of copies, viz., the number of jobs (each job for one copy) to be executed for a sheet of original. This is executed in a per original layer. There is a further layer as a job programming layer to change parameters in jobs. More exactly, the job programming layer checks as to whether or not the ADF is used, a color in a part of an original is changed, and the one-side magnification function is operated. These layers of the per original and the job programming are controlled by the SYS module 83 in the SYS system. Accordingly, the SYSTEM module 82 checks and confirms the jobs transferred from the LLUI module 80, generates necessary data, and transfers a message containing the job to the IIT module 84 and the IPS module 85 through the 9600 bps serial communication network, and also transfers the same to the MCB system through the LNET.

As seen from the foregoing description, the controls that can be independently processed and can be made common with another apparatus or device are decentralised into the remotes. Those remotes are categorized into the UI system, SYS system and the MCB system. The modules for controlling the copying machine are determined in accordance with the layers of the copying processings. This approach brings about many advantageous features. The design work of the electrical control system of the copying machine may be classified and itemized. The developing techniques, such as software, can be standardized. The time limit of delivery and the cost to manufacture can be exactly predicted. When some specifications are changed, it is only needed to replace the related modules with new ones. Accordingly, the developing works can be performed effectively.

(B) State Division

In the previous subsection, the shared controls of the UI system, SYS system and MCB system were described. In this subsection, the operations of these systems in the respective stages of the machine operation will be described tracing a flow of the machine operation.

Figure 6:
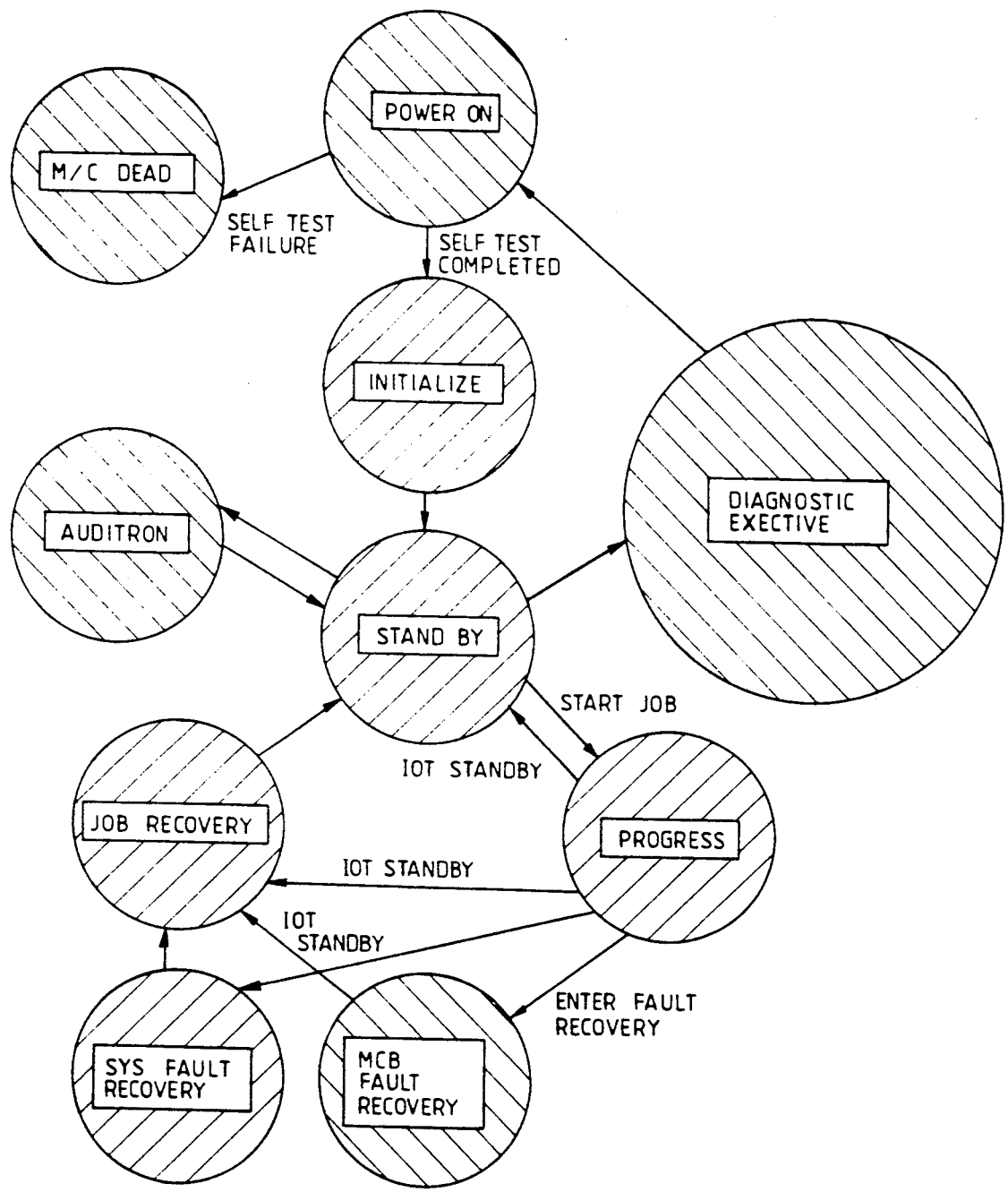
FIG. 6 shows an explanatory diagram for explaining state divisions.

In the present color copying machine, a flow of machine operation including power-on, copying operation, end of copying operation, and state of the machine following the copying operation, is divided into a plurality of states. These states are assigned jobs, respectively. Control cannot proceed to the next state until the job in a state is completed. This ensures the good efficiency of control progression and the exactness of control. The above manner to control the machine operation is called a state division. In this instance, the machine operation is divided into states, as shown in FIG. 6.

The state division employed in the present copying machine is featured in that in some operation modes, the SYS remote 71 possesses a control right to control all of the states and a UI master right to use the UI in a state, and in some control modes, the MCB remote possesses them. With the decentralization of control, the LLUI module 80 of the UI remote 70 is controlled not only by the SYSUI module but also by the MCBUI module 86. The processings are shared such that the pitch and copy processings are under control of the copier executive module 87 in the MCB system, and the per original processings and the job programming processings are controlled by the SYS module 82. Accordingly, in some states the SYS module 82 has the control right and the UI master right, and in other states the copier executive module 87 has them. In FIG. 6, in states indicated by circles filled with vertical thin lines, the UI master right is possessed by the copier executive module 87 in the MCB system. In states indicated by circles painted black the UI master right is possessed by the SYS module 82.

Figure 7:
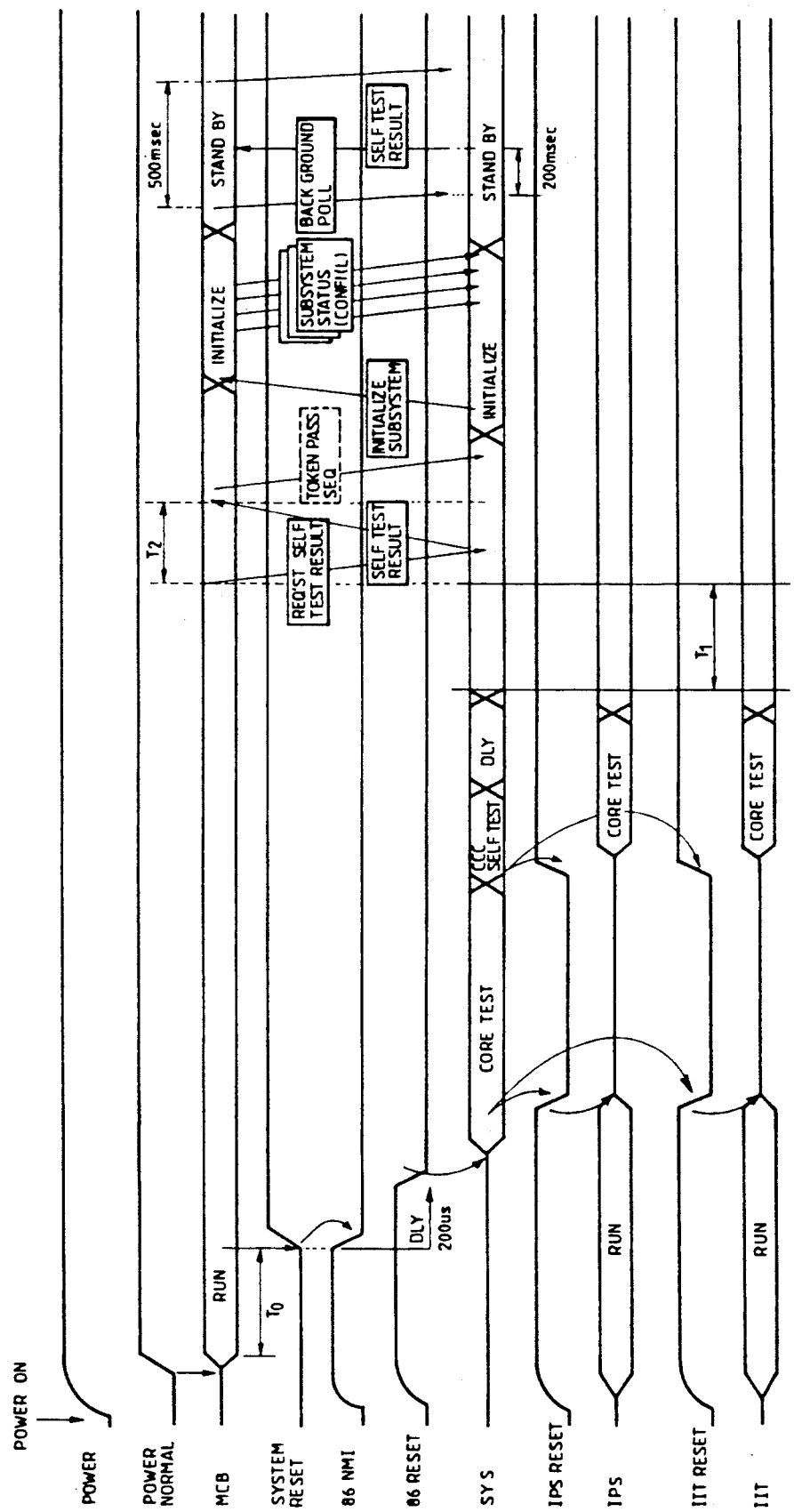
FIG. 7 shows a timing chart for explaining the operation of the copier from the power on state to the standby state.

Of the states shown in FIG. 6, the machine operation from the power-on state to the standby state will be described with reference to FIG. 7.

A power switch is turned on, and the machine is in a power-on state. An IPS reset signal and an IIT reset signal that are supplied from the SYS remote 71 to the IIT remote 74 and the IPS remote 74 (FIG. 3) become H (high) in logic state. Upon receipt of these signals, the IPS remote 74 and the IIT remote 73 are released from the reset status and start to operate. The settle-down of the power voltage is detected and a power normal signal rises. The MCB remote 75 starts to operate and to establish the control right and the UI master right. At the same time it tests the high speed communication network LNET. The power normal signal is transferred from the MCB remote 75 to the SYS remote 71, by way of the hot line.

When time T0 elapses from the operation start of the MCB remote 75, a system reset signal supplied from the MCB remote 75 through the hot line to the SYS remote 71 goes high. Then, the SYS remote 71 is released from the reset status and starts to operate. The operation start of the SYS remote 71 is delayed by time T0 plus 200 μsec by two signals, 86NMI and 86 reset, that are internal signals of the SYS remote 71. The time period of 200 μsec is provided for storing the present state of the copying machine into a nonvolatile memory when the copying machine stops or runs away due to clash, i.e., temporary trouble, power interrupt, software runaway, and software bug.

When the SYS remote 71 starts to operate, a core test is conducted for a period of approximately 3.8 sec. The test checks the contents of the ROM and RAM, and the hardware. At this time, if undesired data is mistakenly entered, the machine will possibly run away. To avoid this, the SYS remote 71, on its decision, renders low (L) the IPS reset signal and the IIT reset signal, at the time of the start of the core test. By the L signals, the IPS remote 74 and the IIT remote 73 are reset and come to a standstill.

Upon completion of the core test, the SYS remote 71 conducts a CCC self test during a period of 10 to 3100 msec, and at the same time renders high the IPS reset signal and the IIT reset signal, thereby to cause the IPS remote 74 and the IIT remote 73 to operate again, and to cause them to conduct the core tests. In the CCC self test, the SYS remote 71 sends predetermined data to the LNET, receives the return data, and checks as to whether or not the transmitted data is coincident with the received data. The times of the self tests of the CCCs are staggered one another, to prevent the different self tests from being conducted concurrently.

The LNET employs a contention system. In this system, the nodes such as the SYS remote 71 and the MCB remote 75 transmit data when they desire so. If different data collide, the same data is retransmitted after a predetermined time lapses. The reason why the contention system is used is that when the SYS remote 71 is conducting the CCC self test, if another node uses the LNET, the data collision occurs and it cannot conduct the CCC self test. Accordingly, before the SYS remote 71 starts the CCC self test, the LNET test by the MCB remote is completed.

When the CCC self test ends, the SYS remote waits till the core tests by the IPS remote 74 and the IIT remote 73 are completed. It conducts a communication test of the SYSTEM node during a period T1. This communication test is for testing the serial communication network of 9600 bps. In the test, predetermined data is transferred in a predetermined sequence. Upon completion of the communication test, during a period T2 the LNET communication test is conducted between the SYS remote 71 and the MCB remote 75. In the communication test, the MCB remote 75 requests the SYS remote 71 to return the results of the self test. In response to the request, the SYS remote 71 returns the results of the tests thus far conducted, as self test results, to the MCB remote 75.

When receiving the self test result, the MCB remote 75 issues a token pass toward the SYS remote 71. The token pass is used for transferring the UI master right. For example, when the token pass is transferred to the SYS remote 71, the UI master right is transferred from the MSB remote 75 to the SYS remote 71. The operations up to this point belong to a power-on sequence. In this sequence, the UI remote 70 displays a message of "Please wait a minute", for example, and executes various tests, such as a core test of the remote 70 itself and communication test.

In the self test sequence, when the return of the self test result is requested, but no return is made, or the returned self test result contains an error, the MCB remote 75 renders the copying machine dead, exercises the UI control right to control the UI remote 70, and visually presents a faulty state of the machine.

An initialize state to set up the respective remotes follows the power-on state. In the initialize state, the SYS remote 71 possesses the control right to control all of the states and the UI master right. The SYS remote 71 initializes the SYS system, and issues a command INITIALIZE SUBSYSTEM to the MCB remote 75 and initializes the MCB system. The result of the initialization is returned as subsystem status from the MCB remote 75. Through the initializing state, in the IOT, the fuse is heated, and the elevator of the tray is set at a predetermined position. The operations up to this point constitute the initialize state.

Upon completion of the initialize state, the respective remotes enter a stand-by state in which they are ready for a copying operation. Also in this state, the SYS remote 71 possesses the UI master right. Accordingly, it exercises the UI master right to display the F/F on the UI display screen, and is ready for accepting the conditions for executing the copying operations. At this time, the MOCB remote 75 monitors the IOT. In the stand-by state, to check as to whether or not the copier is normal, the MCB remote 75 issues a background pole to the SYS remote 71 every 500 msec. In response to this, the SYS remote 71 returns the self test result to the MCB remote 75 within 200 msec. When no return of the self test result is made, or the returned self test result contains an error, the MCB remote 75 transfers to the UI remote 70 a message stating a faulty state, and causes it to display a faulty state of the machine.

When the auditron is used in the stand-by state, the copier enters an auditron state. In this state, the MCB remote 75 exercises the auditron control, and at the same time controls the UI remote 70 to cause it to present an auditron display. When the F/F is set up and the start key is operated in the stand-by state, the copier enters a progress state. The progress state is further divided into six substates, a set-up, cycle-up, run, skip pitch, normal cycle-down, and cycle-down shutdown. These substates will be described with reference to FIG. 8.

Figure 8:
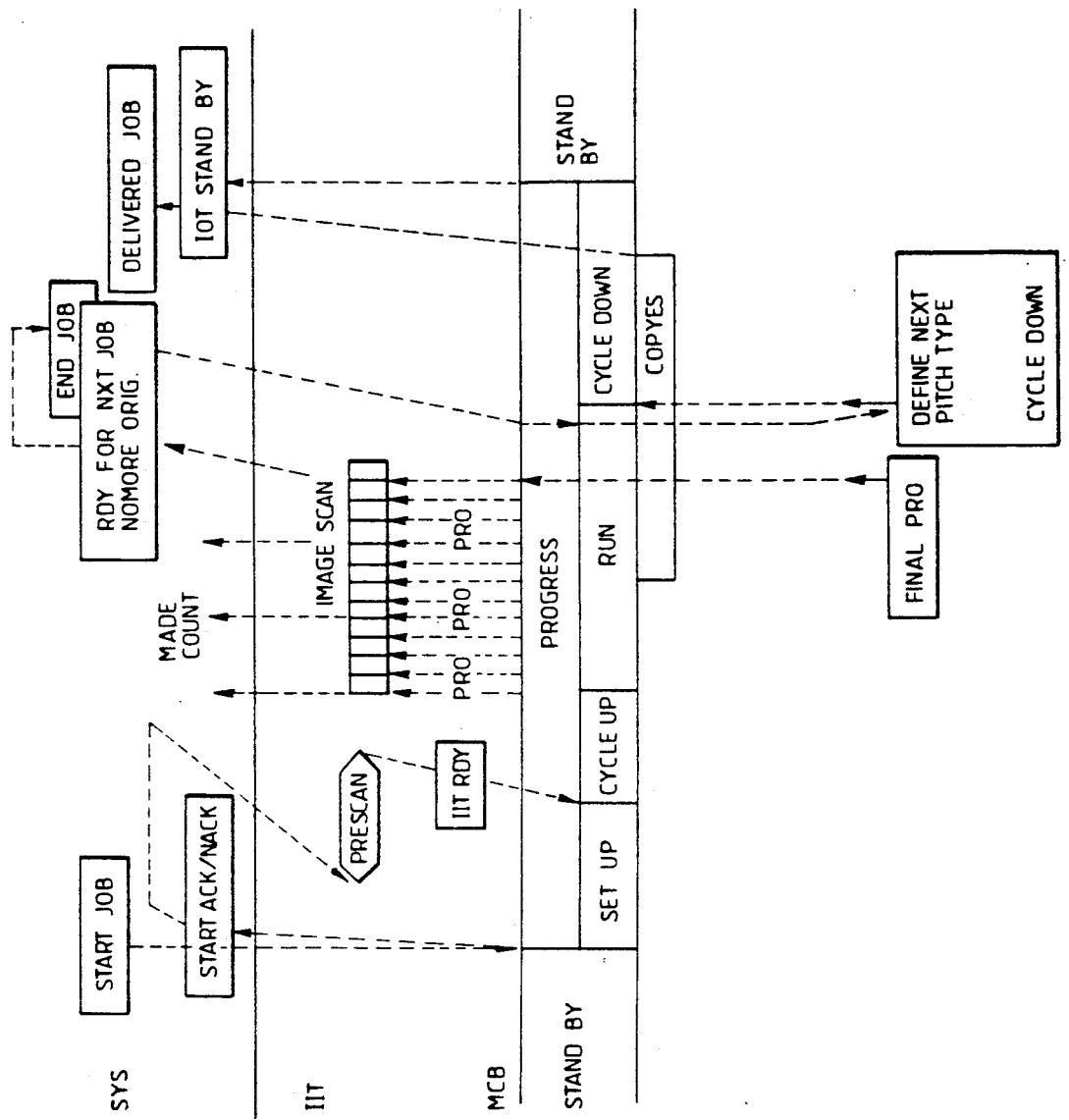
FIG. 8 is a diagram showing a sequence of a progress state.

A timing chart illustrated in FIG. 8 was plotted under conditions that the copier is set in a platen mode and a 4-pass full color mode, and the number of copies is set at three.

When detecting the depression of the start key, the SYS remote 71 sends the contents of a job to the IIT remote 73 and the IPS remote 74, through the serial communication network. The same also issues a command "start job", and sends the job contents and the start job command as well to the copier executive module 87 in the MCB remote 75. As a result, the copier enters the set-up substate, and the respective remotes prepare for executing the designated job. In the IOT module 90, a main motor is driven, and parameters for the photosensitive belt are set to correct values. The SYS remote 71 confirms that an ACK (acknowledge) signal as a response of the MCB remote 75 to the start job reaches, and causes the IIT remote 73 to prescan. In this instance, four types of prescans are used: a prescan to detect size of an original, a prescan to detect a color in a specified portion on the document, a prescan to detect a closed loop for an outline drawing for coloring, and a prescan for reading a marker in the marker edit mode. A maximum of three prescans is repeated in accordance with the selected F/F. At this time, the UI displays a message "Please wait a minute", for example.

When the prescan operation ends, a command "IIT ready" is issued to the copier executive module 87. From this point, the copier, or the copying machine, enters the cycle- up substate. In the cycle-up state, the copier comes to a standstill till the respective remotes start up and settle down. The MCB remote 75 starts up the IOT and the transfer unit. The SYS remote initializes the IPS remote 74. At this time, the UI displays the progress state being exercised and the contents of the selected job.

Upon completion of the cycle-up substate, the run substate is executed and the copying operation starts. When a first PR0 is produced from the IOT module 90 of the MCB remote 75, the IIT performs a first scan, and the IOT performs the development of a first color. Here, the processing of one pitch is completed. Then, when the second PR0 is produced, a second color is developed to complete the processing of a second pitch. The above sequence of the processings is repeated four times to complete the processings of 4 pitches. Then, the IOT fuses the toner image and delivers the paper with the fused image outside the base machine. At this point, the copying operation of the first copy is completed. The above sequence of processings is repeated to produce three copies.

The processings of the pitch layer and the copy layer are under control of the MCB remote 75. The setting of the number of copies in the per original as are higher ordered than the above two layers is carried out by the SYS remote 71. Accordingly, in order that the SYS remote 71 recognizes what number of copies is currently made, when the first PR0 for each copy is produced, the MCB remote 75 produces a made count signal for transfer to the SYS remote 71. When the final PR0 is produced, the MCB remote 75 requests the SYS remote 71 to send the next job by issuing a command "RDY FOR NXT JOB" to the SYS remote 71. At this time, if the start job is issued, the job can be continued. When a user does not set the next job, the job ends. In this case, the SYS remote 71 issues a command "END JOB" to the MCB remote 75. When the MCB remote 75 receives the "END JOB" and confirms that the job ends, the copier enters the normal cycle-down substate. In this state, the MCB remote 75 stops the operation of the IOT.

During the course of the cycle-down, when the copy papers have been delivered out of the base machine and the MCB remote 75 confirms the delivery of the copy papers, the remote 75 informs the SYS remote 71 of it by issuing a command "DELIVERED JOB". Also when the normal cycle down ends and the machine comes to stop, the MCB remote 75 informs the SYS remote 71 of it by issuing a command "IOT STAND BY". At this point, the progress state terminates and control returns to the standby state.

The substates of the skip pitch and the cycle-down shut-down that have not yet been described will be referred to. In the skip pitch, the SYS remote 71 initializes the SYS system for the next job, and the MCB remote 75 is ready for the next copy. In the cycle-down shut-down state that is used when a fault occurs, the SYS remote 71 and the MCB remote 75 both execute a fault processing.

As described above, in the progress state, the MCB remote 75 controls the pitch processing and copy processing, and the SYS remote 71 controls the per original and the job programming. Accordingly, the control right is possessed by the MCB remote 75 or the SYS remote 71 in accordance with the shared processing that is currently performed. The UI master right, however, is exclusively possessed by the SYS remote 71. The reason for this is that the UI must display the number of copies as is set and the selected edit processings, these jobs belong to the per original layer and the job programming layer, and hence under control of the SYS remote 71.

When a fault occurs in the progress state, control goes to a fault recovery state. The word "fault" means an abnormal state of the copier including no paper, jamming, abnormal and damaged parts, and the like. The fault comes in two categories, a first fault that a user can remove by resetting the F/F, and a second fault that requires repair, such as parts replacement, by a service man. As described above, basically, the faulty display work is shared by the MCBUI module 86, but the F/F is controlled by the SYS module 82. The machine recovery from the first fault that can be cured by the resetting of the F/F is shared by the SYS module 82.

The machine recovery work from other faults is shared by the copier executive module 87.

The SYS system and the MCB system independently detect faults. Faults in the IIT, IPS, and F/P are detected by the SYS remote 71, because these are controlled by the remote 71. Faults in the IOT, ADF, and sorter are detected by the MCB remote 75, because these are controlled by the remote 75. Accordingly, the faults possibly occurring in the copying machine may be categorized into four types of faults to be given below.

1) Fault as is detected and cured by SYS Node

When the start key is depressed before the F/P is set, this fault occurs. The fault can be removed by resetting the F/P.

2) Fault as detected by SYS Node, but cured by MCB Node

This type of fault includes trouble of the reginsor, abnormal speed of the imaging unit, overrun of the imaging unit, abnormal PR0 signal, abnormal CCC, trouble in the serial communication network, check error of the ROM or RAM, and the like. When any of the above faulty states occur, the UI displays the details of the faulty state, and a message "Call a serviceman".

3) Fault as is detected by MCB Node, but cured by SYS Node

Where the sorter is not set, if the F/F sets the sorter, the MCB node detects a fault. Such a faulty state in the copying machine can be removed by resetting the F/F by a user. The same thing is true for the ADF. A fault is detected when a less amount of toner is left, a tray is not yet or incorrectly set, and no paper is present. These faults can be removed by merely supplying toner, setting a tray, and supplying papers. When papers are used up in a tray, setting of another tray can recover the machine from the faulty state. When toner of a certain color is used up, designation of toner of another color can recover the faulty machine. Thus, since the F/F selection can make the recovery of the faulty machine, the recovery work is shared by the SYS node.

4) Fault as detected and cured by MCB Node

When the developing unit is abnormal, the toner supply is abnormal, the motor clutch is abnormal, or the fuser is abnormal, the MCB node detects such a fault and the UI displays a faulty location and a message "Call a servicemen". When a jamming occurs, the same displays a location of jamming and the way to clear jamming. In this way, the machine recovery work is put into the hands of users.

As described above, in the fault recovery state, the control right and the UI master right are possessed by the SYS node or the MOCB node depending on faulty locations and the recovery methods used.

After the fault recovery, the MCB node issues an IOT stand-by command. Control goes to the job recovery state and executes the remaining jobs. Let us consider a case that the number of copies is set at 3, and during the course of making a second copy. In this case, after the jamming is removed, the remaining two copies must be made. Accordingly, the SYS node and the MCB node execute their processings, to recover the job. Also in the job recovery state, the control right is possessed by the SYS node or the MCB node depending on their shared processings, but the UI master right is possessed by the SYS node. The reason for this follows: To exercise the job recovery state, a display for job recovery must be made, such as "Push a start key" and "Set the remaining document". Such a display processing belongs to the per original layer or the job programming layer that are under control of the SYS node.

Also when an IOT stand-by command is issued in the progress state, the job recovery state is exercised. When the job execution end is confirmed, control goes to the stand-by state, and waits for the next job. In the stand-by state, control is allowed to proceed to the diagnostic (referred simply to as a diag.) state by a given key operation.

Figure 9:
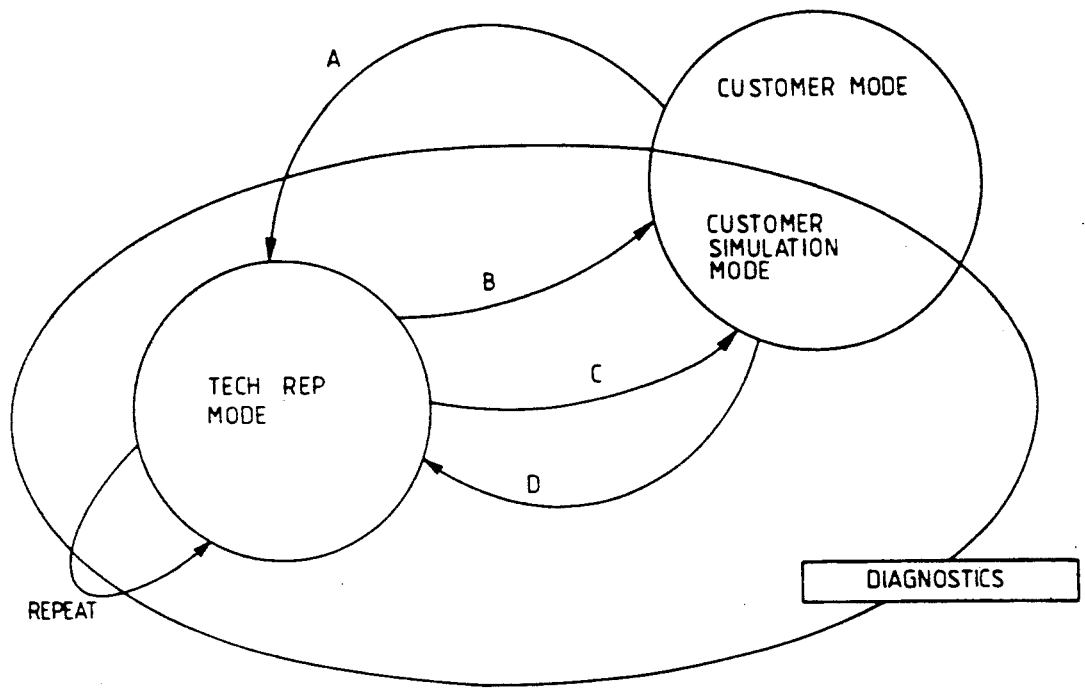
FIG. 9 is a diagram showing an outline of a diagnostic process.

The diag. state consists of self test processings, such as input/output check of parts, setting of various parameters, setting of various modes, and initializing of the NVM (nonvolatile memory). The schematic illustration of the diag. state is given in FIG. 9. As seen from the figure, two modes are used, a TECH REP mode and a customer simulation.

The TECH REP mode is used for the machine diagnosis by a serviceman, such as input and output checks. In the customer simulation mode, a customer mode that is usually used by a user for the copying operation is operated in the diag. state.

Figure 4:
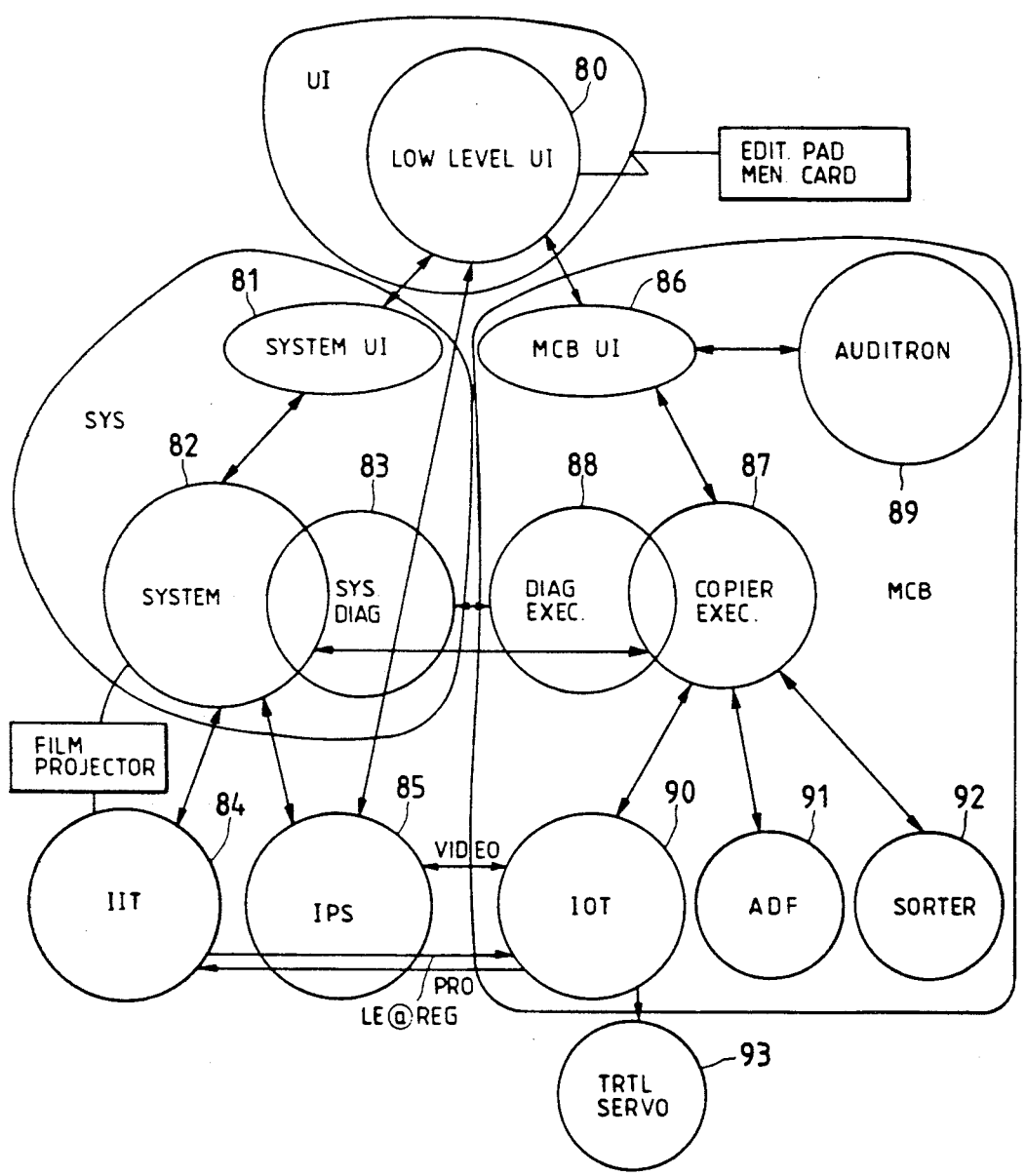
FIG. 4 is an explanatory diagram showing a software architecture.

It is assumed now that in response to a given operation, control proceeds from the stand-by state in the customer mode to the TECH REP mode by way of a route A. Where control makes only various checks and parameter settings in the TECH REP mode and returns to the customer mode (by way of a route B), control may go to the power-on state (FIG. 6) and return to the stand-by state through the sequence of FIG. 7, by merely operating a related key. Remember that the present copying machine may make the color copy with various edit functions. Therefore, after various parameters are set in the TECH REP mode, check must be needed as to whether or not desired colors are produced and whether the edit functions are normal or not by actually making the copy. It is the customer simulation mode that executes the above checks. The customer simulation mode is different from the customer mode in that no billing is made and the UI displays the diag. state being set up. It is for this reason that the customer mode is used in the diag. mode. The transition from the TECH REP mode to the customer simulation mode (via a route C) and the reverse transition from the customer simulation mode to the TECH REP mode (via a route D) may be made by related operations. The TECH REP mode progresses under control of the diag. executive module 88 (FIG. 4). Accordingly, the MCB node has both the control right and the MCB master right. In the customer simulation mode, the actual copying operation progresses under control of the diag. module 83 (FIG. 4). Accordingly, the SYS node has both the control right and the US master right.

(II) SYSTEM DETAILS

(II-1) System Configuration

Figure 10:
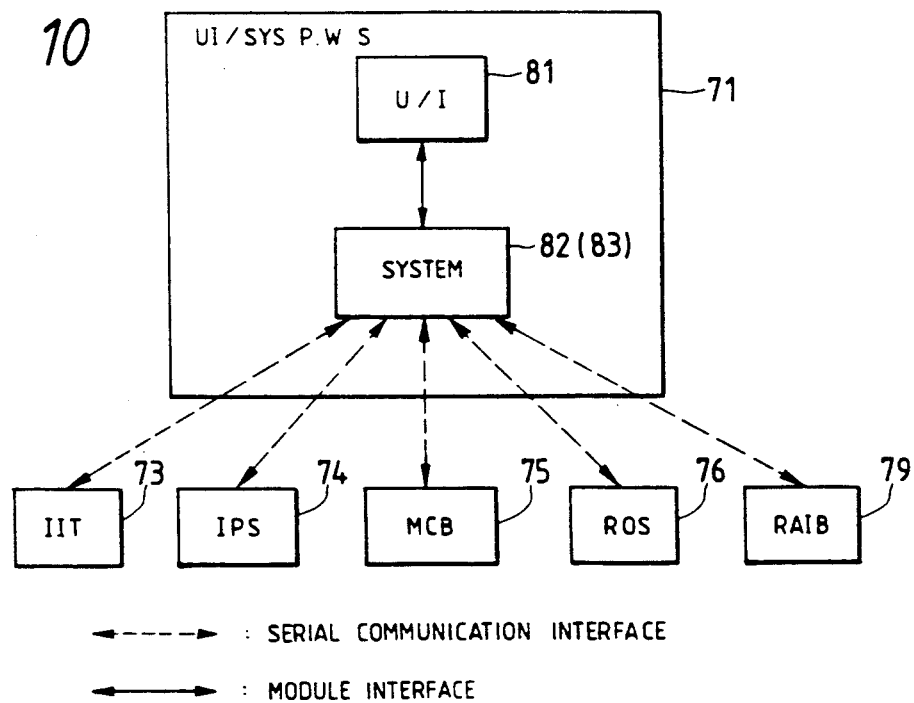
FIG. 10 is a diagram showing relationships of the system and remotes.

FIG. 10 shows relationships between a system and other remotes.

As described above, the SYS remote 71 uses the SYSUI module 81 and the SYSTEM module 82. Data transfer between these modules 81 and 82 is made through an inter-module interface. A serial communication interface intervenes between the SYSTEM module 82 and the IIT 73, and between it and IPS 74. An LNET communication network couples the SYSTEM module 82 with the MCB 75, ROS 76 and RAIB 79.

A module configuration of the system will be described.

(II-2) System Modules

Figure 11:
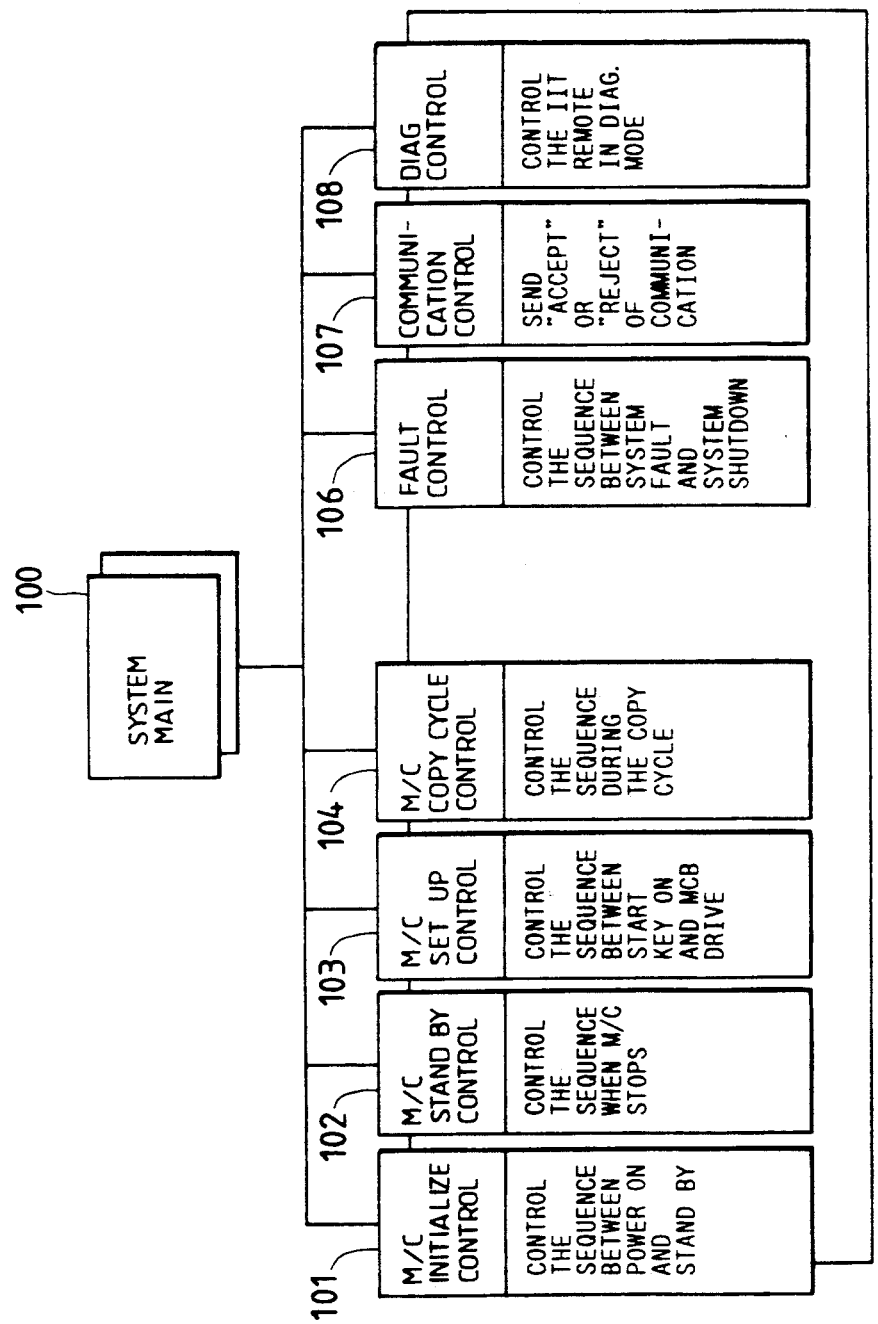
FIG. 11 is a diagram showing a module configuration of the system.

FIG. 11 shows a module configuration of the system.

In the color copying machine under discussion, the modules, such as IIT, IPS and IOT, function like passive parts. The modules in the system for controlling the above modules function like active parts with intellect. The copying machine employs the decentralized CPU system. The per original layer and the job programming layer are shared to the system. The system has the control right to control the initialize state, stand-by state, set-up state, and cycle state, and the UI master right for using the UI in the above states. Accordingly, the modules corresponding to them make up the system.

A system main 100 loads the data received from the SYSUI, MCB, and the like into the internal buffer, clears the data in the internal buffer, calls the respective lower order modules in the system main 100 and transfers the job to them, thereby to update the system states.

An M/C initialize control module 101 controls an initialize sequence from the power-on till the system is in the stand-by mode. This is driven when a power-on processing for executing various types of tests that follows the power-on by the MCB, is completed.

An M/C set-up control module 103 controls a set-up sequence from the pushing of the start key till the MCB for executing the copy layer is driven. Specifically, it forms job modes using FEATURE (directions given to the M/C in order to comply with the request by a user) that is specified by the SYSUI, and determines a set-up sequence in accordance with the formed job modes.

Figure 12A:
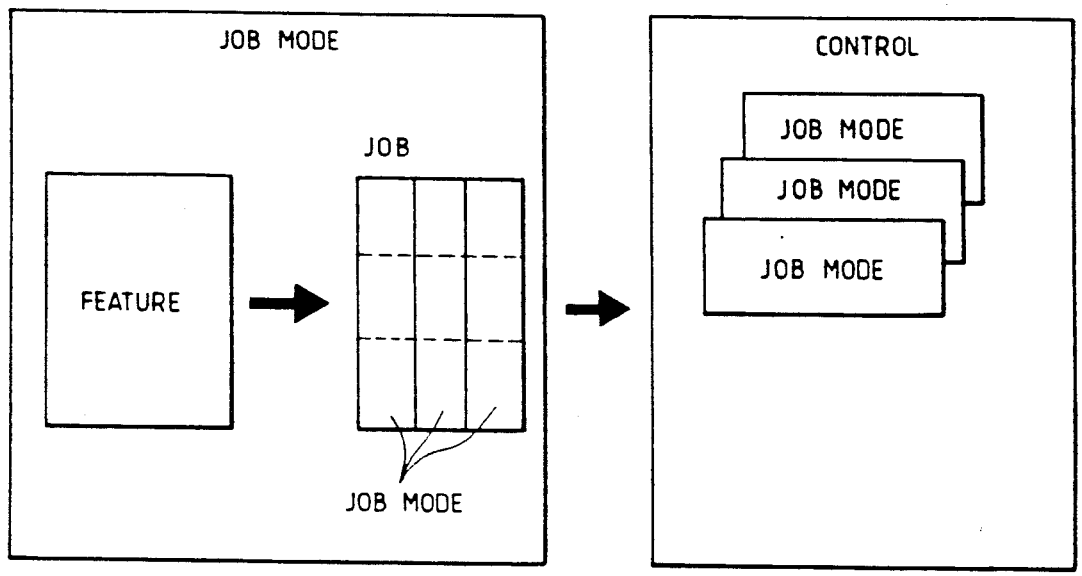
FIGS. 12(a) through 12(c) are explanatory diagrams showing how to prepare a job mode.
Figure 12B:
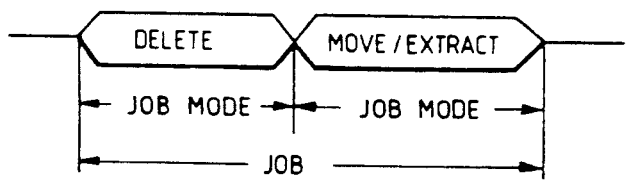
Figure 12C:
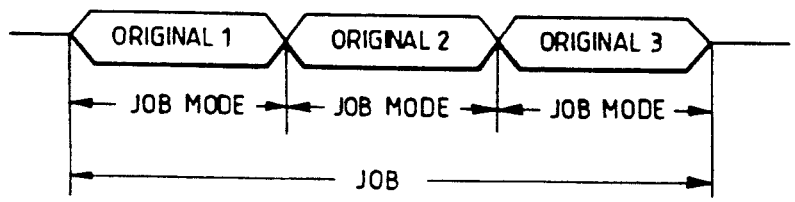

As shown in FIG. 12(a), to form the job modes, a mode as indicated by the F/F is analyzed and divided into job modes. Here, the "job" means an M/C operation ranging from an instant that upon request by a user, the M/C starts till all of the copies as requested are delivered out of the base machine and the M/C stops. In other words, it is a colligation of job modes as unit jobs up to which the job may be divided. In the case of an inlay composition, for example, the job modes are delete, movement, and extraction, as shown in FIG. 12(b). The job is a colligation of those job modes. In the case of three ADF originals, job modes are feed processings of originals 1, 2 and 3. These job modes are colligated into the job.

In an automatic mode, a document scan is performed. In a paint-out mode, a prescan is performed. In a marker edit mode, a prescan is performed. In a color detection mode, a sample scan is performed (a maximum of three prescans are allowed). A copy mode required for the copy cycle is assigned to the IIT, IPS and MCB. At the end of the set-up sequence, the MCB is driven.

An M/C stand-by control module 102 controls the sequence in the M/C stand-by state, more exactly accepts the start key, controls the storing of colors, and enters the diag. mode.

An M/C copy cycle control module 104 controls a copy sequence from the start of the MCB to the stop. Specifically, the module 104 makes a request of starting up the IIT on the basis of the paper feed count and the end of JOB, and makes a request of stopping the IPS on the basis of the stop of the MCB.

Additionally, the module 104 sends a through command that is generated at the stop of the M/C or during the M/C operation, to a called remote.

A fault control module 106 monitors stop parameters from the IIT and IPS. When a stop parameter is generated, the module 106 requests the stop of the MCB. More specifically, the module 106 recognizes a fail command from the IIT or IPS, and stops it. After a stop request is generated by the MCB, the fault control module determines the recovery when the M/C is stopped, and makes the recovery in response to a jamming command from the MCB, for example.

A diag. control module 108 is for the controls in the input check mode and the output check mode in the diag. mode.

(II-3) Data Transfer

Description to follow is the data transfer among the modules or between the modules and other subsystems.

Figure 13:
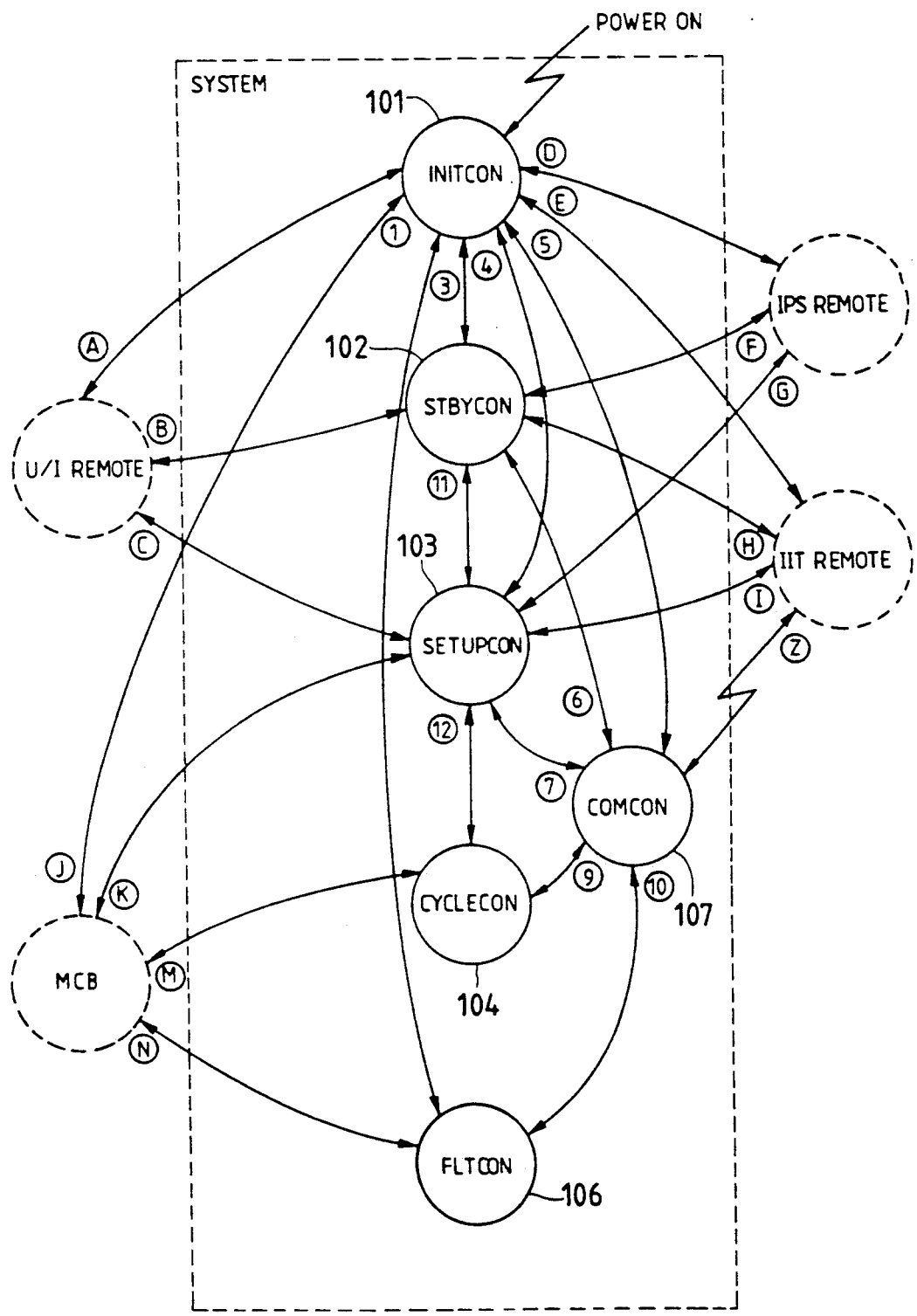
FIG. 13 is a diagram showing a data flow between the system and the respective remotes.

FIG. 13 illustrates data flows between the system and the remotes, and data flows among the modules in the system. In the figure, A to N indicate serial communications, Z a hot line, and (1) to (12) data flow among the modules.

In the communication between the SYSUI remote and the initialize control module 101, the SYSUI sends a token command indicative of transferring the control right of the CRT to the SYSTEM node, to the control module. On the other hand, the initialize control module sends a config. command to the remote.

In the communication between the SYSUI remote and the stand-by control module 102, the SYSUI remote sends to the stand-by control module a mode change command, start copy command, job cancel command, color storing request command, and tray command. The stand-by control module 102 sends to the SYSUI remote an M/C status command, tray status command, toner status command, toner collection bottle command, color registration ans. command, and token command.

In the communication between the SYSUI remote and the set-up control module 103, the set-up control module 103 sends an M/C status command (progress) and APMS status command to the remote. The SYSUI remote sends a stop request command and an interrupt command to the control module.

In the communication between the IPS remote and the initialize control module 101, the IPS remote sends an initialize command to the control module 101 to the control module 101. The control module 101 sends an NVM parameter command to the IPS remote.

In the communication between the IIT remote and the initialize control module 101, the IIT remote sends an IIT ready command to the module 101. The module 101 sends an NVM parameter command and an initialize command to the IIT remote.

In the communication between the IPS remote and the stand-by control module 102, the commands sent by the IPS remote to the control module 102 are an initialize free hand area command, answer command, remove area answer command, and color data command. The commands sent by the module 102 to the IPS remote are a color detect point command, initialize free hand area command, and a remove area command.

In the communication between the IPS remote and the set-up control module 103, the commands sent by the IPS remote to the control module 103 are an IPS ready command and a document information command. The commands sent by the set-up control module 103 to the IPS module are a scan information command, basic copy mode command, edit mode command and M/C stop command.

In the communication between the IIT remote and the stand-by control module 102, the IIT remote sends an IIT ready command indicative of the prescan end to the control module 102. The control module 102 sends to the IIT remote a sample scan start command and an initialize command.

In the communication between the IIT remote and the set-up control module 103, the IIT sends an IIT ready command and an initialize end command to the control module 103. The control module 103 sends a document scan start command, sample scan command, and copy scan start command to the IIT remote.

In the communication between the MBC remote and the stand-by control module 102, the stand-by control module 102 sends an initialize subsystem command and a stand-by selection command to the MBC remote. The MBC remote sends a subsystem status command to the stand-by control module.

In the communication between the MBC remote and the set-up control module 103, the module 103 sends a start job command, IIT ready command, stop job command, and declare system fault command to the MBC remote. The MBC remote sends an IOT stand-by command and a declare MCB fault command to the module.

In the communication between the MBC remote and the cycle control module 104, the module 104 sends a stop job command to the MBC remote. The MBC remote sends a made command, ready-for-next-job command, job delivered command, and IOT stand-by command to the control module.

In the communication between the MBC remote and the fault control module 106, the control module 106 sends a declare system fault command and a system down end command to the MBC remote. The MBC remote sends a declare MCB fault command and a system shut-down command to the control module 106.

In the communication between the IIT remote and the communication control module 107, the IIT remote sends a scan ready signal and an image area signal to the control module 107.

The interfaces among the respective modules will be described below.

The system main 100 sends reception remote Nos. and reception data to the respective modules (101 to 107). Upon receipt of them, each module transfers data to and from its remote. On the other hand, the respective modules sends nothing to the system main 100.

The initialize control module 101, when completing the initialize processing, sends a system state (stand-by) to the fault control module 106 and the stand-by control module 102.

The communication control module 107 sends communication yes/no data to the initialize control module 101, stand-by control module 102, set-up control module 103, copy cycle control module 104, and fault control module 106.

The stand-by control module 102 sends a system state (progress) to the set-up control module 103, when the start key is depressed.

The set-up control section 103, when the set-up is completed, sends a system state (cycle) to the copy cycle control module 104.

(III) MONITOR CONTROL SYSTEM

In the monitor control system according to the present invention, a time-consuming task is treated as a low-level priority task. Regular monitor processing that must be executed every 10 msec is treated as a high-level priority task. The low-level processing as a background processing is constantly executed when the CPU is ready for use. When a 10-msec interrupt occurs the low-level processing currently being executed is interrupted, while regular monitor processing is executed. With this scheme the monitor control system reliably executes the regular monitor processing as well as the time-consuming task.

For the communication of the monitor with other systems, a plurality of communication systems having different communication speeds are used in such a way that a high speed communication system with a contention bus type configuration is used for communication between the MCB and the UI, and a low speed communication system with a polling type configuration for communication between the IIT and the IPS. Thus, the advantageous features of the decentralized CPU system can be fully utilized to secure effective operation of the monitor.

Figure 14:
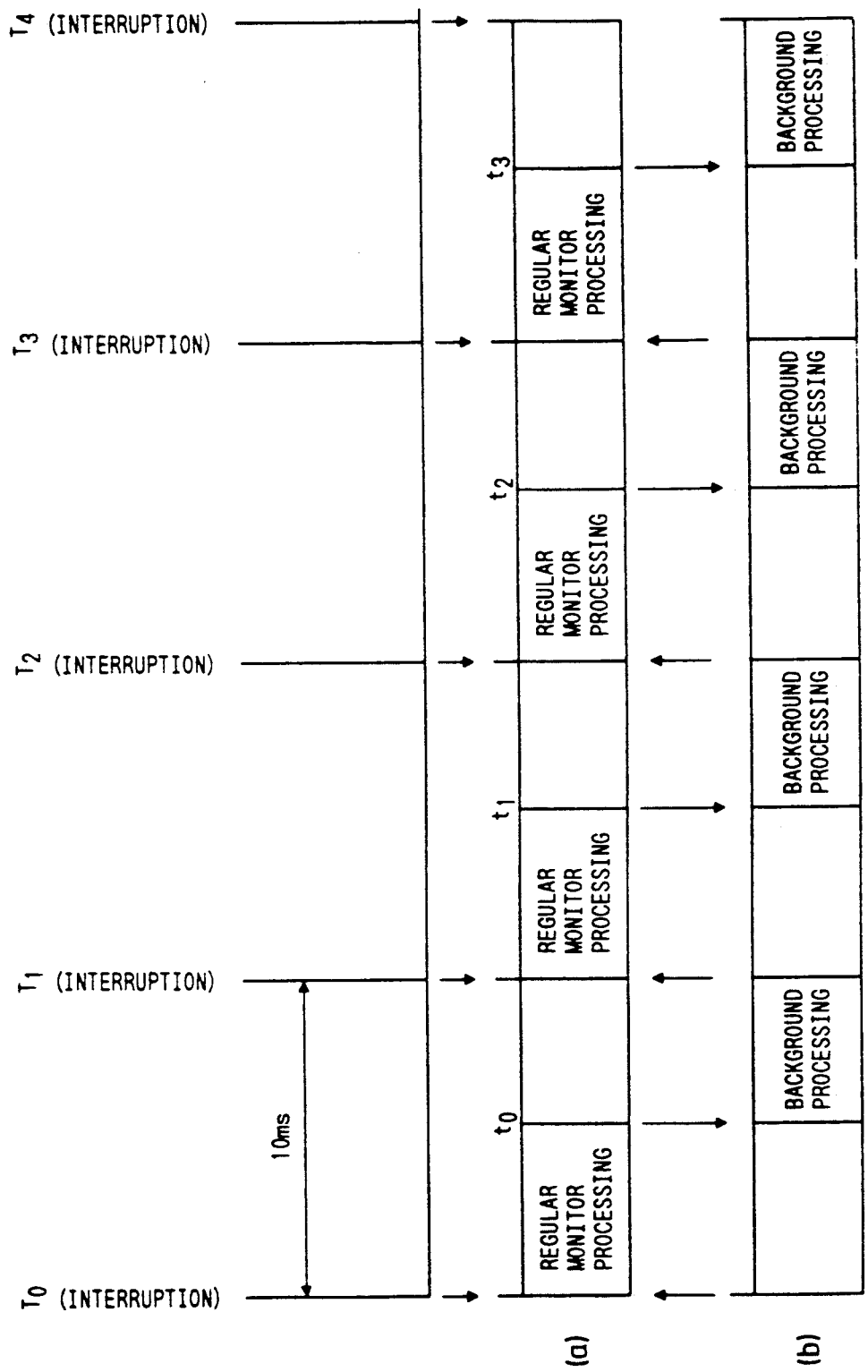
FIG. 14 is an explanatory diagram for explaining the principles of a monitor control system of the present invention.

FIG. 14 is a chart useful in explaining the principles of the monitor control system according to the present invention.

In response to the 10-msec interrupt, the monitor progressively executes the regular monitor processing including timer processing, input/output processing, transmission/reception processing, APPS call, and the like. The time-consuming tasks, for example, a task of preparing a TRC conversion table that is performed in the IPS, are stored as reserve (RSV) tasks. As shown, at time $T_0$, the regular monitor processing starts, and terminates at time $t_0$. At this time, the background processing, i.e., RSV task, starts. At time $T_1$, a 10-msec interrupt occurs and the background processing is interrupted. In turn, the regular monitor processing is executed. Subsequently, after the regular monitor processing terminates, execution of the RSV task processing starts again and progresses throughout the idle time of the CPU.

In this way, the recursive regular monitor processing is reliably executed at the intervals of 10 msec, and the time-consuming task, i.e., the RSV task, is also smoothly executed during the CPU idle time. It is clear, therefore, that the operating effectiveness of the CPU is remarkably improved.

(III-1) Module Configuration of System Monitor

FIGS. 15(a) through 15(g) show a module configuration of a system monitor.

In the system monitor, many processings tasks on the system controls are executed with the intention of improving system resource management, throughput, response time, easy-to-use, versatility, expansion, sharing and protection of information, and RAS (reliability, availability, serviceability). The system monitor functions in the domain between a user and hardware, and corresponds to an operating system (OS) in a typical computer system. In this embodiment, the system monitor consists of a task control module for controlling tasks and a communication module for communication processings functions. The communication module consists of a 9600 bps communication module (9600 COM) and an LNET communication module (CCC-COM).

The task control module executes the regular monitor processing as the high-level processing task based on the recursive 10-msec interrupt. As recalled, the regular monitor processing consists of the timer processing, input/output processing, APPS call, and the like. During a period between power on and power off, the task control module causes the APPS to execute the time consuming processing as the low-level processing task during the idle time of the CPU in which no regular monitor processing is performed.

The 9600 COM module is for processing the communication between the IIT and the IPS.

The CCC-COM module is for processing the communication between the MCB and the UI.

(A) Task Control Module

The task control module consists of a monitor main processor driven upon the power-on; an interrupt processor for processing the 10-msec interrupt, carriage scan interrupt, NMI interrupt, and image area interrupt; a service processor for supporting the APPS; and an idle processor for interruption. In the present invention, the background processing is covered by the monitor main processor.

Figure 15A:
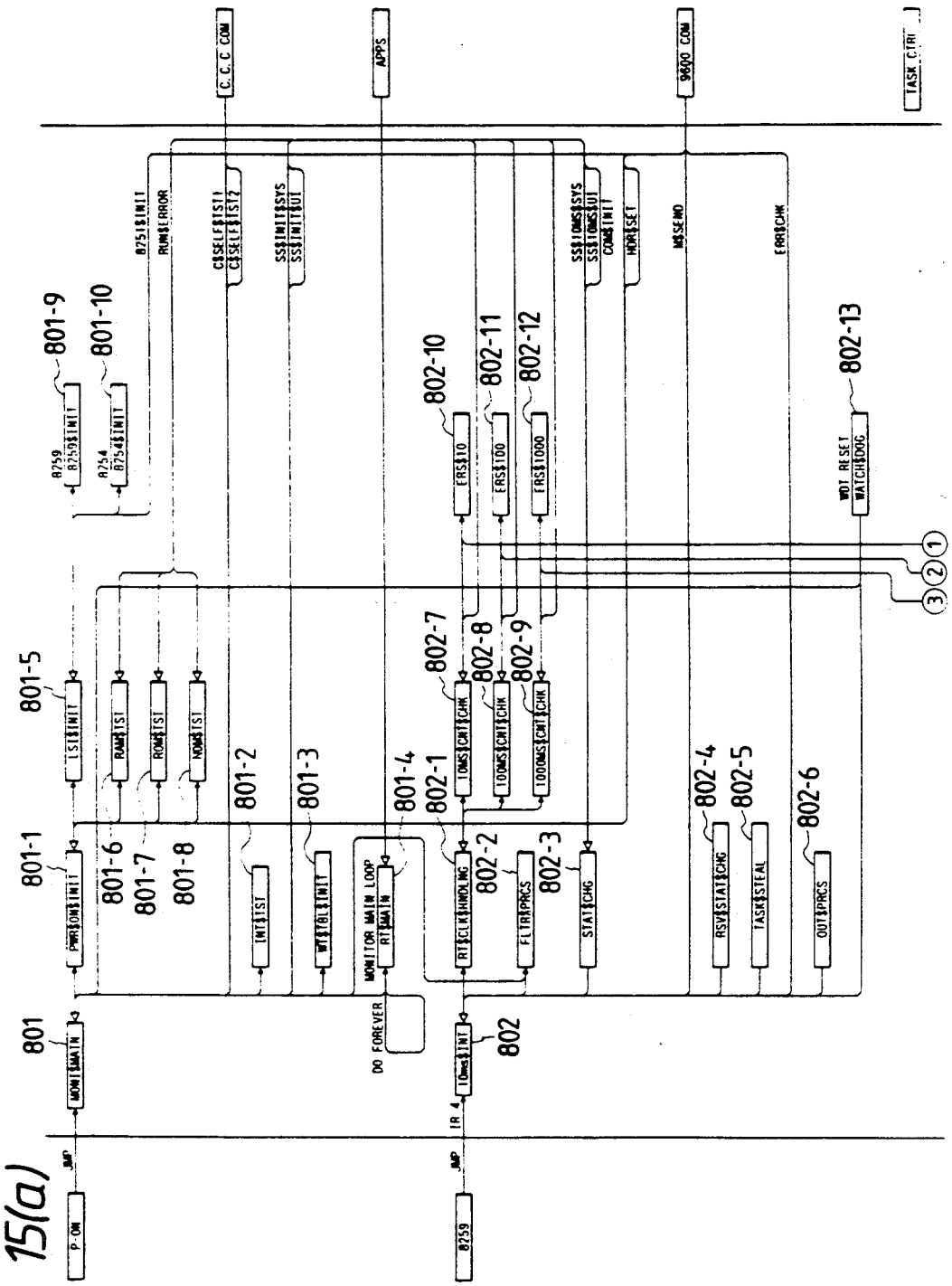
FIGS. 15(a) through 15(g) are diagrams for explaining a module configuration of a system monitor.
Figure 15B:
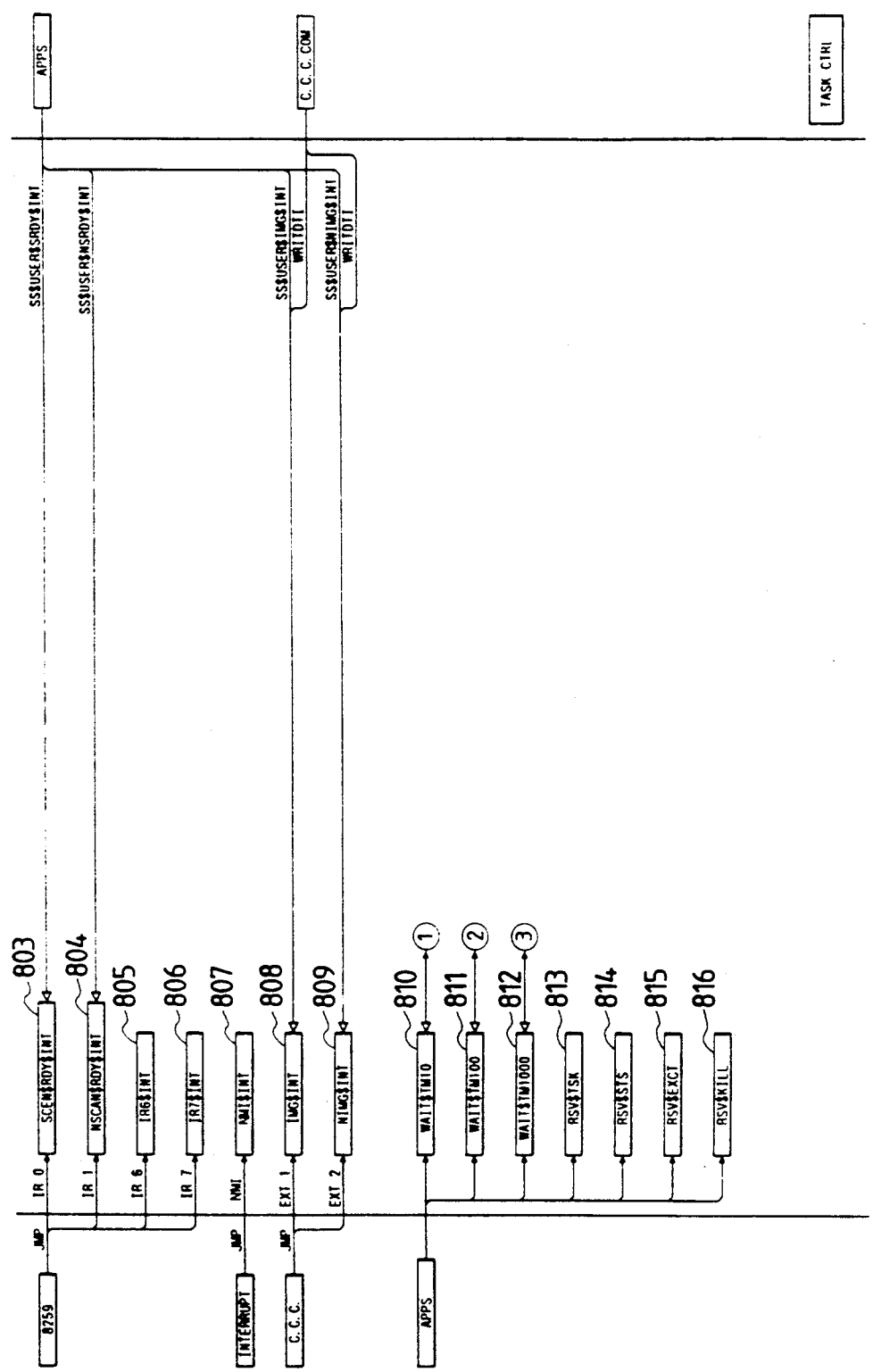

As shown in FIG. 15(a), the monitor main processor or module 801, when driven upon the power-on, drives a power-on initialize module 801-1, and drives a peripheral LSI initialize module 801-5, an interrupt controller (8259) initialize module 801-9, and a timer controller (8254) initialize module 801-10, thereby to initialize the respective LSIs. At the same time, the monitor main module 801 calls 8251SINIT and COMSINIT, which are for the 9600 bps communication, and causes the 9600 bps communication module (9600 COM) to initialize the related LSIs. Further, the monitor main module 801 calls HDRSSET and causes the 9600 COM to initialize a memory which is for storing data of a predetermined format.

A RAM test module 801-6, a ROM test module 801-7, and an NVM test module 801-8 execute core tests, such as a RAM test to check if the data that was called from the power-on initialize module 801-1 and stored in a RAM is correctly read out, a ROM test to check if the data read out of a ROM is the same as that read out at the time of the previous power-on, and an NVM test to check if the data before the power off is correctly stored. In addition to those tests, those modules call RUNSERROR for error recovery of the APPS. To call it, a parameter indicating the reason why the APPS is called is additionally used. The APPS checks the parameter, and executes the error processing on the basis of the check result.

Upon completion of the core tests, the monitor main module 801 calls CSSELFSTEST1 and CSSELFSTEST2 to cause the CCC-COM (communication control chip module) to conduct the self-test of the contention buses. The self-test is performed in such a manner that the CCC-COM sends given data and receives it, and confirms that the received data is the same as the original data.

After completion of those processings, an interrupt test module 801-2 is driven to check if the related circuits normally operate when receiving external interruption which are first applied after power on, such as scan ready, scan end, scan start, image read, and start and end of reading images.

In this way, the tests to be performed in the power-on state are conducted. After the tests, SSSINITSSYS and SSSINITSUI to initialize the APPS are called. The APPS used here contains SYS and UI, because when viewing the SYS and the UI from the monitor, those may be considered to be the APPS. The APPS is initialized in order to operate those.

When an initialize state is set up, a timer table initialize module 801-3 is driven, to store a preset value, for example, FFFF, into a timer table.

After the timer is set, the monitor main loop module 801-4 is driven to execute a long repetitive processing of 10 msec or more by an endless loop. The endless loop is interrupted when the regular monitor processing recurring at the 10 msec interval is executed, but constantly circulates on the background till the power is off.

A 10-msec interrupt module 802 is driven every 10 msec in response to an internal interruption applied from an interrupt controller 8259, and drives a timer module 802-1, filter module 802-2, APPS call module 802-3, RVS state change module 802-4, RAM module 802-5, output module 802-6, timer check modules 802-7 to 802-9, and timer erase modules 802-10 to 802-12. When the 10-msec interrupt module 802 is activated, the currently executed processing, or program, is interrupted and temporarily stored into a fixed storage area of the main memory for waiting. During the interruptive period, the regular monitor processing including the timer processing, input/output control, task control, and the like is executed in a circulating manner. Upon completion of the regular monitor processing, the processing that was temporarily stored in the fixed storage area, is read out of the area and is executed again. The temporary storage and the read-out of the program are automatically performed by the hardware.

The timer module 802-1 drives the programs to check and erase various timers, and executes timer processings, such as timer value storage, count down, and time out.

The filter module 802-2 executes such a task that data is fetched only when the same level data continues for a predetermined period of time. This is performed for preventing noise contained an input signal externally applied from being mistakenly fetched.

After the timer processing and the filter processing are completed, the APPS call module 802-3 calls a predetermined APPS and transfers the control to the APPS.

The RSV state change module 802-4 makes a state change depending on any of processing states of the RSV task, stop, being executed, state of execution, and end of execution. As recalled, the RSV task is executed in the form of the background processing.

The RAM monitor module 802-5 reads data from a RAM, and controls a 7-segment display of the monitor board on the basis of the read out data. This is used for debugging software.

The output module 802-6 is for outputting the results of processings that have been executed.

The WDT reset module 802-13 resets a watch-dog timer for preventing program runaway every time the 10-msec interruption is generated, thereby to prevent the time consuming processing from being made invalid.

The modules as described above are those as driven by the internal interruption recurring every 10 msec. The following description is for the modules driven by external interruptions derived from the IIT controller.

When the carriage is moved, the IIT issues an external interruption to the monitor. Then, a scan-ready interrupt module 803, a not-scan-ready interrupt module 804, an image interrupt module 808, and a not-image interrupt module 809 are driven. The scan-ready interrupt module 803 and the not-scan-ready interrupt module 804 are respectively driven at the leading edge and the trailing edge of the interruption generated when the carriage is moved.

An interrupt controller 8259 is capable of generating eight interruptions. Of those interruptions, some interruptions are actually used. A measure must be taken for the interruptions not used; otherwise, an improper operation may occur. It is for this reason that an IR6 interrupt module 805 and an IR7 interrupt module 806 are provided. That is, the modules 805 and 806 are psuedo programs for accepting the not used interruptions.

An NMI interrupt module 807 is a non maskable interrupt (NMI processor) which is directly applied to the CPU, and is not derived from an interrupt controller 8259. There is a case that the CPU is emergently reset and the power downs. In such a case, how an interruption, which comes in just before it is reset, turns off the power, is stored into an NVM (nonvolatile memory). The NMI interrupt module is used for making such a storage, and is for a very short interruption.

Since an image is read through the scanning, a high accuracy is required for the image read. To secure the accuracy, an interruption from the CCC (communication control chip) is used. An image area interrupt module 808 issues a trigger command for the image reading. A not-image interrupt module 809 instructs a command indicative of the end of the image reading.

The monitor supports the APPS. When the APPS is called every 10 msec from the monitor, the APPS may request the monitor to execute service processing, such as storage of timer value, stop of the timer, and execution of the time-consuming processing as the background processing, by a supervisor call.

Set/stop modules 810 to 812 respectively for a 10-msec timer, a 100-msec timer, and a 1000-msec timer execute timer service processings in reply to the supervisor call from the APPS. By using this, the APPS may set and stop the timer. Those modules 810 to 812 are coupled with the timer initialize modules and the erase modules 802-7 to 802-12 for the 10-, 100-, and 1000-msec timers, and initializes the timers and erases the timer values.

By the supervisor call, an RSV task storage module 813, RSV task status check module 814, RSV-task-execution-request module 815, and an RSV task module 816 are called, to store the RSV task to be executed as the background processing, to check an RSV task state, to erase the stored data, to make an execution request, to stop the task, and the like.

As already described referring to FIG. 3, the CCC supports the protocol for the high speed communication network among the SYS system, the UI system, and the MCB system. Further, the CCC functions to generate interruptions when a contention bus communication is performed and an error occurs. However, the interrupt service is not yet used in the present color copying machine. There is a case where noise arrives in the form of an interrupt signal through the high speed communication network LNET. In this case, the system monitor mistakenly recognizes the noise as an interruption, and will possibly run away unless some measure is taken for such a false interruption. To cope with this, the system monitor uses modules 817 to 822 for processing the false interruptions from the CCC (see FIG. 15(c)). When receiving a false interruption, the monitor system rejects it.

Figure 15C:
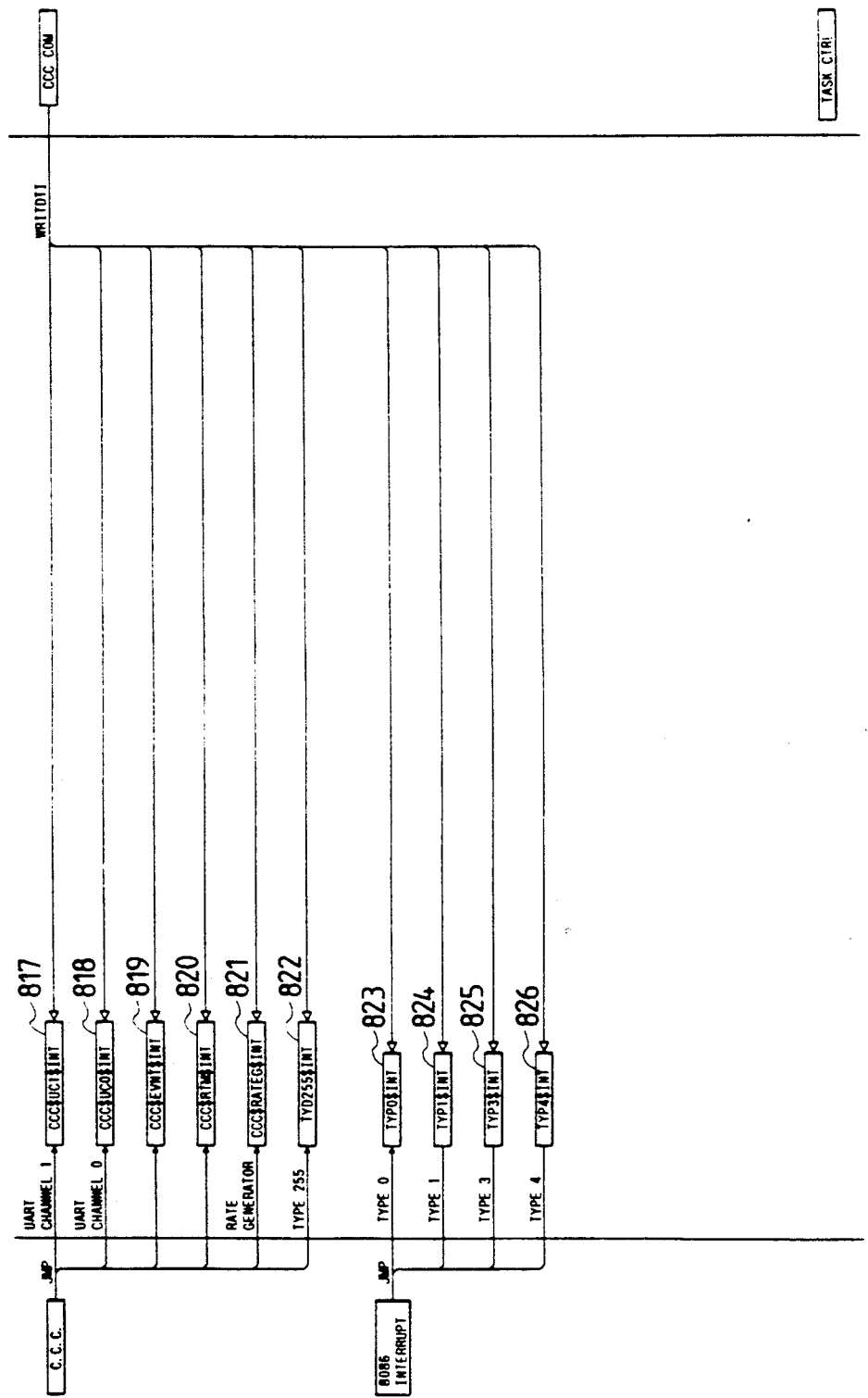
Figure 15D:
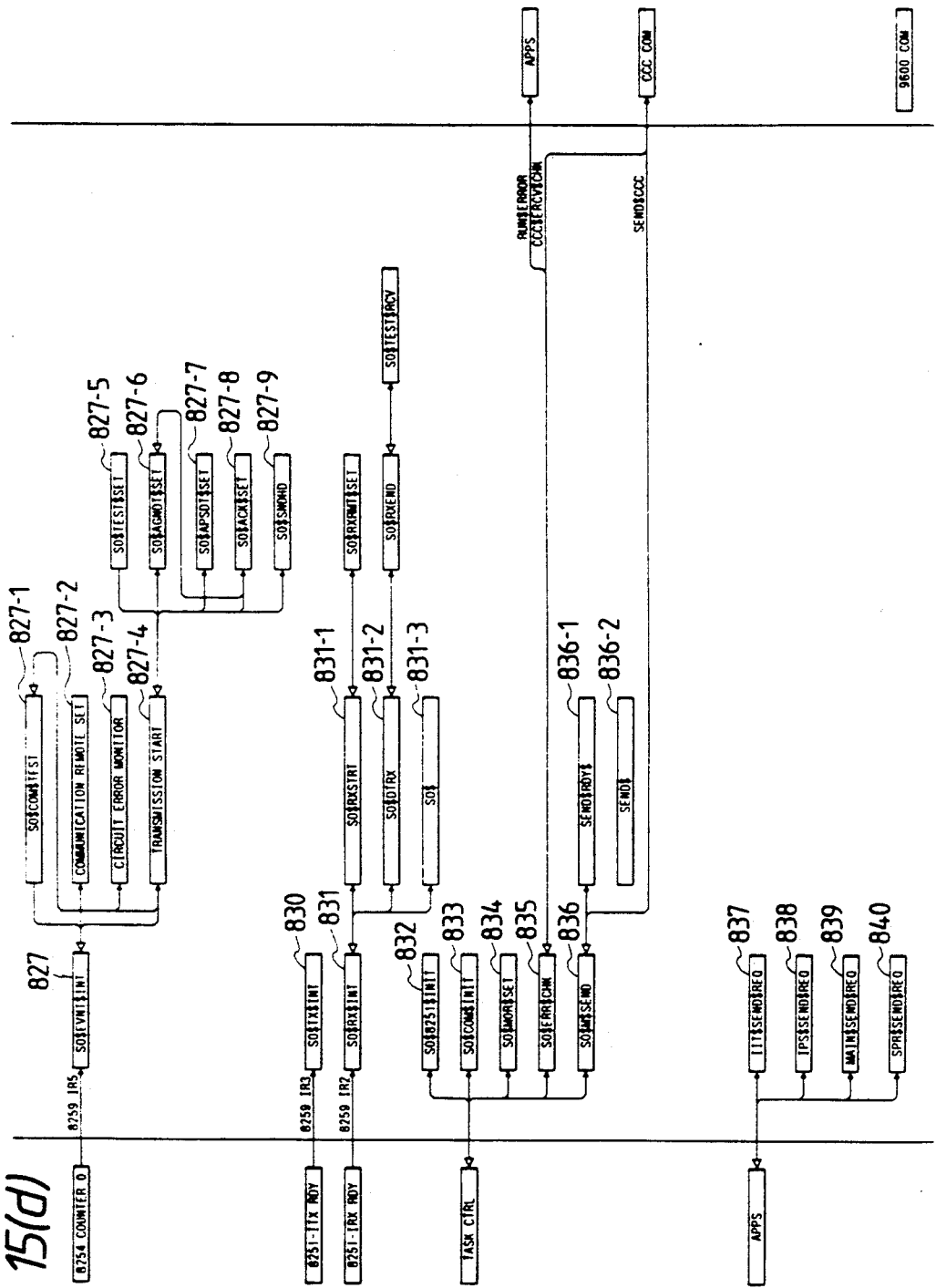

Interrupt modules 823 to 826, which are driven by an internal interruption from a controller 8086, are also for executing a psuedo processing of the noise interruption when it occurs (FIG. 15(c)).

(B) 9600 BPS Communication Module

The 9600 COM, which is for performing a serial communication at 9600 bps between the system monitor and the IIT and the IPS, executes communication interruption processing and transmission/reception interruption processing, and transfers data to and from the APPS. This module will be described with reference to FIG. 15(d).

A high accuracy is required for the start of transmitting data from the system to the IIT and the IPS. To secure the accuracy, an interruption is used for transmitting a message of data transmission to the hardware. After a fixed time interval, a timer controller LSI 8254 sends an interruption of starting communication to the IIT and the IPS. A communication interrupt module 827 activates a module, which is under control of it, which executes the processings to start the communication.

A communication test module 827-1 conducts a test of a serial communication network. A communication remote set modules 827-2 executes the processing of setting a slave remote which performs the communication of the 9600-bps serial communication system.

When the present communication error is too bad to repeat the communication several times, a circuit error monitor module 827-3 decides that a circuit error is present. Here, the term "communication error" means an error that occurs for one time of communication, and is categorized into the following three:

(1) Non-response error

This error indicates non-response from a remote.

(2) Status error

This error is data error contained in the data from a remote. The status error consists of three types of errors, 1) parity error, 2) framing error in which no stop bit is detected, and 3) an overrun error in which before incoming data is loaded into a communication buffer, the next data arrives.

(3) Frame error

The error occurs when the logic of the frame is fallacious, for example, when incoming data is interrupted and the received data has an incorrect number of bytes.

The circuit error monitor module checks if such a communication error is repeated consecutively three times or more. If the answer is yes, it decides that a circuit error is present.

A transmission start module 827-4 is for the communication to and from remotes. To conduct a transmission test at the transmission start, the module 827-4 calls a transmission test command set module 827-5, and sets a test command. To transmit the same data, the module 827-4 calls a retransmission data set module 827-6, and sets retransmission data. When receiving a request of "send data" from the APPS, the module 827-4 calls an APPS data set module 827-7, and sets the transmission data requested by the APPS, together with a command, in a frame, and further separates a received frame into commands and data. When no data to be transmitted to a remote is present, the module 827-4 calls an ACK set module 827-8, and executes the processing to send an ACK. To send data, the module 827-4 calls a HEADER transmission module 827-9, sets a called remote No. in a header and sends it to the destined remote. Further, the module 827-4 picks up the header from the frame, and checks the destined remote.

An LSI 8251 is for the interruptions of data transmission and reception. A transmission interrupt module 830 writes transmission data into the LSI 8251 for serial communication, and puts the transmission data on the 9600 communication line. Then, an interruption of asking "Is LSI 8251 ready for the next data ?" arrives. In response to this, the interrupt module 830 executes the processing to write the next data, which is to be transferred to the IIT and the IPS, into the LSI 8251. The interruption is generated every one-byte. For the data of five bytes, five interruptions are applied, accordingly.

When one-byte data is transmitted from the IIT or the IPS to the one-byte 8251, a reception interrupt module 831 receives an interruption of "reception of one-byte data" from the LSI. That is, the module receives the interruption every one-byte. When the next one-byte data is completely set in the LSI, the LSI generates another interruption toward the module 831. In this way, the module 831 consecutively receives the data every one-byte.

The following modules are under control of the reception interrupt module 831: a data reception start set module 831-1, a data reception module 831-2, a reception error recovery module 831-3, a reception remote set module 831-4, a data reception end module 831-5, and a self-test result reception module 831-6. The reception interrupt module 831 checks if erroneous data is contained in the data as completely set in the LSI, and if that data is originated from the IIT or the IPS. Before the APPS is operated, the self-test result reception module 831-6 checks if it is communicable with the system, and executes the processing of receiving the results of the power-on self-tests of the IIT and the IPS. This processing resembles the processing by the power-on initialize module.

An LSI 8251 initialize module 832, a transmission initialize module 833, a header format set module 834 execute the initialize processing, which is called from the task control module in the power-on initialize mode.

In the 10-msec interval interruption in the task control module, a circuit error check module 835 is called, and is used when the monitor sends a message of a circuit error to the APPS.

When only the monitor communication is taken into consideration, the monitor may detect a circuit error if it occurs, and if required, may stop the communication on the basis of the check result, by using the error monitor module. In a situation where a circuit error occurs but the APPS does not detect the error, the APPS mistakenly recognizes that the communication with the IIT is still alive, and sends a carriage scan request to the IIT. In this situation, however, the IIT cannot produce and return a message of scan end to the APPS. Accordingly, the APPS is placed in a stand-by state, while ceaselessly sending the carriage scan request to the IIT. Further, a display message "Copy progresses" is left displayed. To cope with this, the task module calls the circuit error check module 835, every 10-msec. The module 835 further calls a program RUNSERROR to make an error drive processing, and sends a message of the data, which is generated by the circuit error monitor module 827-2, to the APPS.

When a communication error occurs in the CCC, if the error is left as it is, any communication with the MCB and the UI cannot be performed. When the communication error is detected, to recover it from the error state, the circuit error check module calls a program CCCSERCVSCHK in the CCC-COM module every 10 msec.

In a transmission module 836, a transmission check SVC 836-1 and a transmission SVC 836-2 are programs which are called when the 10-msec interruption in the task control module is executed.

An IIT transmission queing module 837 and an IPS transmission queing module 838 are programs as is called from the supervisor call from the APPS. Those programs have each a buffer, and transmit data about one time at the interval of 100 msec.

A main transmission queing module 839 and a spare transmission queing module 840 are spare programs, and are in preparation for an increase of the remotes.

Figure 15E:
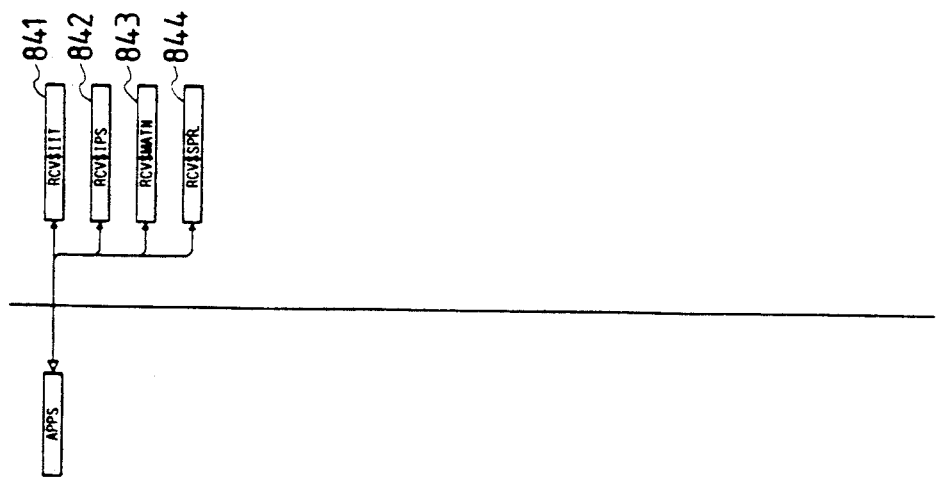

When the APPS issues a supervisor call asking if there is the data as received from the IIT and/or the IPS, an IIT-data fetch module 841 and an IPS-data fetch module 842 respond to the supervisor call, and provide the received data FIG. 15(e)). A main received data fetch module 843 and a spare received data fetch module 844 are spare programs, and provided in preparation for an increase of the remotes, as in the case of the data transmission.

(C) LNET Communication Module

Figure 16:
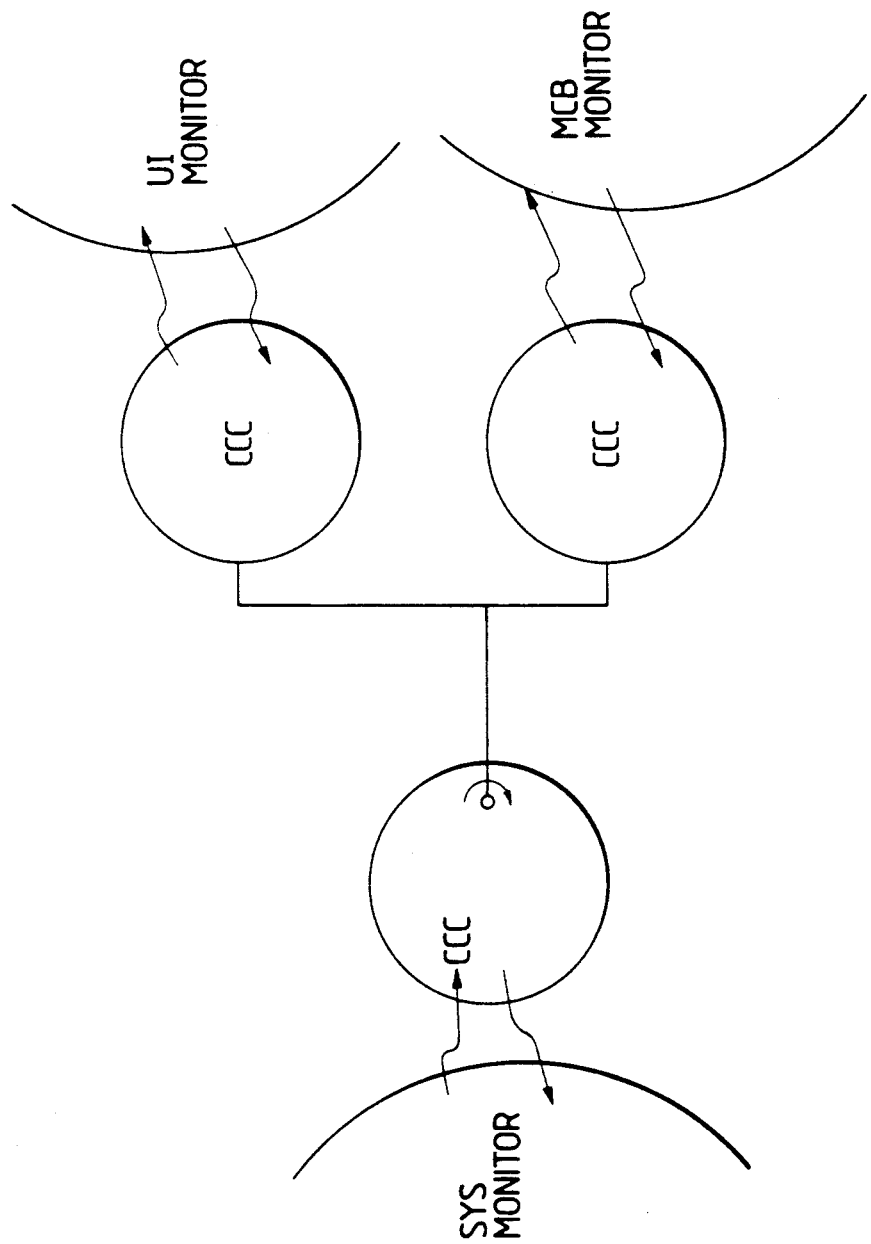

As shown in FIG. 16, an LNET high speed communication is performed among the SYS, UI and MCB monitors at 187.5 kbps through the CCCs. The CCC contains a software. In loading data from the SYS monitor into a buffer of the CCC chip, data is transmitted via data packets. When the data transmission is completed, a buffer-empty interrupt arrives. Also when data packets are received, an interrupt occurs. Additionally, when a communication error occurs, an interrupt arrives. Accordingly, as for the LNET communication, when seen from the CCC-COM module, the monitor is treated like the APPS. The CCC-COM module executes three types of processings; self-test processing, reception processing, and transmission processing.

Figure 15F:
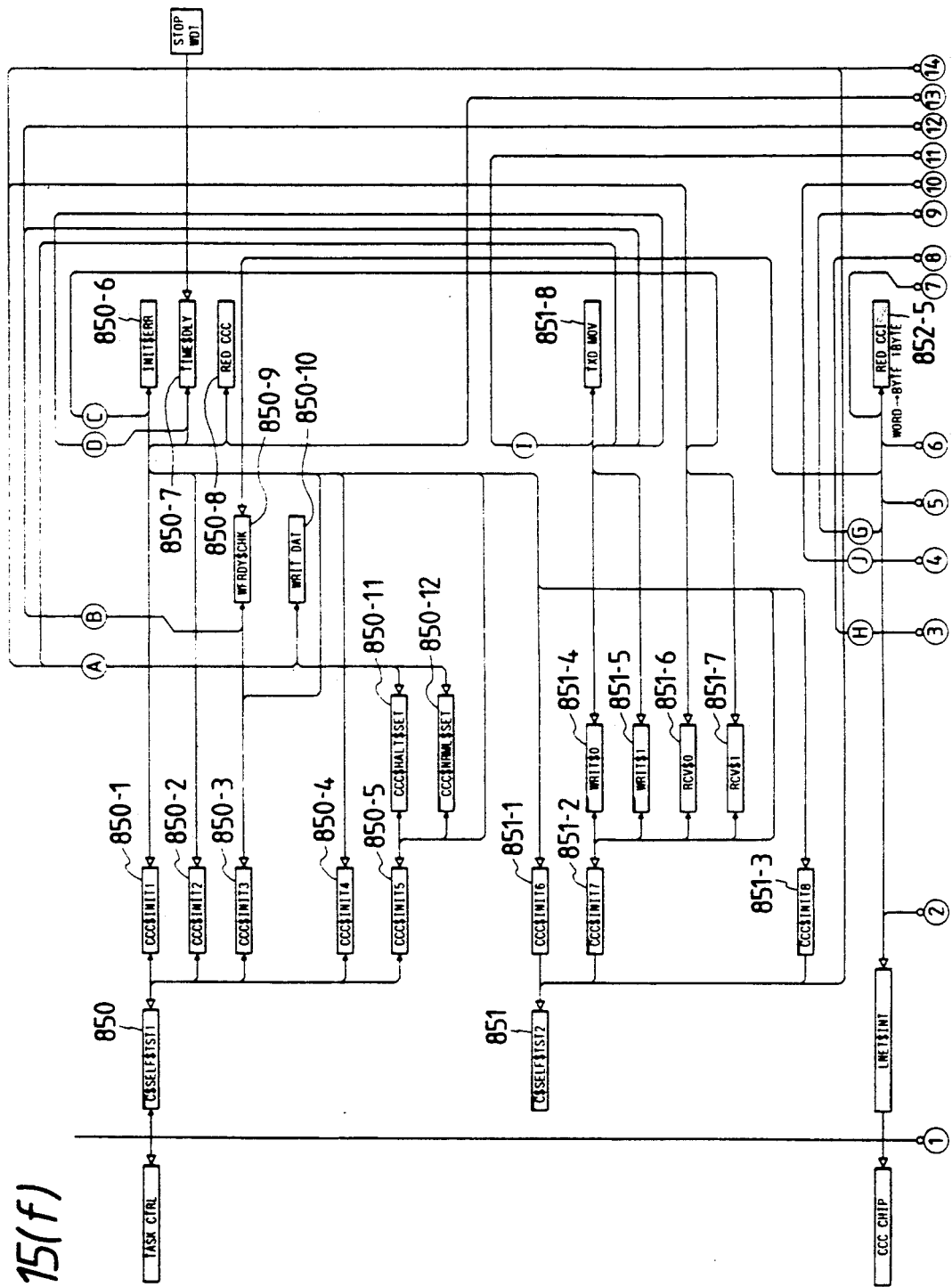
Figure 15G:
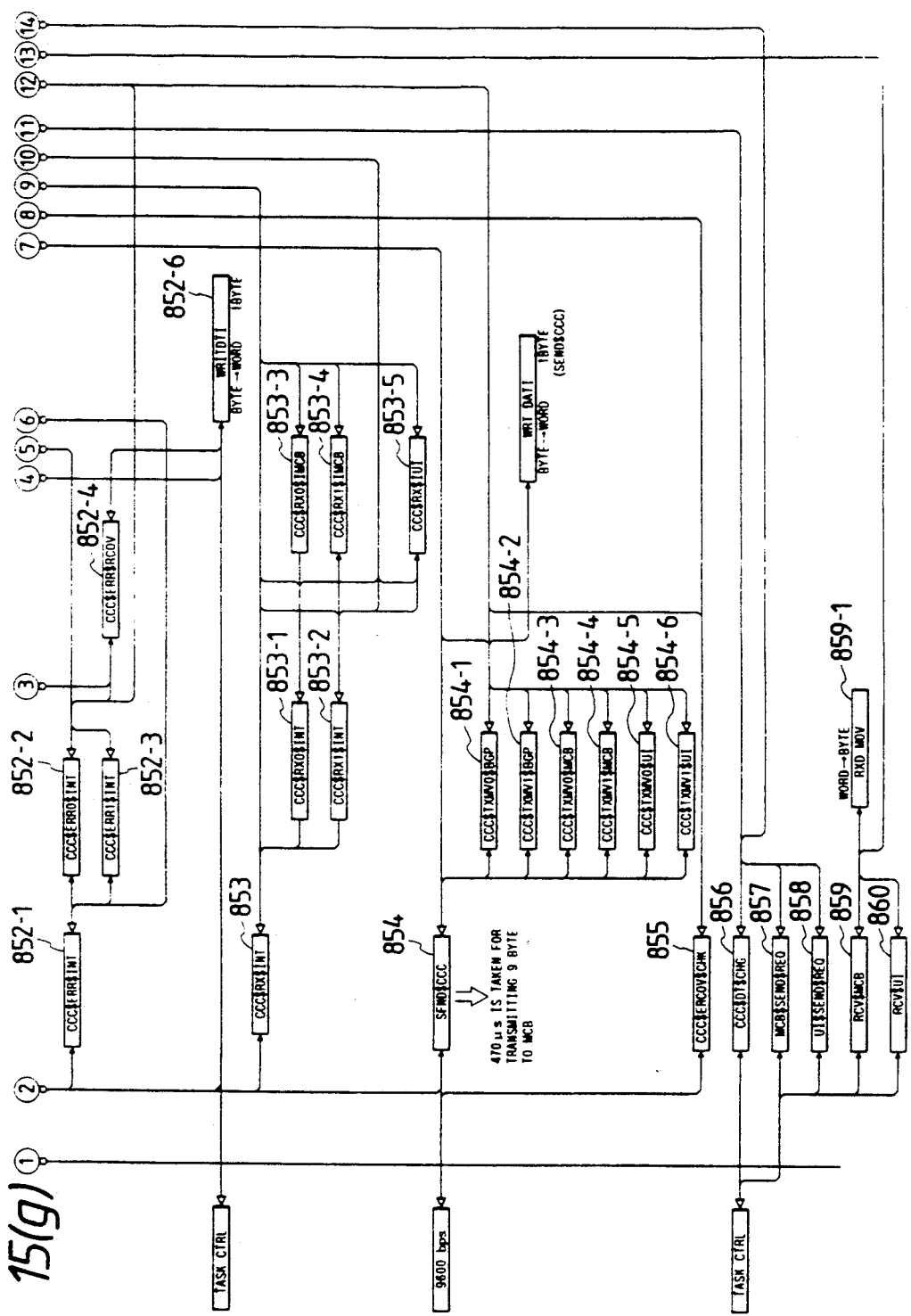

A CCC self-test 1 module 850 and a CCC self-test 2 module 851 are called from a task control module that is called at the time of power-on from the main monitor (FIG. 15(f)).

The CCC-COM module generates three statuses, self-test, HALT and NORMAL, and conducts a test based on each status.

The CCC self-test 1 module 850 is used when the CCC is initialized, and tests the CCC to check if it operates normally. To test, a CCC status change test 1 module 850-1 instructs the CCC-COM to change its status from the self-test to the HALT, and checks if the status has been changed as instructed.

Then, in the HALT test, a FIFO command is applied to the CCC chip by turn-around test modules 850-2 to 850-4. The CCC self-test module 850 checks if the CCC operates as instructed by the command, and returns a message of such to the module 850.

The CCC status change test 1 module 850-1 changes the status of the CCC-COM from the HALT status to the NORMAL, and checks if the status has been changed as instructed. Then, modules 850-11 and 850-12 initialize the HALT and the NORMAL status. The specifications of the CCC chips are different from those of other chips. To make those chips common in processing, interfaces are provided, such as an FIFO command write check module 850-9, data conversion module 850-10, error module 850-6, weight module 850-7, and a read conversion module 850-8. The 1-msec weight module 850-7 directly accesses a port of the watch dog timer. The reason for this is that it takes some time from start of the check till the check is completed, and hence the watch dog timer must be periodically reset; otherwise it is recognized as the runaway of program.

The self-test 2 module 851 conducts a turn-around test of the LNET, and checks if a communication goes well in the LNET. A module 851-1 causes the LNET being in an enabled state to merely execute a command, and checks whether the result is good or no good. A module 851-3 causes the LNET being in a disabled state to merely execute a command, and checks whether the result is good or no good. A module 851-2 drives data transmission modules 851-4 and 851-5, which are for testing transmission buffers 0 and 1, and data reception check modules 851-6 and 851-7, which are for testing reception buffers 0 and 1, and tests the LNET. In addition to the lines connecting to the UI and the MCB, the LNET contains a line returning to the LNET per se. In the test of the LNET, the LENT sends a test signal through this line and receives a return signal through the same line, and checks whether or not the return signal is the same as the test signal as sent. This test can check as to whether or not the processing to send a data signal from each buffer and receive it through the line, is possible.

Also in the self-test 2, the interfaces 850-6 to 850-8 are used. Further, a data conversion module 851-8 is used as an interface for the common processing.

An LNET interrupt is generated in the following three cases: 1) an error occurs, 2) the transfer buffer is empty, and 3) data is received.

When the LNET interrupt is generated, each module decides whether or not the interrupt is directed to the module per se, and executes related processing.

When the number of data re-transmissions is over a preset value, an error interrupt module 852-1 decides that data transmission fails, and drives an error module 852-2 or 852-3 for a buffer 0 or 1, and also an error recovery module 852-4. A read conversion module 852-5 serves as an interface for the common processing.

When an interrupt that is not used is generated, it must be returned by loading an end interrupt command to a register of the CCC chip. To this end, the task control module calls a data conversion module 852-6 and causes it to execute conversion processing.

When data is loaded into the buffer 0 or 1, a reception interrupt module 853 calls a reception buffer module 853-1 or 853-2, and calls a buffer reception queing modules 853-3 to 853-5, thereby to fetch data. In this case, the MCB periodically sends to the system special commands, a request self-test result and a background polling (BGP), thereby to inquire whether or not the LNET high speed communication is alive in the system. Because of a large amount of communication data to the UI, two queing modules are provided.

The transmission processing of the 9600 BPS is called from the task control module every 10 msec. As a result, a SENDSCCC module 854 to execute the transmission processing of the CCC is called from the 9600 PBS or the LNET interrupt.

The transmission module 854 determines which data is to be loaded into each of buffers 854-1 to 854-6. This will be described in detail with reference to FIGS. 17(a) and 17(b). A module 852-6 is an interface for the common processing.

Figure 17B:
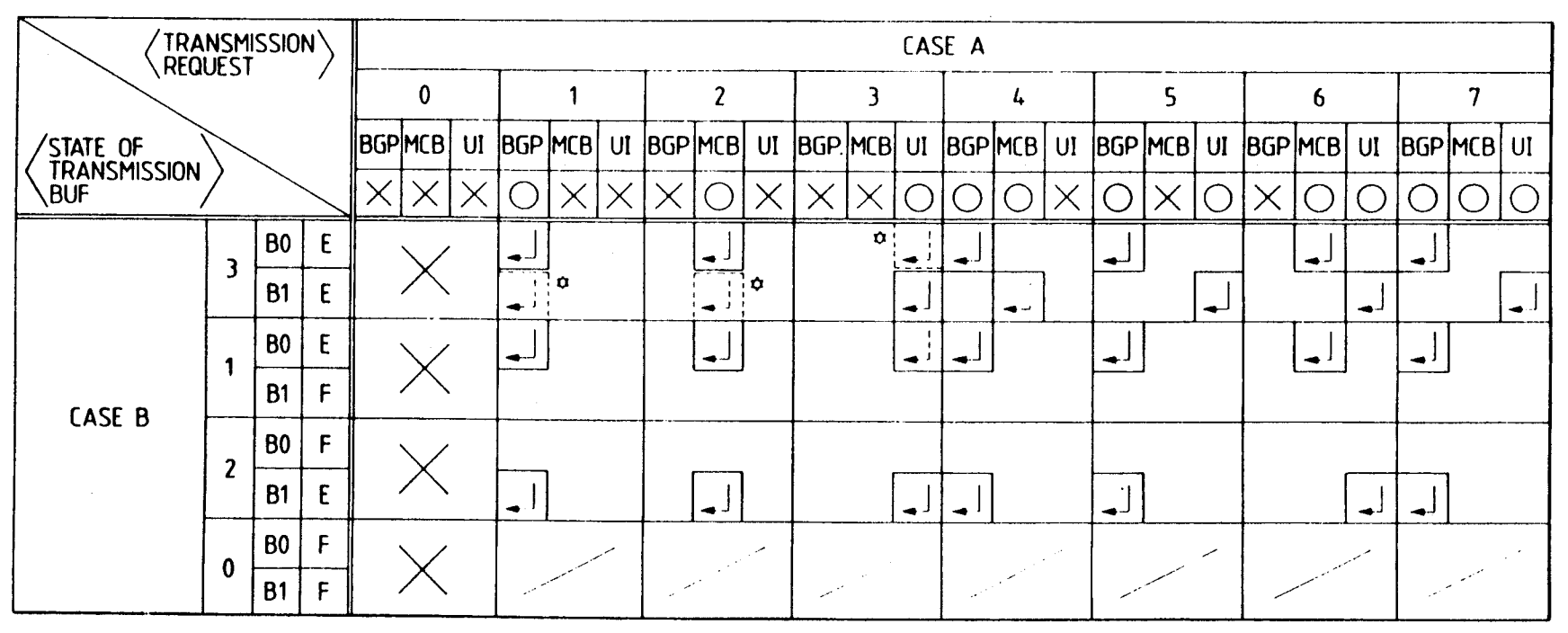

FIG. 17(a) is an explanatory diagram useful in explaining the LNET communication. FIG. 17(b) is a table showing transmission patterns based on transmission requests and empty states of transmission buffers 0 and 1.

As shown in FIG. 17(a), the CCC includes two transmission buffers and two reception buffers. Data can be loaded into data packets. The transfer buffer 0 is for the MCB monitor. The transfer buffer 1 is for the UI monitor. When the buffer is empty, an interrupt is applied to the monitor, to indicate that it is ready for the next data transmission. When the data in one of the buffers is sent to the MCB or the UI, data is loaded into the other. This arrangement makes data transmission more efficient. When the MCB or the UI has no response to the received data, it returns an ACK command to the CCC. The same thing is true for the data reception. When the data packets are sent, an interrupt indicating this fact arrives at the CCC and data is fetched alternately from the two buffers.

In FIG. 17(b), E indicates "empty"; F, "full"; B0, buffer 0; B1, buffer 1; o, "transmission request is present"; x, "transmission request is absent"; inverted L with an arrow, "buffer select". As for the data transmission, a response to the request self-test result and the background polling (BGP) is given top priority. As for the transmission request to both the MCB and the UI, where the request is directed to either the MCB or the UI, either the buffer 0 or the buffer 1 is used. Where the request is directed to both the MCB and the UI, it is transmitted to the MCB when only the MCB buffer 0 is empty, while it is transmitted to the UI when only the UI buffer 1 is empty.

The transmission processing may be called by either a 10-msec interrupt or an LNET interrupt. When power is turned on or the final data has been transmitted, no data is present, so that no change from the "buffer full" to "buffer empty" can be caused. Under this condition, an LNET interrupt cannot be generated, and it is impossible to transmit data. In this case, a 10msec interrupt triggers and calls the transmission processing. When only the 10-msec interrupt is used, data is transmitted once every 10-msec. In this instance, however, the LNET interruption is also used. Therefore, when data is sent and the buffer becomes empty, an interrupt is immediately applied. Accordingly, a great amount of data can be successively transmitted. When the 10-msec interrupt and the LNET interrupt concurrently occur, the LNET is masked to prevent contention by the interrupts.

An error check recovery module 855 checks whether or not the error recovery is completed.

A BGP transmission conversion module 856, and modules 857 to 860 for processing data transmission to and reception from the MCB and the UI are for the transmission/reception processing by a supervisor call, which is a service processing to the APPS. A module 859-1 is an interface for the common processing.

(III-2) Task Control Status Transition

Figure 18B:
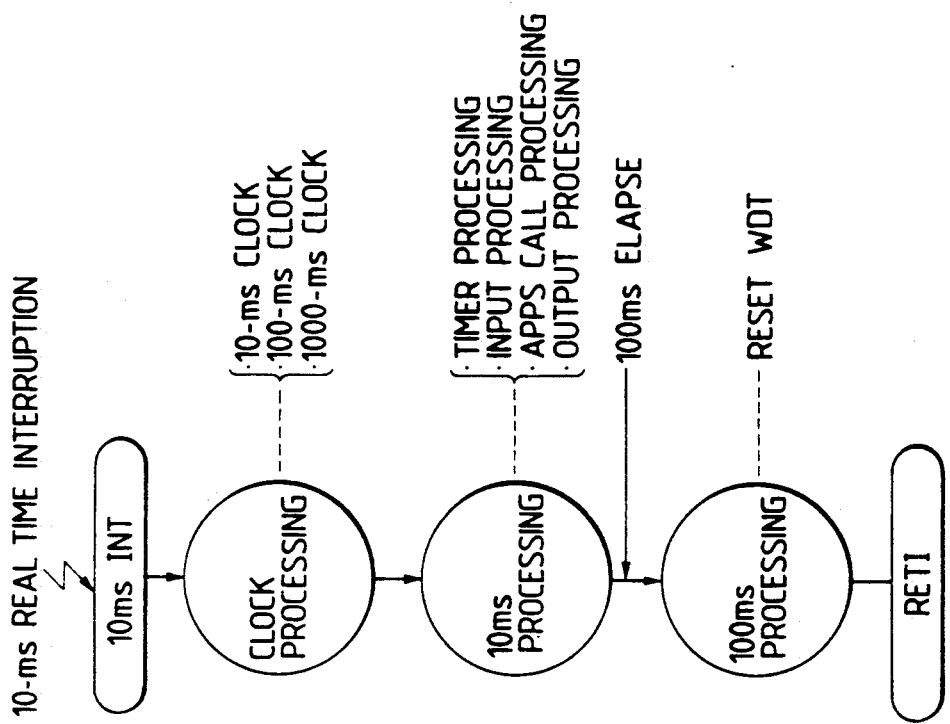
FIGS. 18(a) and 18(b) are flowcharts for explaining state transitions of task controls.
Figure 18A:
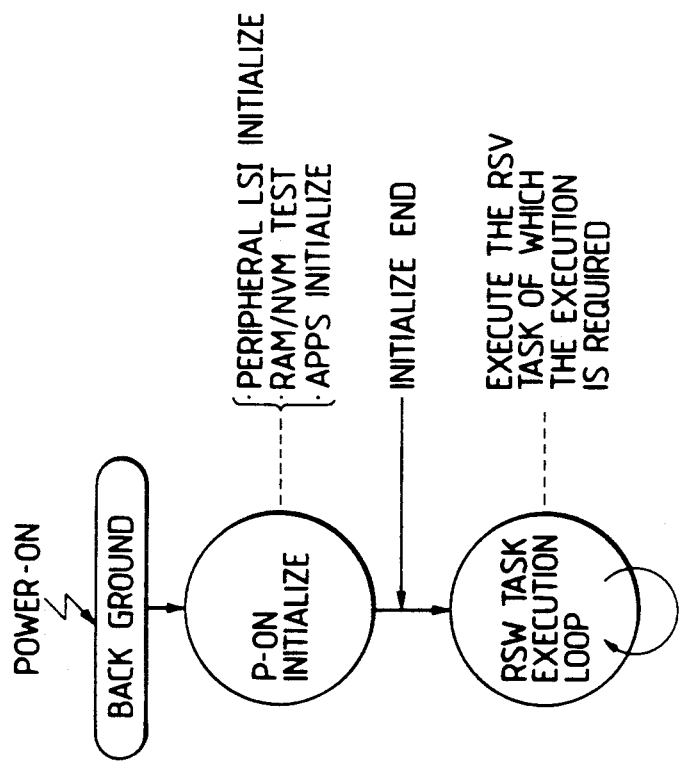

FIGS. 18(a) and 18(b) show explanatory diagrams useful in explaining status transitions of the task control.

The processing by the task control module of the monitor according to the present invention is executed by a background loop shown in FIG. 18(a) and a 10-msec interrupt loop shown in FIGS. 18(b).

In FIG. 18(a), the processing of the background loop starts in the power-on state. The background loop executes a time consuming task whose processing time is 10 msec or more, such as forming a TRC conversion table, by executing the power-on initialize processing and the RSV task execute processing. As recalled, in the power-on initialize processing, initialization of peripheral LSIs, RAM and ROM tests, initialization of the APPS, and the like are performed by the modules 801-1 to 801-10 which are driven by the monitor main module 801 (FIG. 15(a)). The execution of the RSV task execute processing is requested after the power-on initialization, and is repeated by the monitor main loop module 801-4 driven by the monitor main module 801.

In FIG. 18(b), the 10-msec interrupt loop is executed by the modules driven by the 10-msec interrupt module 802. In a real time interrupt program recurring every 10 msec, the regular monitor processing including 10 msec, 100 msec, and 1000 msec time counts, timer processing, input processing, APPS call, output processing, and the like is executed by the timer module 802-1, filter module 802-2, APPS call module 802-3, and the output module 802-6. Further, in this interrupt loop, the WDT reset module 802-13 resets the watch dog timer.

Thus, the monitor executes the processings by using two loops. The RSV task is executed by an endless loop of the monitor main loop module 801-4, and its execution is continued till the power-off. If an interrupt occurs, the background loop transfers the right of execution control to the 10-msec interrupt loop. In the interrupt loop, the regular monitor processing is executed.

(III-3) Task Table

FIGS. 19(a) through 19(d) show RSV task tables.

In the instant invention, the time consuming processings of 10 msec or more long as background processings must be previously stored as RSV tasks in task tables in the monitor RAM. 16 task tables RSV0 to RSV15 are used in this instance Accordingly, at most of 16 tasks may be stored in the monitor RAM.

Figure 19A:
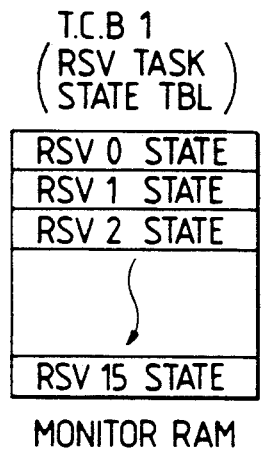
FIGS. 19(a) through 19(d) are diagrams showing RSV task tables.
Figure 19B:
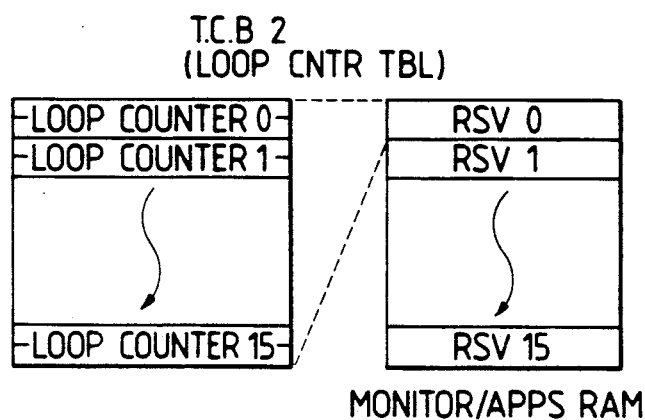
Figure 19C:
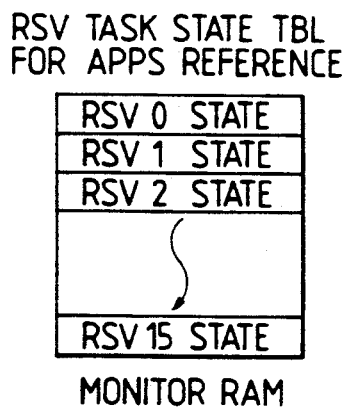

In FIGS. 19(a) and 19(c) showing RSV task state tables. FIG. 19(a) shows an RSV task state table prepared by the monitor, and FIG. 19(c) shows an RSV task state table prepared for an APPS reference. Those tables are stored into the monitor RAM.

The task has four states; stop (0), wait-for-execution (1), execution in progress (2), and execution end (3). FIGS. 0 to 3 indicating the present states of the task are set in the state table. The figure of each RSV task is set in the monitor RAM. Therefore, one can know the present state of the RSV task by referring to the figure in the state table.

As will be subsequently described, the monitor holds the task state of "execution end" for 10 msec in order to show "completion of processing" or "interrupt of processing"; otherwise, the APPS cannot recognize it, because it is driven once every 10 msec. To hold the task state for 10 msec, two RSV task state tables are provided. One of the tables is altered every time a task state changes, while the other is altered every 10 msec. The APPS recognizes states of the RSV tasks after referring to the table of FIG. 19(c). On the other hand, the monitor does not refer to the task state table for APPS reference.

FIG. 19(b) shows a loop counter table. 16 loop counters are provided for each task. As will be described later, a maximum of 256 of processing loops may be counted.

Figure 19D:
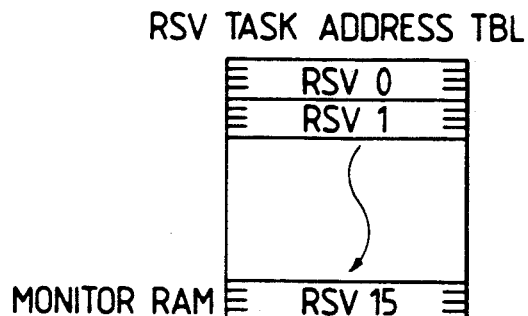

FIG. 19(d) shows an RSV task address table. The RSV tasks are stored in the monitor RAM in the initialize state of the background loop. The number of the RSV tasks is counted at the time of their storage. One can know the number of the stored RSV tasks.

The tables of FIGS. 19(a), 19(c) and 19(d) are provided in the monitor RAM. The loop counter table of FIG. 19(b) is provided in a RAM common to both the monitor and the APPS (monitor/APPS RAM). The storage, execution, and stop of the RSV tasks are executed in the service processing by the monitor, which is based on the supervisor call from the APPS. For this reason, the RSV task address table and the RSV task state table are set in the monitor RAM. The monitor must manage a count as generated in the processing of the APPS, viz., how many loops are executed. Accordingly, the count is written into the table managed by the monitor. It is for this reason that the loop count table is stored in the monitor/APPS RAM.

(III-4) TRC Setting and its Calculation Flow

Figure 20:
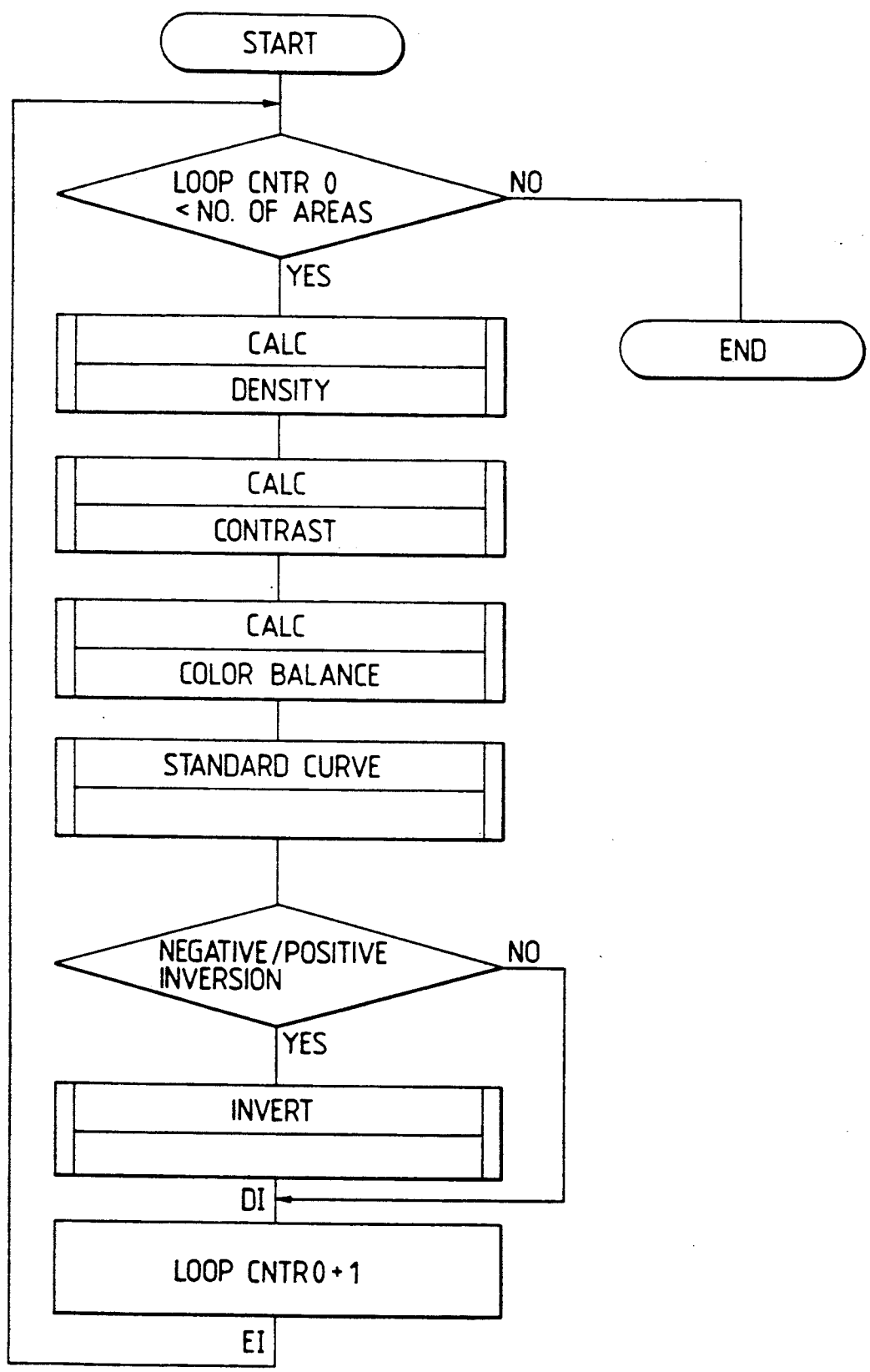
FIG. 20 is a flowchart showing a TRC setting processing of the IPS.

FIG. 20 is a flowchart showing how to set the TRC of the IPS.

As recalled, each RSV task is provided with 16 loop counters. In this instance, a loop counter 0 is used. To correct a standard curve in accordance with a kind of original, density, contrast and color balance are set normally at four points. If required, a negative/positive inversion is performed. When one time of the TRC setting is completed, the loop counter 0 is incremented by one (+1). Subsequently, the above process is repeated. When the counter 0 counts 256 gradations, the TRC processing ends.

Figure 21A:
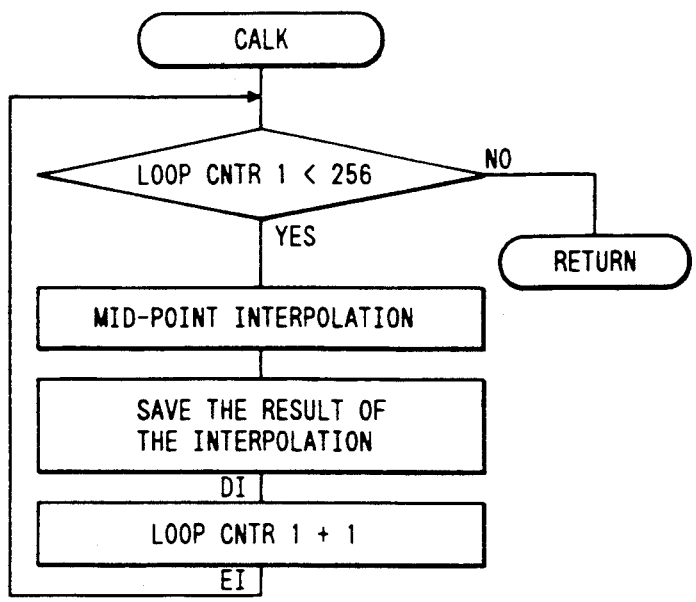
FIGS. 21(a) through 21(c) are flowcharts for a midpoint interpolation calculation, a standard curve calculation, and an inversion calculation.
Figure 21B:
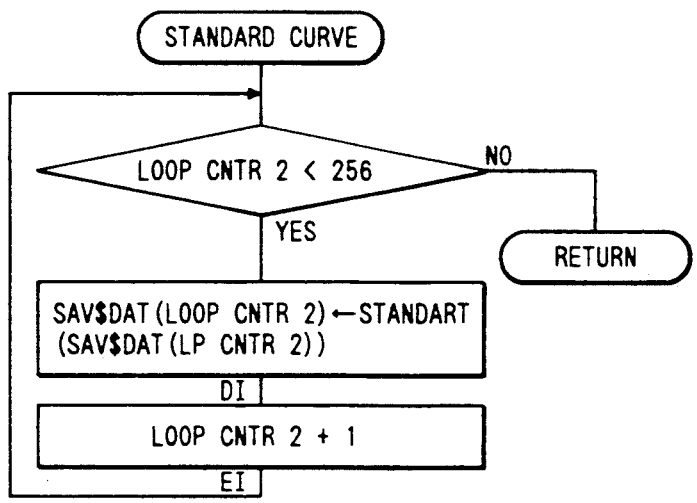
Figure 21C:
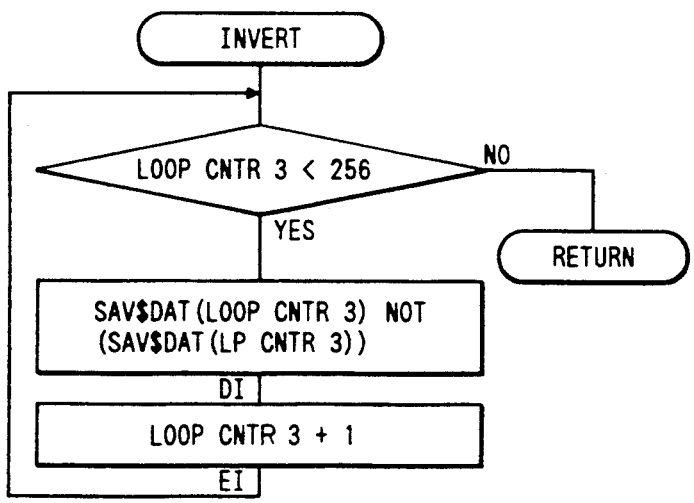

FIGS. 21(a) through 21(c) are flowcharts respectively showing processes of a mid-point interpolation calculation, standard curve calculation, and inversion calculation.

Since four setting points are used, mid-points each between two adjacent points must be calculated by a linear approximation method. The mid-point interpolation calculation is used for obtaining the mid-points. In this instance, a loop counter 1 is used for the calculation. Because of 256 gradations, the mid-point interpolation is applied to 256 points.

For the standard curve calculation, a loop counter 2, for example, is used. The values at the 256 points as obtained by the mid-point interpolation are converted by the standard curve, thereby to correct the standard curve. Finally, a TRC conversion table is prepared.

For the inversion calculation, a loop counter 3, for example, is used. By the calculation, an inclination of the TRC conversion table (curve) thus obtained is turned by 90 degree. This calculation is performed when a dark density area on an image is inverted into a light density area, for example.

Thus, the TRC calculation task of the IPS must execute a large number of jobs, and takes a long processing time, because settings of density, contrast, and color balance, mid-point interpolation for yielding 256 gradations, standard curve correction, and the inversion calculation are performed at 256 gradations.

(III-5) Transition of RSV Task State

The four states, stop, wait-for-execution, execution in progress, and execution end, are employed for the RSV task management, because of good controllability.

FIG. 22 is an explanatory diagram showing transition conditions of the RSV task.

The RSV task, which is processed in a background mode in a range from power-on to power-off, is in the "stop (0)" state. When the APPS issues a request of executing the RSV task, the task storing counter is incremented by one (+1), to place the RSV task in the "wait-for-execution 1". In this state, when the APPS stops the execution of the RSV task, the counter is decremented by one (−1), and the RSV task is placed again in the "stop 0". In the "wait-for-execution 1", when the monitor starts to execute the RSV task, a state of the RSV task is changed to the "execution in progress 2". In this state, the task is executed. When the monitor ends the RSV execution, the counter is decremented by one (−1), to set the task in the "execution end 3". The monitor holds the "execution end" state for 10 msec. and stops. This is performed to clearly show the completion of the task execution or the task interruption.

(III-6) Interrupt Processing and Background Processing

Figure 23:
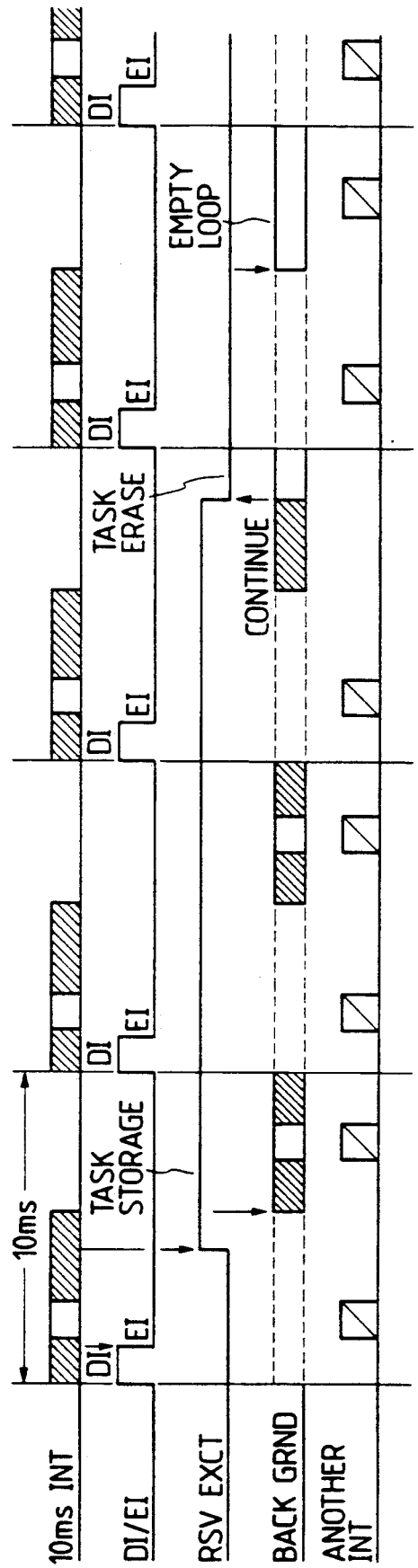
FIG. 23 is a time chart showing a relationship among 10-msec interruption, background processing, and another interruption.

FIG. 23 is an explanatory diagram showing a relationship among a 10-msec interrupt processing, background processing, and other interrupt processing.

The regular monitor processings is executed by the 10-msec interrupt. As shown, the interrupt is disabled only at the initial stage of the interrupt, but the interrupt is enabled immediately and accepts other interrupts. When an RSV task execution request (RSV EXCT) is issued, the background processing is executed during the idle time after the regular monitor processing terminates. When the next 10-msec interrupt occurs, the regular monitor processing is again executed. When another interrupt of higher priority occurs, the regular monitor processing and the background processing are interrupted, and the processing for the higher priority interrupt is executed according to priority.

When the RSV EXEC is removed, the RSV task execution terminates, but the background processing continues, and an idle loop is executed in the CPU idle time.

As seen from FIG. 23, in the present invention, a hierarchical structure is employed for the processings in such a way that the background processing is in a low-level, the regular monitor processing, in a medium-level, and another interruption is in a high-level.

(III-7) Background Loop and Interrupt Loop Flow

FIG. 24 shows flowcharts of a main loop (background loop) and an interrupt loop recurring every 10 msec.

Upon power on, the background loop is driven, the respective LSIs are initialized, and as the result of the APPS initializing, a task address is stored into a task address table (step 1001). Then, control disables the interrupt and checks successively 16 counters whether or not those contain an execution request. To make this check, control checks a count of the RSV storing counter to decide if an RSV 0 task is present. If the answer is YES, control checks if an execution request of the RSV 0 task is present. The check is made depending on if the RSV 0 task state is "wait-for-execution" (steps 1002 to 1004). If it is the "wait-for-execution", control places the RSV 0 task in the "execution in progress" state (step 1005). Then, control enables the interrupt (step 1006), and executes the RSV task (step 1007). The reason why the interrupt is disabled before the RSV 0 task is placed in the "execution in progress" state (step 1005), is that there is a case that the interrupt changes the RSV task state, and in such a case, contention of the state change must be avoided. In this way, the processing is executed by the above loop.

Upon the completion of the processing, control disables the interrupt so as to avoid the state change contention (1008), and check if the RSV 0 is in the "execution in progress" state. If the answer is YES, control sets the RSV 0 task in the "end" state (steps 1009, 1010).

The "execution in progress" state is checked for the reason that even when the RSV 0 task is being executed, the APPS can request stop of its execution, and hence there is no reason why the RSV 0 task being stopped is set in the "stop" state. Thus, the RSV storing counter is decremented by one (−-1), and the interruption is enabled (step 1012), and subsequently control executes the processings on the RSV tasks 1 to 15, as it processes the RSV 0 task.

In the 10-msec interrupt loop, when the 10-msec real time interruption occurs, control sets a mask for the 10-msec interrupt, and inhibits the interrupt for the control per se (step 1101). It is possible that a 10-msec interrupt may unexpectedly takes a long time for its processing, such that the next 10-msec interrupt occurs without returning control to the main routine. It is for this reason that the mask is set. Then, control enables the interruption to accept another interrupt (step 1102). In the subsequent steps 1103 to 1123, control executes the clocking processing.

Following the clocking processing, the timer processings of 10 msec, 100 msec and 1000 msec are executed. Then, a filter input processing follows, which is for preventing noise being fetched as data (step 1125). Control executes an APPS call (step 1126), and issues a request of stopping the RSV task, and sets FFF0H in the loop counter. As a matter of course, when the 10-msec interrupt comes in, the control right has been transferred from the background processing to the 10-msec interrupt. Accordingly, the RSV task processing is interrupted, and the interrupt is disabled (step 1008). The request of executing the RSV task is also made in the APPS call processing. If that request is issued, the task storing counter is counted up, and at the same time the RSV task state table is placed in the "wait-for-execution" state.

The data as written into an area of the transmission queing is transmitted by the transmission home set processing (step 1127). States of the RSV task state table for APPS reference are changed by the RSV state change processing (step 1128). Further, control executes the RAM monitor processing, polling check, error check processing, output processing, and the like (steps 1129 to 1132), and checks if 100 msec elapses. If the answer is YES, control resets the watch dog timer (steps 1133 and 1134), disables the interrupt, and resets the 10-msec interrupt mask (steps 1135 and 1136), enables the 10-msec interrupt, and returns.

(III-8) Timing Chart

Figure 25B:
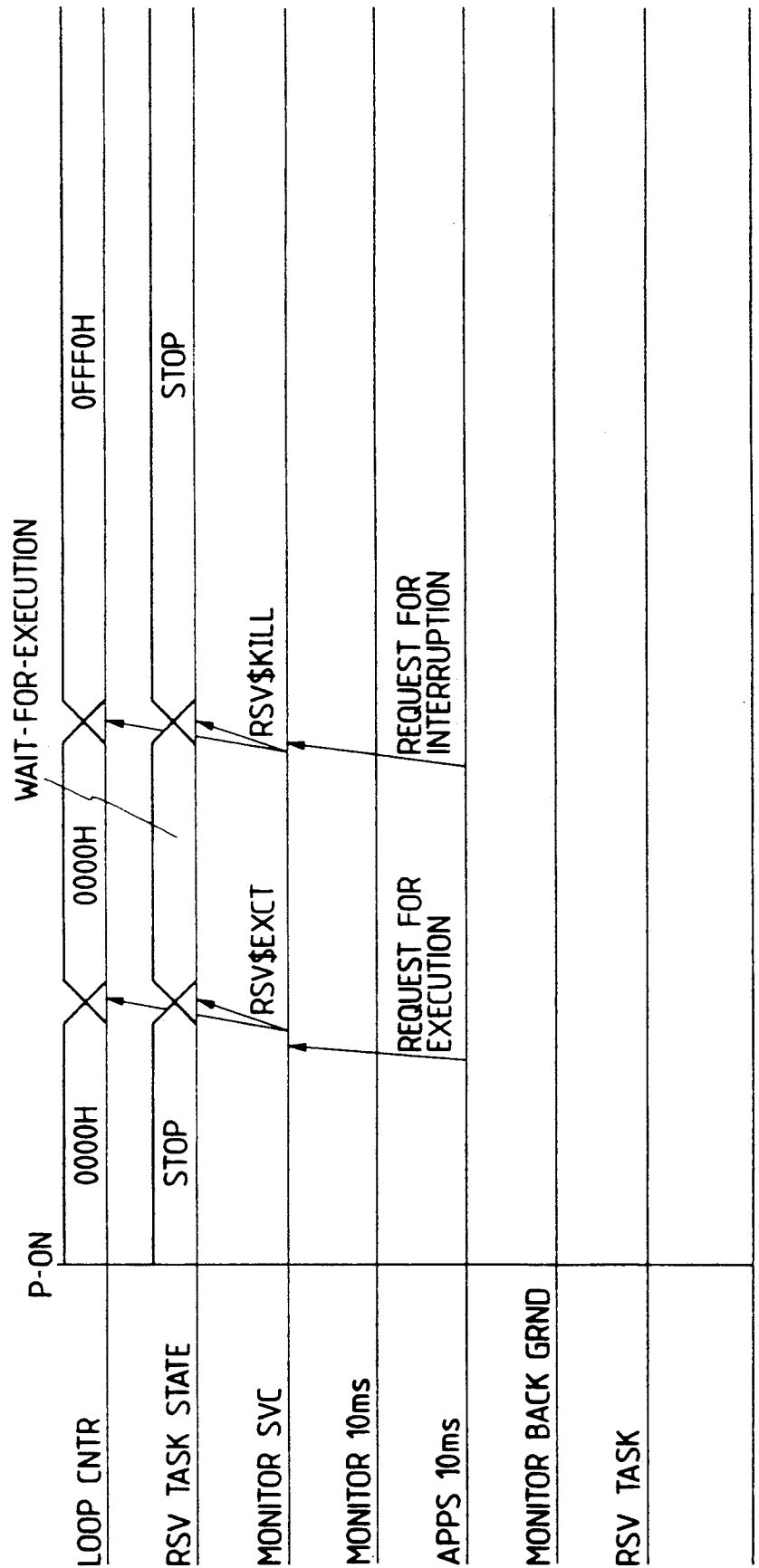
Figure 25C:
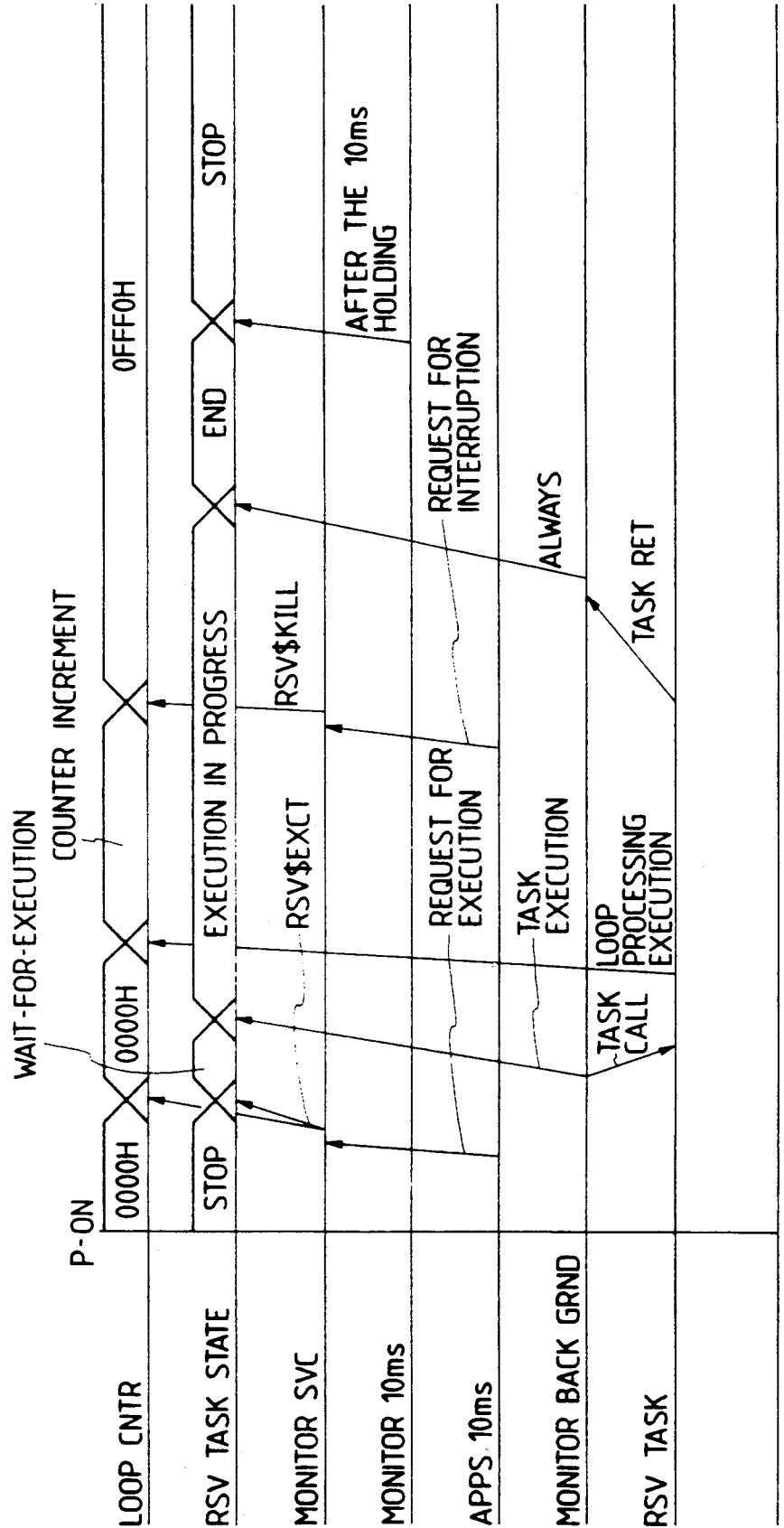
Figure 26:
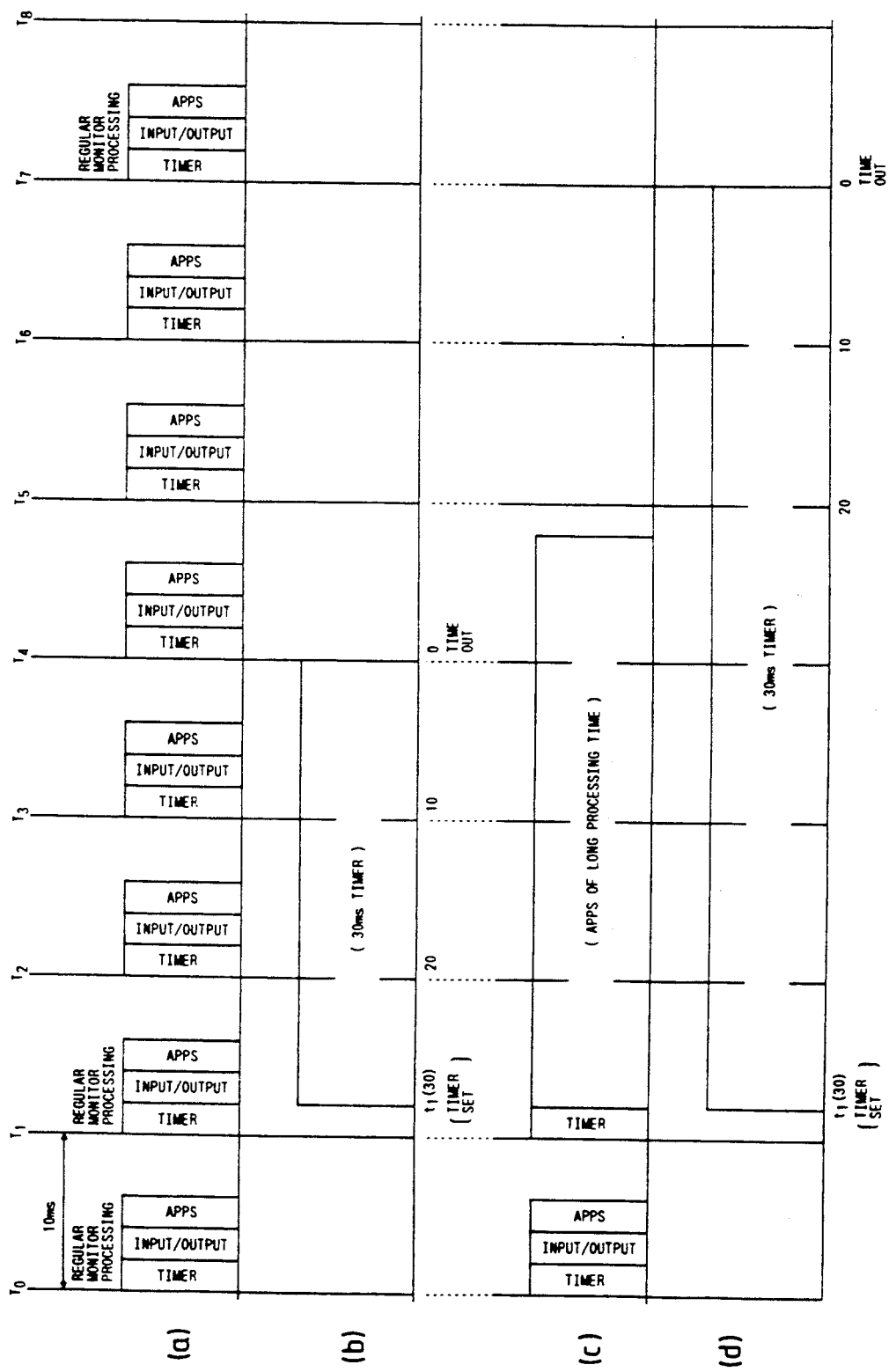
FIG. 26 is a timing chart for explaining how trouble occurs in the timer processing when a time-consuming processing occurs.

FIGS. 25(a) through 25(c) show timing charts showing two states of the RSV task processing, interruption in the "wait-for-execution" in the regular monitor processing and an interruption in the "execution in progress".

FIG. 25(a) is a timing chart of the interruption in the "wait-for-execution" in the regular monitor processing. As shown, at the time of power on, a count of the loop counter is 0, and the RSV task state is in the "stop" state. Under this condition, when the request of executing the RSV task is present by the monitor supervisor call, the loop counter is cleared, and the RSV task state is changed to the "wait-for-execution" state. When the monitor background module calls executes the RSV task, the RSV task state becomes "execution in progress", and the loop counter is incremented every loop processing. When the control right is returned from the RSV task to the monitor background, the RSV task state becomes the "end" state. After the monitor holds its state for 10 msec. changes its state to the "stop". In this way, one RSV task is completed. When the counter counts a maximum value, the RSV task ends, and the monitor background changes the RSV task state from the "execution in progress" to the "end".

FIG. 25(b) shows a timing chart of the interruption in the "wait-for-execution".

At the time of power on, the RSV task is in the "stop" state. The APPS 10-msec processing issues an execution request toward the monitor SVC, and places the loop counter 0 clear and the RSV task state in the "wait-for-execution". When the RSV task state is in the "wait-for-execution", if an interrupt request is generated by the APPS 10-msec processing, the monitor SVC changes the RSV task state from the "wait-for-execution" to the "stop". "0FFF0U" is set in the loop counter, and the processing is interrupted.

FIG. 25(c) is a timing chart of the interruption in the "execution in progress" state.

At the time of power on, the RSV task is in the "stop" state. The APPS 10-msec processing issues an RSV task execution request toward the monitor SVC, and the monitor SVC places the RSV task in the "wait-for-execution", and the loop counter in the 0 clear state. Under this condition, when the request of executing the RSV task is present by the monitor supervisor call, the loop counter is cleared, and the RSV task state is changed to the "wait-for-execution" state. When the monitor background module calls executes the RSV task, the RSV task state becomes "execution in progress", and the loop counter is incremented every loop processing. When an interrupt request is generated by the APPS 10-msec processing, the monitor SVC responsively issues an RSV task interrupt request, and sets "0FFF0H" in the loop counter. The task is returned from the RSV task to the monitor background. The RSV task state is changed from the "execution in progress" to the "end". The monitor holds it for 10 msec, and changes the task state to the "stop".

As seen from the foregoing description, the time-consuming task is treated as the low-level processing task, and the regular monitor processing task, as the high-level processing. The low-level processing task is executed in background processing during the CPU idle time. When an interrupt, which occurs every 10 msec, takes place the background processing is interrupted, and the regular monitor processing is executed during the interrupted time. Accordingly, the time-consuming processing and the regular monitor processing may be reliably executed. In this respect, the CPU may be more efficiently used. Further, the two types of communication processors, high speed communication processor with a contention bus configuration and the low speed communication processor with a polling system configuration, are selectively used in accordance with the transmission lines. With this, the advantageous features of the decentralized CPU may be fully utilized, to realize an effective communication.

What is claimed is:

1. A monitor control system having a processor, said processor comprising:
   interrupt means for executing a regular monitor process by an interrupt occurring at a predetermined time interval;
   background processing means for executing a background process;
   control means for controlling said interrupt means and said background processing means such that said interrupt means executes the regular monitor process during a period in which said background processing means is interrupted;
   a prestored task table in which prestored tasks to be executed by said background processing means are stored; and
   a plurality of loop counters for counting a number of processing loops representing a number of executed tasks for each prestored task.

2. The monitor control system according to claim 1, further comprising a task state table for managing said prestored task table.

3. The monitor control system according to claim 1, wherein a state indicating completion of the prestored tasks is held for a predetermined time until said background processing means is next interrupted.

4. The monitor control system according to claim 1, wherein said background process is a calculating process requiring 10 msec or more.

5. The monitor control system according to claim 1, wherein said prestored tasks to be executed by said background processing means are stored and erased by a supervisor call produced in accordance with said interrupt means.

6. A monitor control system having a processor, said processor comprising:
   interrupt means for executing a regular monitor process by an interrupt occurring at a predetermined time interval;
   background processing means for executing a background process;
   control means for controlling said interrupt means and said background processing means such that said interrupt means executes the regular monitor process during a period in which said background processing means is interrupted;
   a prestored task table in which prestored tasks to be executed by said background processing means are stored, wherein upon execution of one of the prestored tasks in said prestored task table, a number representative of the number of said prestored tasks is decremented.

7. The monitor control system according to claim 6, wherein a state indicating completion of the prestored tasks is held for a predetermined time until said background processing means is next interrupted.

8. The monitor control system according to claim 6, wherein said background process is a calculating process requiring 10 msec or more.

9. The monitor control system according to claim 6, wherein said prestored tasks to be executed by said background processing means are stored and erased by a supervisor call produced in accordance with said interrupt means.

10. A monitor control system comprising:
    a plurality of communication processors having different communication speeds;
    one of said plurality of communication processors comprising interrupt means for executing a regular monitor process in accordance with an interrupt occurring every 10 msec and for executing other processes in accordance with other interrupts;
    another of said plurality of communication processors comprising background processing means for constantly executing a background process, said background processing means being motivated upon power-on;

wherein said one of said plurality of communication processors has a high processing speed relative to the another processor; and control means for controlling said interrupt means and said background processing means such that said interrupt means executes the regular monitor process during a period in which said background processing means is interrupted.

11. The monitor control system according to claim 10, wherein upon one of said other interrupts and said 10 msec interrupt concurrently occurring, one of said concurrently occurring interrupts is masked.

12. The monitor control system according to claim 10, wherein said high speed communication processor performs a plurality of communication processing functions, responsive to said other interrupts, and includes a plurality of transmission buffers and a plurality of reception buffers responsive to said high speed communication processor, such that read and write operations, and transmission and reception of data are concurrently performed between said high speed communication processor and a plurality of sources.

13. The monitor control system according to claim 12, wherein said high speed communication processor transmits to and receives data packets from said plurality of sources.

14. The monitor control system according to claim 12, wherein said high speed communication processor assigns said transmission buffers and said reception buffers to a particular one of said sources.

15. The monitor control system according to claim 10, wherein one of said plurality of communication processors is a polling type communication processor for transmitting and receiving data byte by byte.

16. The monitor control system according to claim 15, wherein said polling type communication processor is motivated by an interruption generated when data is transmitted and received.

17. The monitor control system according to claim 15, wherein said polling type communication processor includes a line error monitor processor for determining whether an error has occurred in the monitor process and a line error check processor for sending an error message indicating a line error to an application software operating in a monitor central system.

* * * * *

UNITED STATES PATENT AND TRADEMARK OFFICE
CERTIFICATE OF CORRECTION

PATENT NO. : 5,142,675
DATED : August 25, 1992
INVENTOR(S) : KOICHI OI et al.

It is certified that error appears in the above-indentified patent and that said Letters Patent is hereby corrected as shown below:

Abstract, line 15, change "ever" to --every--.

Front Page, Title, change "CHANNEL" to --CONTROL--.

Signed and Sealed this

Twenty-fifth Day of January, 1994

Attest:

BRUCE LEHMAN

Attesting Officer    Commissioner of Patents and Trademarks